(12) United States Patent
Irikura

(10) Patent No.: US 7,857,079 B2
(45) Date of Patent: Dec. 28, 2010

(54) MULTI-WHEEL VEHICLE

(75) Inventor: Koji Irikura, Hyogo (JP)

(73) Assignee: Kanzaki Kokyukoki Mfg. Co., Ltd.:, Hyogo-ken (JP)

( * ) Notice: Subject to any disclaimer, the term of this patent is extended or adjusted under 35 U.S.C. 154(b) by 0 days.

(21) Appl. No.: 12/359,602

(22) Filed: Jan. 26, 2009

(65) Prior Publication Data

US 2009/0194360 A1 Aug. 6, 2009

Related U.S. Application Data

(63) Continuation of application No. 11/690,459, filed on Mar. 23, 2007, now Pat. No. 7,493,975, which is a continuation of application No. 11/397,796, filed on Apr. 5, 2006, now Pat. No. 7,458,431, which is a continuation of application No. 11/209,764, filed on Aug. 24, 2005, now Pat. No. 7,044,244, which is a continuation of application No. 10/252,837, filed on Sep. 24, 2002, now Pat. No. 6,951,259, which is a continuation-in-part of application No. 09/820,673, filed on Mar. 30, 2001, now Pat. No. 6,554,085, which is a continuation-in-part of application No. 09/372,747, filed on Aug. 11, 1999, now Pat. No. 6,336,513.

(30) Foreign Application Priority Data

Dec. 3, 1998 (JP) ................................. 10-344319

(51) Int. Cl.
*B62D 17/15* (2006.01)

(52) U.S. Cl. ...................... 180/6.32; 180/307; 180/431; 280/93.506

(58) Field of Classification Search ................ 180/6.24, 180/6.26, 6.3, 6.32, 6.38, 431, 307, 308; 280/93.506, 93.502, 93.513, 774, 93.51; 74/491, 498, 503, 508

See application file for complete search history.

(56) References Cited

U.S. PATENT DOCUMENTS 168,955 A 10/1875 Annin (Continued)

FOREIGN PATENT DOCUMENTS

CH 249274 6/1947

(Continued)

OTHER PUBLICATIONS

Electric Tractor Corporation, "An Idea Whose Time Has Come", 5 pages, date of publication unknown, published in Ontario, Canada.

(Continued)

*Primary Examiner*—Anne Marie M Boehler
(74) *Attorney, Agent, or Firm*—Sterne, Kessler, Goldstein & Fox P.L.L.C.

(57) ABSTRACT

A vehicle comprises a steering operation device, a pair of running-driving wheels, which differentially drive when the steering operation device is manipulated, a pair of steerable running wheels interlocking with the steering operation device, and a steering mechanism interposed between the steering operation device and the pair of running-driving wheels. The steering mechanism includes a pair of drive gears interlocking with the steering operation device and a pair of follower gears interlocking with the respective steerable running wheels. The drive gears mesh with the respective follower gears so as to control lateral turning of the respective steerable running wheels. A gear radius of the drive gear may be greater than that of the follower gear meshing with it. A gear ratio between the mutually meshing drive and follower gears may be variable. The lateral turning centers of both the steerable running wheels may coincide with each other, and further coincide with a lateral turning center of the vehicle body caused by differential rotation of the running-driving wheels.

2 Claims, 51 Drawing Sheets

U.S. PATENT DOCUMENTS

| | | |
|---|---|---|
| 1,476,068 A | 12/1923 | Froelich |
| 1,748,061 A | 2/1930 | Claude |
| 2,191,961 A | 2/1940 | Howell |
| 2,255,348 A | 9/1941 | Brown |
| 2,311,922 A | 2/1943 | Allin |
| 2,332,838 A | 10/1943 | Borgward |
| 2,336,911 A | 12/1943 | Zimmermann |
| 2,336,912 A | 12/1943 | Zimmermann |
| 2,391,735 A | 12/1945 | Orshansky, Jr. |
| 2,530,720 A | 11/1950 | Paulson |
| 2,745,506 A | 5/1956 | McCallum |
| 2,763,164 A | 9/1956 | Neklutin |
| 2,789,646 A | 4/1957 | Bobard |
| 2,936,033 A | 5/1960 | Gates |
| 2,996,135 A | 8/1961 | Grabow |
| 3,059,416 A | 10/1962 | Campbell |
| 3,315,759 A | 4/1967 | Bohlen |
| 3,371,734 A | 3/1968 | Zaunberger et al. |
| 3,376,760 A | 4/1968 | Gordanier |
| 3,395,671 A | 8/1968 | Zimmermann, Jr. |
| 3,450,218 A | 6/1969 | Looker |
| 3,492,891 A | 2/1970 | Livezey |
| 3,530,741 A | 9/1970 | Charest |
| 3,550,708 A | 12/1970 | Paramythioti |
| 3,575,254 A * | 4/1971 | Sipos .................... 180/431 |
| 3,590,658 A | 7/1971 | Tuck |
| 3,596,535 A | 8/1971 | Polak |
| 3,603,176 A | 9/1971 | Tipping |
| 3,612,199 A | 10/1971 | Vissers |
| 3,717,212 A | 2/1973 | Potter |
| 3,744,584 A | 7/1973 | Swift |
| 3,768,825 A | 10/1973 | Magnusson |
| 3,796,275 A | 3/1974 | Bouyer |
| 3,833,078 A | 9/1974 | Chaney et al. |
| 3,869,014 A | 3/1975 | Federspiel et al. |
| 3,884,320 A | 5/1975 | Auguste Leveau |
| 3,901,339 A | 8/1975 | Williamson |
| 3,903,977 A | 9/1975 | Gillette et al. |
| 3,907,051 A | 9/1975 | Weant et al. |
| 3,966,005 A | 6/1976 | Binger |
| 3,978,937 A | 9/1976 | Chichester et al. |
| 4,013,301 A | 3/1977 | Gaskin et al. |
| 4,133,404 A | 1/1979 | Griffin |
| 4,174,762 A | 11/1979 | Hopkins et al. |
| 4,245,524 A | 1/1981 | Dammon |
| 4,281,737 A | 8/1981 | Molzahn |
| 4,293,050 A | 10/1981 | Goloff et al. |
| 4,320,810 A | 3/1982 | Hillmann et al. |
| 4,399,882 A | 8/1983 | O'Neill et al. |
| 4,471,669 A | 9/1984 | Seaberg |
| 4,572,310 A | 2/1986 | Peter |
| 4,577,711 A | 3/1986 | Butler |
| 4,620,575 A | 11/1986 | Cuba et al. |
| 4,700,794 A | 10/1987 | Bernhagen et al. |
| 4,718,508 A | 1/1988 | Tervola |
| 4,729,257 A | 3/1988 | Nelson |
| 4,732,053 A | 3/1988 | Gleasman et al. |
| 4,738,328 A | 4/1988 | Hayden |
| 4,776,235 A | 10/1988 | Gleasman et al. |
| 4,776,236 A | 10/1988 | Gleasman et al. |
| 4,782,650 A | 11/1988 | Walker |
| 4,790,399 A | 12/1988 | Middlesworth |
| 4,809,796 A | 3/1989 | Yamaoka et al. |
| 4,813,506 A | 3/1989 | Smith |
| 4,870,820 A | 10/1989 | Nemoto |
| 4,875,536 A | 10/1989 | Saur et al. |
| 4,882,947 A | 11/1989 | Barnard |
| 4,890,508 A | 1/1990 | Zaunberger |
| 4,895,052 A | 1/1990 | Gleasman et al. |
| 4,914,907 A | 4/1990 | Okada |
| 4,917,200 A | 4/1990 | Lucius |
| 4,932,209 A | 6/1990 | Okada et al. |
| 4,949,823 A | 8/1990 | Coutant et al. |
| 5,004,060 A | 4/1991 | Barbagli et al. |
| 5,015,221 A | 5/1991 | Smith |
| 5,052,511 A | 10/1991 | Hunt |
| 5,094,326 A | 3/1992 | Schemelin et al. |
| 5,131,483 A | 7/1992 | Parkes |
| RE34,057 E | 9/1992 | Middlesworth |
| 5,154,437 A | 10/1992 | Inagaki et al. |
| 5,195,600 A | 3/1993 | Dorgan |
| 5,201,240 A | 4/1993 | Hayes et al. |
| 5,247,784 A | 9/1993 | Kitamura et al. |
| 5,279,376 A | 1/1994 | Yang et al. |
| 5,285,866 A | 2/1994 | Ackroyd |
| 5,307,612 A | 5/1994 | Tomiyama et al. |
| 5,308,095 A | 5/1994 | Fabris et al. |
| 5,311,957 A | 5/1994 | McLaurin et al. |
| 5,314,387 A | 5/1994 | Hauser et al. |
| 5,335,739 A | 8/1994 | Pieterse et al. |
| 5,339,631 A | 8/1994 | Ohashi |
| 5,367,861 A | 11/1994 | Murakawa et al. |
| 5,383,528 A | 1/1995 | Nicol |
| 5,387,161 A | 2/1995 | Shibahata |
| 5,497,847 A | 3/1996 | Ota et al. |
| 5,505,279 A | 4/1996 | Louis et al. |
| 5,507,138 A | 4/1996 | Wright et al. |
| 5,517,809 A | 5/1996 | Rich |
| 5,529,135 A | 6/1996 | Wenzel et al. |
| 5,535,840 A | 7/1996 | Ishino et al. |
| 5,553,453 A | 9/1996 | Coutant et al. |
| 5,560,447 A | 10/1996 | Ishii et al. |
| 5,564,518 A | 10/1996 | Ishii et al. |
| 5,569,109 A | 10/1996 | Okada |
| 5,590,737 A | 1/1997 | Azuma et al. |
| 5,644,903 A | 7/1997 | Davis, Jr. |
| 5,649,606 A | 7/1997 | Bebernes et al. |
| 5,667,032 A | 9/1997 | Kamlukin |
| 5,706,907 A | 1/1998 | Unruh |
| 5,722,501 A | 3/1998 | Finch et al. |
| 5,775,437 A | 7/1998 | Ichikawa et al. |
| 5,782,142 A | 7/1998 | Abend et al. |
| 5,842,378 A | 12/1998 | Zellmer |
| 5,850,886 A | 12/1998 | Kouno et al. |
| 5,894,907 A | 4/1999 | Peter |
| 5,910,060 A | 6/1999 | Blume |
| 5,913,802 A | 6/1999 | Mullet et al. |
| 5,946,894 A | 9/1999 | Eavenson et al. |
| 5,947,219 A | 9/1999 | Peter et al. |
| 5,975,224 A | 11/1999 | Satzler |
| 5,997,425 A | 12/1999 | Coutant et al. |
| 6,026,634 A | 2/2000 | Peter et al. |
| 6,029,761 A | 2/2000 | Gustafson et al. |
| 6,035,959 A | 3/2000 | Schaedler |
| 6,038,840 A | 3/2000 | Ishimori et al. |
| 6,098,386 A | 8/2000 | Shimizu et al. |
| 6,098,737 A | 8/2000 | Aoki |
| 6,098,740 A | 8/2000 | Abend et al. |
| 6,126,564 A | 10/2000 | Irikura et al. |
| 6,129,164 A | 10/2000 | Teal et al. |
| 6,141,947 A | 11/2000 | Borling |
| 6,152,248 A | 11/2000 | Hidaka et al. |
| 6,189,641 B1 | 2/2001 | Azuma |
| 6,196,342 B1 | 3/2001 | Teal et al. |
| 6,196,348 B1 | 3/2001 | Yano et al. |
| 6,257,357 B1 | 7/2001 | Teal et al. |
| 6,260,641 B1 | 7/2001 | Hidaka |
| 6,276,468 B1 | 8/2001 | Essig et al. |
| 6,283,236 B1 | 9/2001 | Teal et al. |
| 6,312,354 B1 | 11/2001 | Irikura et al. |
| 6,336,513 B1 | 1/2002 | Hasegawa et al. |
| 6,354,388 B1 | 3/2002 | Teal et al. |
| 6,397,966 B1 | 6/2002 | Irikura et al. |
| 6,447,419 B1 | 9/2002 | Irikura et al. |

| | | |
|---|---|---|
| 6,454,032 B1 | 9/2002 | Teal et al. |
| 6,478,706 B1 | 11/2002 | Crabb |
| 6,484,827 B2 | 11/2002 | Teal et al. |
| 6,524,205 B1 | 2/2003 | Irikura et al. |
| 6,540,633 B1 | 4/2003 | Hasegawa et al. |
| 6,547,685 B2 | 4/2003 | Kawada et al. |
| 6,554,085 B2 | 4/2003 | Hasegawa et al. |
| 6,601,663 B2 | 8/2003 | Hauser |
| 6,629,577 B1 | 10/2003 | Abend et al. |
| 6,951,259 B2 | 10/2005 | Irikura |
| 6,962,219 B2 | 11/2005 | Hauser |
| 7,004,268 B2 | 2/2006 | Irikura |
| 7,040,445 B2 | 5/2006 | Ishii et al. |
| 7,044,244 B2 | 5/2006 | Irikura |

FOREIGN PATENT DOCUMENTS

| | | |
|---|---|---|
| DE | 4224887 | 9/1993 |
| EP | 0806337 A1 | 11/1997 |
| FR | 1147142 | 11/1957 |
| GB | 2303829 A | 3/1997 |
| JP | 54-027130 | 3/1979 |
| JP | 57-140277 | 8/1982 |
| JP | 63-227476 | 9/1988 |
| JP | 1-160783 A | 6/1989 |
| JP | 2-261752 | 10/1990 |
| JP | 6-264976 | 9/1994 |
| JP | 3-176237 | 6/1996 |
| JP | 8-142906 A | 6/1996 |
| JP | 9-202255 A | 8/1997 |
| JP | 9-202258 A | 8/1997 |
| JP | 9-202259 A | 8/1997 |
| JP | 9-216522 A | 8/1997 |
| WO | WO 92/12889 | 8/1992 |
| WO | WO 98/32645 | 7/1998 |
| WO | WO 99/40499 | 8/1999 |
| WO | WO 00/01569 | 1/2000 |

OTHER PUBLICATIONS

Electric Tractor Corporation, Model#9620, "The Ultimate Lawn and Garden Tractor", 6 pages, date of publication, Jul. 27, 1998.
Excel Industries, Inc., "U-T-R The Ultimate Turning Radius", 1992, pp. 1-6.
Brochure Regarding Differential steering, Date of Publication unknown, pp. 4-15.
Deere & Company, "240, 245, 260, 265, 285 and 320 Lawn and Garden Tractors Technical Manual", front cover and pp. 10-2 and 10-4 and 10-6, date of publication, 1996.
Dixon Industries, Inc. "Dixon ZTR Riding Mowers", 1997, pp. 1-4.
Excel Industries, Inc., "Hustler 4000 Series", Dec. 1995, pp. 1-8.
ExMark "Nobody Does It Better Professional Turf Care Equipment", Dec. 1997, pp. 1-20.
Farm Show Magazine, "Battery Powered Riding Mower", 1 page, date of publication, Mar.-Apr. 1996.
Ferris Industries, Inc., "The ProCut Z Zero-Turn Rider", Dec. 1997, pp. 1-2.
Michael Bargo, Jr., "Tanks and dozers turn on a dime with new all gear steering", Popular Science, Jul. 1985, pp. 60-62.
Patent Cooperative Treaty International Search Report, International Application No. PCT/US98/13811 filed Jul. 2, 1998.
R.M. Orgokiewicz, "Tank Steering Mechanisms", *The Engineer*, Mar. 3, 1967, pp. 337-340.
Shivvers Mfg., "Zero Turn Radius Mower The Commercial Clipper", Dec. 1997, pp. 1-4.
Westwood, "The Westwood Clipper Owner's Instruction Manual", date of publication unknown, pp. 1-19.
Woods Equipment Company, "Woods Mow'n Machine, Zero turning radius riding mower", Dec. 1997, pp. 1-12.
Zipper-TS Mower, "The Zipper-TS Mowers", 1997, pp. 1-2.

* cited by examiner

MULTI-WHEEL VEHICLE

REFERENCE TO RELATED APPLICATION

This application is a Continuation of U.S. application Ser. No. 11/690,459, filed Mar. 23, 2007; which is a Continuation of U.S. application Ser. No. 11/397,796, filed Apr. 5, 2006, now U.S. Pat. No. 7,458,431; which is a Continuation of U.S. application Ser. No. 11/209,764, filed Aug. 24, 2005, now U.S. Pat. No. 7,044,244; which is a Continuation of U.S. application Ser. No. 10/252,837, filed Sep. 24, 2002, now U.S. Pat. No. 6,951,259; which is a Continuation-in-Part of application Ser. No. 09/820,673, filed Mar. 30, 2001, now U.S. Pat. No. 6,554,085; which is a Continuation-in-Part of application Ser. No. 09/372,747, filed Aug. 11, 1999, now U.S. Pat. No. 6,336,513, the disclosures of which are all incorporated herein in their entirety by reference.

BACKGROUND OF THE INVENTION

1. Field of the Invention

The present invention relates to a vehicle comprising a steering operation means, a pair of running-driving wheels which are differentially driven when the steering operation means is operated for cornering, and a pair of steerable running wheels interlocking with the steering operation means.

2. Background Art

Conventionally, technology where a pair of hydrostatic transmissions (HSTs) are laterally connected, driving axles project laterally from respective HSTs, running-driving wheels are fixed to the outer ends of both axles, wherein movable swash plates as capacity adjusting members for the hydraulic pumps of the HSTs are individually changed in angle thereby driving the left and right running wheels individually, is well-known, as disclosed in, for example, the U.S. Pat. No. 4,782,650.

In such construction, running speeds of the left and right HSTs, when the vehicle is driven straight forward, are equalized, and, when turned, are different.

The above-said vehicle, however, could not travel straightforward unless the output rotations of left and right HSTs completely coincided with each other, adjustments in shipment took much time, and parts and assembly errors had to be diminished so as to improve accuracy. Also, when there was a difference between the capacities of hydraulic pumps and motors, left or right turning feeling of the vehicle was different, resulting in that the vehicle was very hard to steer.

Thus, for overcoming the above problems, a vehicle including a steering operation means; a pair of running-driving axles; a pair of running wheels drivingly connected with the pair of running-driving axles; a first differential unit interposed between the pair of running-driving axles; a first hydrostatic transmission for transmitting a driving force to the first differential unit; a pair of steering output shafts; a second differential unit interposed between the pair of steering output shafts; a second hydrostatic transmission for transmitting a driving force to the second differential unit; a first drive train interposed between one of the steering output shafts and one of the running-driving axles, and a second drive train interposed between the other steering output shaft and the other running-driving axle for transmitting the rotating effort to the other running-driving axle in the opposite direction to the first drive train, wherein the second hydrostatic transmission operationally interlocks with the steering operation means so that the output speed and direction of the second hydraulic transmission is changed by manipulation of the steering operation means, has come to be invented. The vehicle does not require such labor as above mentioned for precise coincidence between the capacities of the first and second hydrostatic pumps and motors. Also, when both the hydrostatic pumps and motors are arranged in a longitudinal line, the vehicle becomes laterally compact.

It is still desirable to improve the running efficiency of such a vehicle when it drives and turns on a rough road or a soft ground. If the vehicle is provided with a caster in addition to the pair of running wheels, it can turn in a small circle, however, cornering on a rough road or a slope becomes unstable. It is good for steady cornering that the vehicle has steerable running wheels which can be turned laterally by operating the steering operation means. However, the steerable running wheels restrict the reduction of cornering circle. It is impossible for the steerable running wheels to have such a small cornering circle that can be ensured by casters. Especially, it is further hard for the vehicle to turn on a determined radius circle steadily when the vehicle has a plurality of running wheels arranged in a longitudinal direction so as to be made larger in whole length.

SUMMARY OF THE INVENTION

An object of the present invention is to provide a vehicle having a pair of running-driving wheels controlled by manipulation of a steering operation device such as a steering wheel so as to rotate differentially for turning the vehicle right or left, and having a pair of steerable running wheels which are laterally turned by manipulation of the steering operation device, wherein the lateral turning angles of the steerable running wheels are amplified so as not to hinder the turning of the vehicle caused by the differential rotation of the running-driving wheels.

To achieve the object, a steering mechanism interposed between the pair of steerable running wheels and the steering operation device turns the pair of steerable running wheels laterally according to increase of the manipulated degree of the steering operation device from its position for setting the vehicle into straight traveling so as to increase an increasing rate of turning angle of one of the steerable running wheels serving as an inside wheel disposed at inside of the turning vehicle in relation to a unit of the manipulated degree of the steering operation device.

The steering mechanism turns the pair of steerable running wheels laterally according to manipulation of the steering operation device for turning the vehicle right or left so as to make the turning angle of the steerable running wheel serving as the inside wheel greater than the turning angle of the other steerable running wheel serving as an outside wheel disposed at outside of the turning vehicle. Furthermore, the steering mechanism may turn the pair of steerable running wheels laterally according to increase of the manipulated degree of the steering operation device so as to reduce an increasing rate of turning angle of the steerable running wheels serving as the outside wheel in relation to a unit of the manipulated degree of the steering operation device.

The steering mechanism turns the pair of steerable running wheels laterally according to manipulation of the steering operation device so that lateral turning centers of the respective steerable running wheels coincide with each other at a point on a line along which the running-driving wheels are disposed coaxially. The common turning center of both the steerable running wheels moves on the line toward the middle position between the right and left running-driving wheels according to increase of the manipulated degree of the steering operation device. Furthermore, the common lateral turning center of both the steerable running wheels moves so as to coincide with a turning center of the vehicle caused by differential rotation of the running-driving wheels moving on the line.

The steering mechanism includes a pair of drive gears interlocking with the steering operation device so as to be rotated by manipulation of the steering operation device, and a pair of follower gears interlocking with the respective steerable running wheels so as to be rotated together with the respective steerable running wheels. The follower gears mesh with the respective drive gears so as to make two couples of mutually meshing drive and follower gears. Gear ratios of the respective couples of mutually meshing drive and follower gears vary according to manipulation of the steering operation device.

The gear ratio is a radius ratio of the drive gear to the follower gear. The gear ratio of the mutually meshing drive and follower gears interlocking with one of the steerable running wheels serving as the inside wheel is increased according to increase of the manipulated degree of the steering operation device. The gear ratio of the mutually meshing drive and follower gears interlocking with the other of the steerable running wheels serving as the outside wheel is reduced according to increase of the manipulated degree of the steering operation device.

The drive gears and the follower gears may be spur gears. Alternatively, the drive gears and the follower gears may be bevel gears.

A gear radius of the drive gear is greater than that of the follower gear meshing with the drive gear.

The pair of running-driving wheels are disposed coaxially to each other along a line. The couples of mutually meshing drive and follower gears are so arranged as to make the lateral turning centers of the respective steerable running wheels coincide with each other at a point on the line. The common turning center of both the steerable running wheels moves on the line toward the middle position between the right and left running-driving wheels according to increase of the manipulated degree of the steering operation device. The common lateral turning center of both the steerable running wheels moves so as to coincide with a turning center of the vehicle caused by differential rotation of the running-driving wheels moving on the line.

The steering mechanism may include a hydraulic power steering device. The hydraulic power steering device may rotate the drive gears.

These and other objects of the invention will become more apparent in the detailed description and examples which follow.

DETAILED DESCRIPTION OF THE INVENTION

An axle driving/steering unit 10 of the present invention can make its left and right running-driving wheels different in their rotary speeds that a vehicle using it turns leftward and rightward. Driving/steering unit 10 comprises a first running hydrostatic transmission (to be herein after called "a main driving HST") 21 including a hydraulic pump and motor fluidly connected with each other, a second steering hydrostatic transmission (to be herein after called "a steering HST") 22 including a hydraulic pump and motor fluidly connected with each other, a steering differential unit (a second differential unit) 23 for steering the vehicle, and a running differential unit (first differential unit) 24 for running-driving the vehicle. Differential units 23 and 24 are either of a type as a combination of planetary gears and bevel gears or of a type as a combination of a pair of differential gears.

Figure 1:
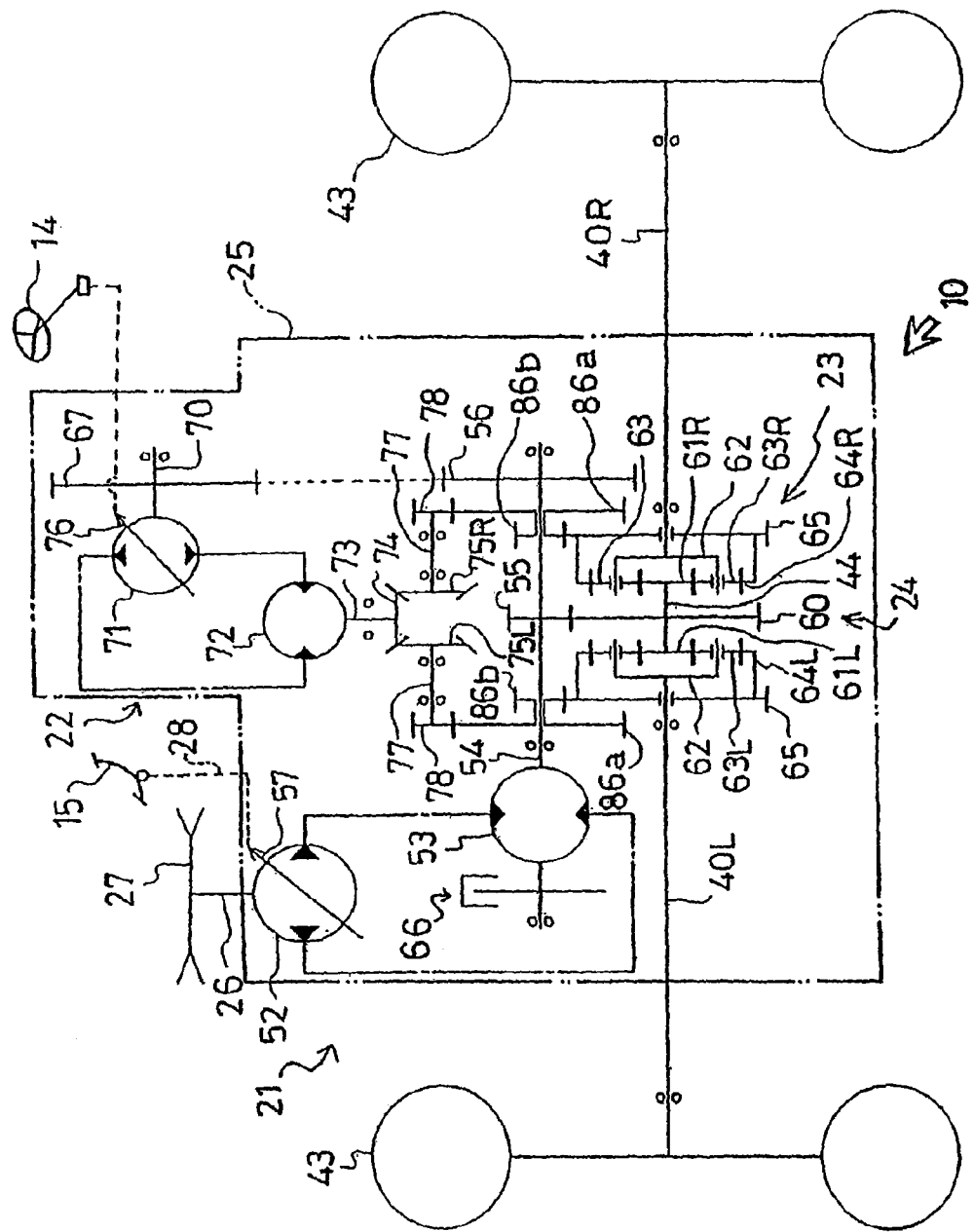
FIG. 1 is a schematic diagram of an axle driving/steering unit 10 for the present invention.

Referring to FIG. 1 showing axle driving/steering unit 10 using planetary gears and bevel gears, main driving HST 21 comprises a variable displacement hydraulic pump 52 and a fixed displacement hydraulic motor 53, as is well-known. An input shaft 26 as a pump shaft of hydraulic pump 52 projects from a housing 25 and a driving force is transmitted from an engine 11 through a belt 30 to an input pulley 27 provided on input shaft 26 (refer to FIGS. 3-20 showing various embodiments of a multi-axle vehicle having axle driving/steering unit 10, except for some figures from which engine 11, belt 30 and the like are omitted for convenience).

Hydraulic pump 52 and hydraulic motor 53 are fluidly connected with each other by a closed circuit formed in a center section.

A movable swash plate 57, used as means for changing a discharge amount and a discharge direction of hydraulic oil from hydraulic pump 52, is connected with a control shaft. The control shaft is connected through a connecting means 28 like an arm or a link disposed outside housing 25 with a speed change operation means like a lever or a pedal (in this embodiment, a speed change pedal 15) provided on a vehicle. Speed change pedal 15 is pivotally supported at the center thereof onto the vehicle body. When pedal 15 is trod at the front portion, the vehicle runs forwardly and is accelerated in proportion to its treading amount. When speed change pedal 15 is trod at rear portion, the vehicle is driven rearwardly.

Speed change pedal 15 is rotated to tilt movable swash plate 57 so as to change the discharge direction and discharge amount of hydraulic oil from hydraulic pump 52, thereby changing the running speed.

Pressure oil from hydraulic pump 52 is sent to hydraulic motor 53 through an oil passage in the center section so as to drive a motor shaft 54. A braking unit 66 is disposed on one side of motor shaft 54, which is an output shaft of hydraulic motor 53. Onto the other side of motor shaft 54 are fixed a running-driving gear 55 and a steering power take-off gear 56. Running-driving gear 55 engages with a center gear 60 fixed onto a shaft 44 disposed between driving axles 40L and 40R and coaxially therewith. On both sides of shaft 44 are fixed sun gears 61L and 61R, which engage at the outer peripheries thereof with planetary gears 63 pivotally supported onto carriers 62 fixed to the inner ends of running-driving axles 40L and 40R. Internal gears 64L and 64R engage with planetary gears 63 around sun gears 61L and 61R. Large diameter gears 65 integrally fixed with internal gears 64L and 64R are freely fitted onto running-driving shafts 40L and 40R outside carriers 62. Thus, running differential unit 24 of a running-driving system is constructed.

Steering power take-off gear 56 engages with an input gear 67 for steering HST 22, input gear 67 being fixed on an input shaft 70 serving as a pump shaft for a hydraulic pump 71 of steering HST 22. Steering HST 22 comprises a variable displacement hydraulic pump 71 and a fixed displacement hydraulic motor 72 and is mounted onto the center section fixed into housing 25. Both pump 71 and motor 72 are fluidly connected with each other through oil passages in the center section. A movable swash plate 76 of hydraulic pump 71 is interlockingly connected through an arm 139 and a connection link 160 (refer to FIGS. 3-20) with a steering wheel 14 serving as a steering operation means provided on the vehicle, and tilts correspondingly to a rotation of steering wheel 14. Movable swash plate 76 tilts to change the discharge direction and discharge amount of pressure oil from hydraulic pump 71 so as to enable motor shaft 73 of hydraulic motor 72 to be changed in the direction and number of rotations thereof.

A bevel gear 74 is fixed at the upper end of motor shaft 73 of hydraulic motor 72. A pair of side bevel gears 75L and 75R, disposed opposite to each other, engage with bevel gear 74 so as to be rotated reversely to each other. Small diameter gears 78 are fixed onto the outer ends of a pair of steering output shafts 77 on which side bevel gears 75L and 75R are fixedly supported, and engage with large diameter gears 86a of twin gears 86 free-fitted onto motor shaft 54. Small diameter gears 86b of twin gears 86 engage with large diameter gears 65, respectively, so as to transmit the driving force to steering differential unit 23.

In the above-mentioned construction, input shaft 26 is always driven in the state that engine 11 is driven. When steering wheel 14 is put in the straight forward running direction, steering HST 22 is in neutral and motor shaft 73 of hydraulic motor 72 is not driven, so that speed change pedal 15 is trod at the front or the rear to turn movable swash plate 57 for hydraulic pump 52 of main driving HST 21, thereby driving hydraulic motor 53, whereby left and right running-driving axles 40L and 40R are driven at equal rotational speed through motor shaft 54, running-driving gear 55, center gear 60 and running differential unit 24, and the vehicle is straight forwardly or rearwardly driven. In the state of forwardly or rearwardly driving, hydraulic pump 71 of steering HST 22 is driven from motor shaft 54 through gears 56 and 67 in proportion to the running speed, thereby enabling the steering feeling corresponding thereto to be obtained by the operation as described later.

When steering wheel 14 is rotated in the straight forward running state, movable swash plate 76 of steering HST 22 is turned to drive hydraulic motor 72.

For example, when steering wheel 14 is rightwardly turned, hydraulic pump 71 is actuated so as to drive hydraulic motor 72, so that the driving force from motor shaft 73 is transmitted to left and right side bevel gears 75L and 75R through bevel gear 74 in a manner that one of side bevel gears 75L and 75R is normally rotated and the other is reversely rotated at equal rotational speed, and furthermore the driving force is transmitted to internal gears 64L and 64R through small diameter gears 78 and twin gears 86. The speed of normal rotation of internal gear 64L is added to that of normal revolution of planetary gears 63L normally rotating around sun gear 61L and the speed of reverse rotation of internal gear 64R is deducted from that of normal revolution of planetary gears 63R around sun gear 61R.

Thus, keeping the driving state of both running-driving axles 40L and 40R, the rotational speed of driving axle 40L becomes larger than that of driving axle 40R, thereby rightwardly turning the course of the vehicle.

A discharge amount of oil from hydraulic pump 71 increases accordingly as the turning angle of steering wheel 14 becomes larger, and correspondingly, the rotary speed of hydraulic motor 72 increases in a stepless manner, so that a difference of rotary speeds between left and right running-driving axles 40L and 40R gradually increases, thereby enabling the vehicle to be turned further in a smaller radius.

Conversely, when steering wheel 14 is leftwardly turned, movable swash plate 76 of steering HST 22 is tilted in the reverse direction to the above-mentioned, whereby the output rotation direction of hydraulic motor 72 becomes reversed so as to leftwardly turn the vehicle in the reverse direction to the above-mentioned case.

In a case when speed change pedal 15 is trod at the rear to rearwardly drive the vehicle, speed change pedal 15 is rearwardly turned to turn movable swash plate 57 reversely to the above-mentioned so as to rotate motor shaft 54 reversely to its rotational direction for forward movement, thereby driving the vehicle rearwardly. In the case of rearwardly running of the vehicle, when steering wheel 14 is rightwardly rotated to tilt movable swash plate 76, hydraulic motor 72 and motor shaft 73 are rotated reversely to their rotational direction in the same case when the vehicle runs forwardly because of the reverse rotation of input shaft 70 of steering hydraulic pump 71. Thus, left side bevel gear 75L is rotated reversely so that its rotary speed is added to the speed of the reverse revolution of left planetary gears 63L, and right side bevel gear 75R is rotated normally so that its rotary speed is deducted from the speed of reverse revolution of right planetary gears 63R, whereby the vehicle can rightwardly turn while rearwardly moving. Conversely, the vehicle, while rearwardly moving, can be turned leftwardly by rotating steering wheel 14 leftwardly.

Accordingly, the vehicle, even when rearwardly driven, can turn corresponding to the rotating direction of steering wheel 14 so as to be driven in the same feeling as an automobile. When speed change pedal 15 is in a neutral position, i.e., when the vehicle stops, hydraulic motor 53 is not driven, whereby steering hydraulic pump 71 is not driven, so that, even when steering wheel 14 is rotated, hydraulic motor 72 is not driven and the vehicle does not travel. Hence, even when the operator who gets in and out of a driver's seat in the vehicle touches steering wheel 14, the vehicle remains stationary, thereby ensuring safety.

Figure 2:
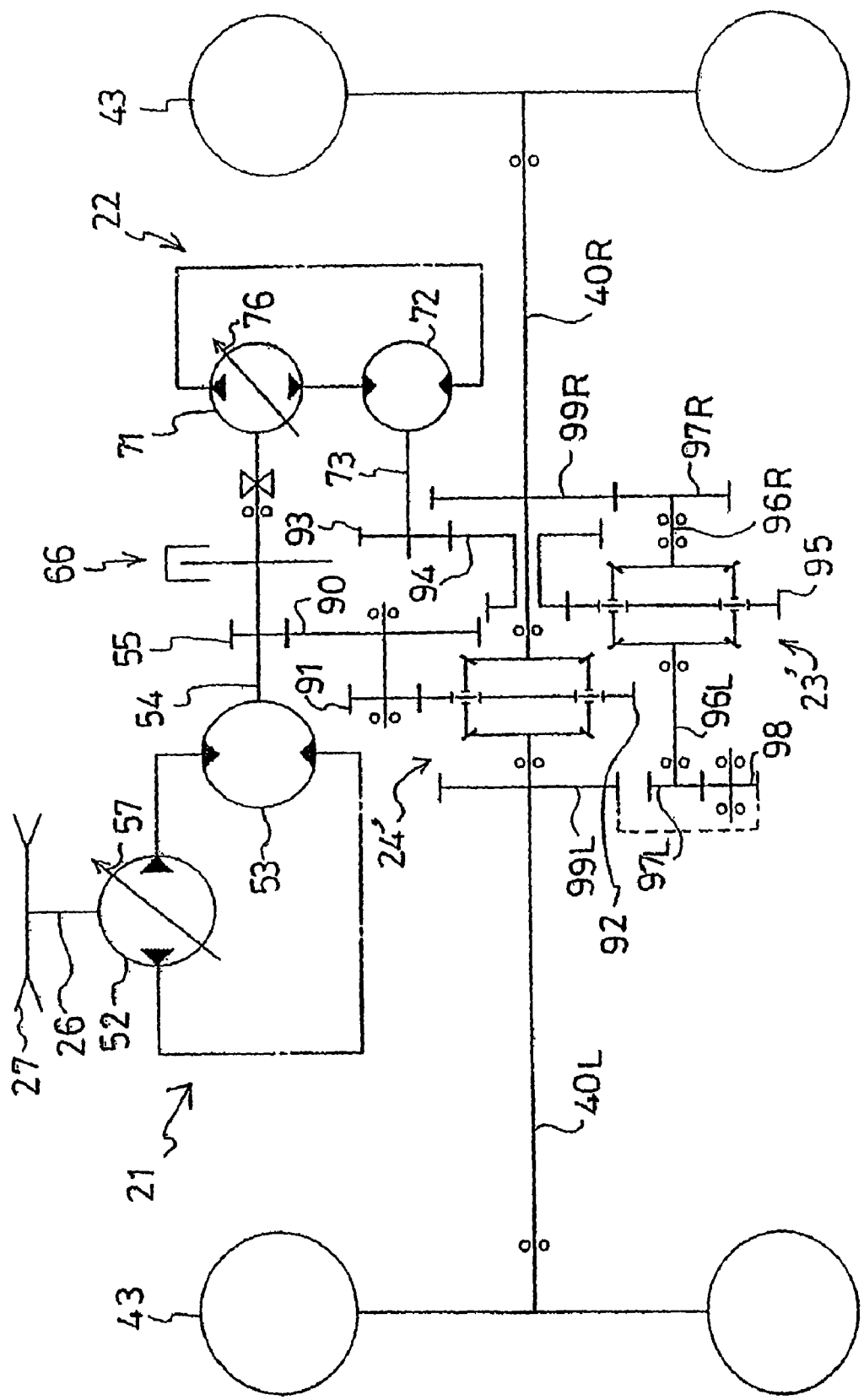
FIG. 2 is a schematic diagram showing a modified embodiment of axle driving/steering unit 10 of FIG. 1.

The steering differential unit and the running differential unit may, as shown in FIG. 2, both comprise differential gears. In this case, the input shaft of steering HST 22 is directly connected onto motor shaft 54 of main driving HST 21, and running-driving gear 55 fixed onto motor shaft 54 transmits the driving force to differential ring gear 92 of running differential unit 24' through gears 90 and 91. On motor shaft 73 of steering HST 22 is fixed a spur gear 93, from which the driving force is transmitted to differential ring gear 95 of a steering differential unit 23' through twin gears 94 fitted on right running-driving axle 40R. On the one hand, the driving force is transmitted through a reversing gear 98 from a left differential output gear 97L fixed onto left steering output shaft 96L of steering differential unit 23' to a gear 99L fixed onto left running-driving axle 40L, and on the other hand, the driving force is transmitted from a right differential output gear 97R fixed onto a right steering output shaft 96R of steering differential unit 23' to a gear 99R fixed onto right running-driving axle 40R.

Thus, as the same as above-mentioned, when steering wheel 14 is rightwardly turned, the normally rotational driving force is transmitted to left gear 99L, and when steering wheel 14 is leftwardly turned, the normal rotational driving force is transmitted to right gear 99R.

However, it is possible to transmit the driving force by sprockets and chains instead of gears 97L, 97R and 99L, 99R. Also, it is possible that main driving HST 21 and running differential unit 24' are housed in one housing so as to be interlockingly connected, steering HST 22 and steering differential unit 23' are housed in another housing so as to be interlockingly connected, and the output rotation from steering differential unit 23' is laterally and reversely transmitted to the output shafts (driving axles 40L and 40R) of running differential unit 24'.

Figure 3:
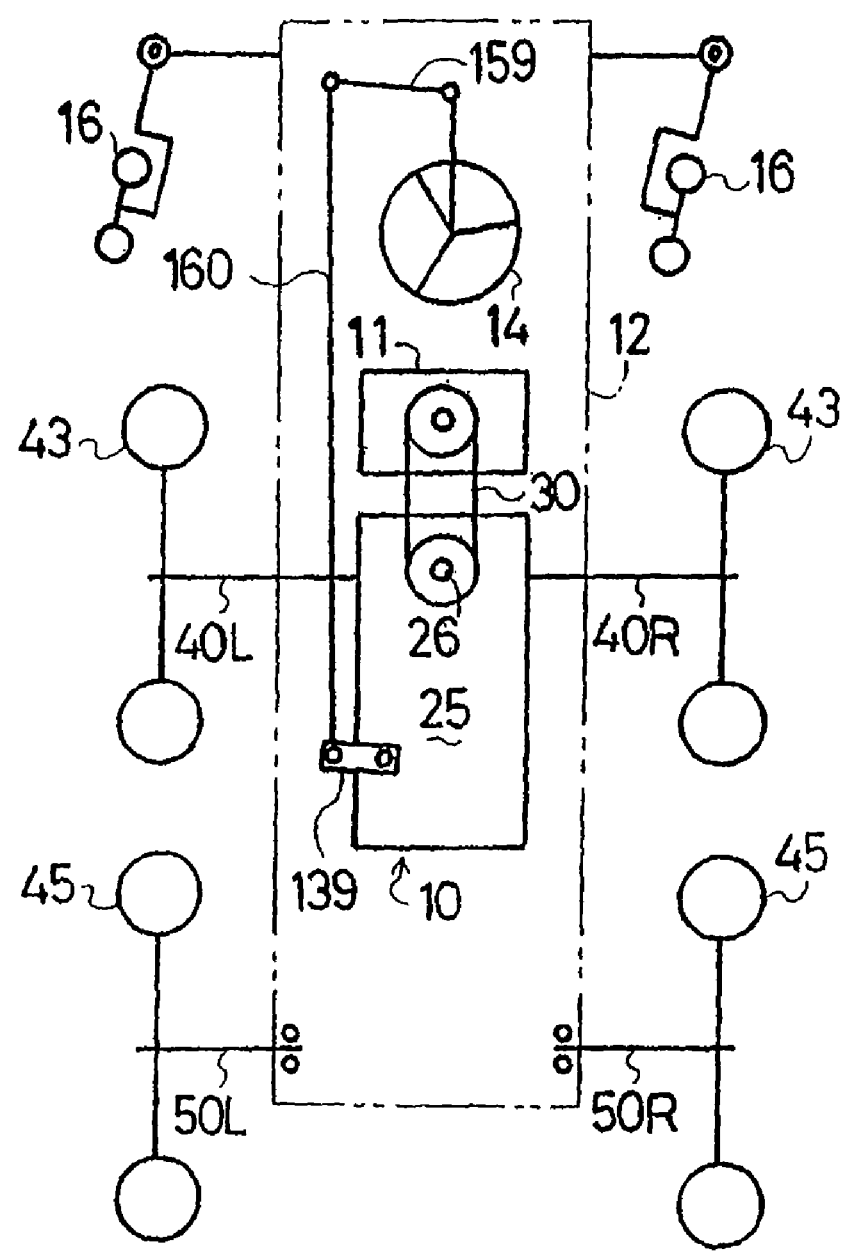
FIG. 3 is a schematic view of a six-wheel vehicle having first wheels 43 driven by axle driving/steering unit 10, castors 16 and third wheels 45 as a multi-axle vehicle according to the present invention.

For application of axle driving/steering unit 10 to a vehicle, as shown in FIG. 3 and others, running-driving axles 40L and 40R are journalled by a vehicle chassis 12. Firstly, as shown in FIG. 1 and others, a pair of first running wheels 43 are fixed onto outer ends of respective axles 40L and 40R. As shown in FIG. 3 and others, the steering operation means (steering wheel 14) is connected to an arm 139 for rotating movable swash plate 76 of steering HST 22 through gears in a steering gear box (not shown), a pitman arm 159 and a connection link 160. In the gear box are housed reduction gears of conventional rack-and-pinion type or worm gear type, for converting the rotational motion of steering wheel 14 into linear motion of pitman arm 159.

To further reduce the turning radius of a vehicle including running-driving wheels which can be differentially driven by axle driving/steering system 10 interlocked with the steering operation tool (steering wheel 14), at least one castor, for example, may be additionally provided on the vehicle before or behind first running wheels 43 for serving as a second running wheel which is laterally turned into the running direction of the vehicle. In each of FIGS. 3 and 4, a pair of castors 16 are provided. In FIG. 3, castors 16 are disposed before first running wheels 43, and in FIG. 4, they are behind first running wheels 43.

However, when the vehicle parks on a slope along the contour line thereof, the vehicle's weight acts to turn the castors in the tilting direction, whereby the vehicle body tilts down forwardly.

Figure 4:
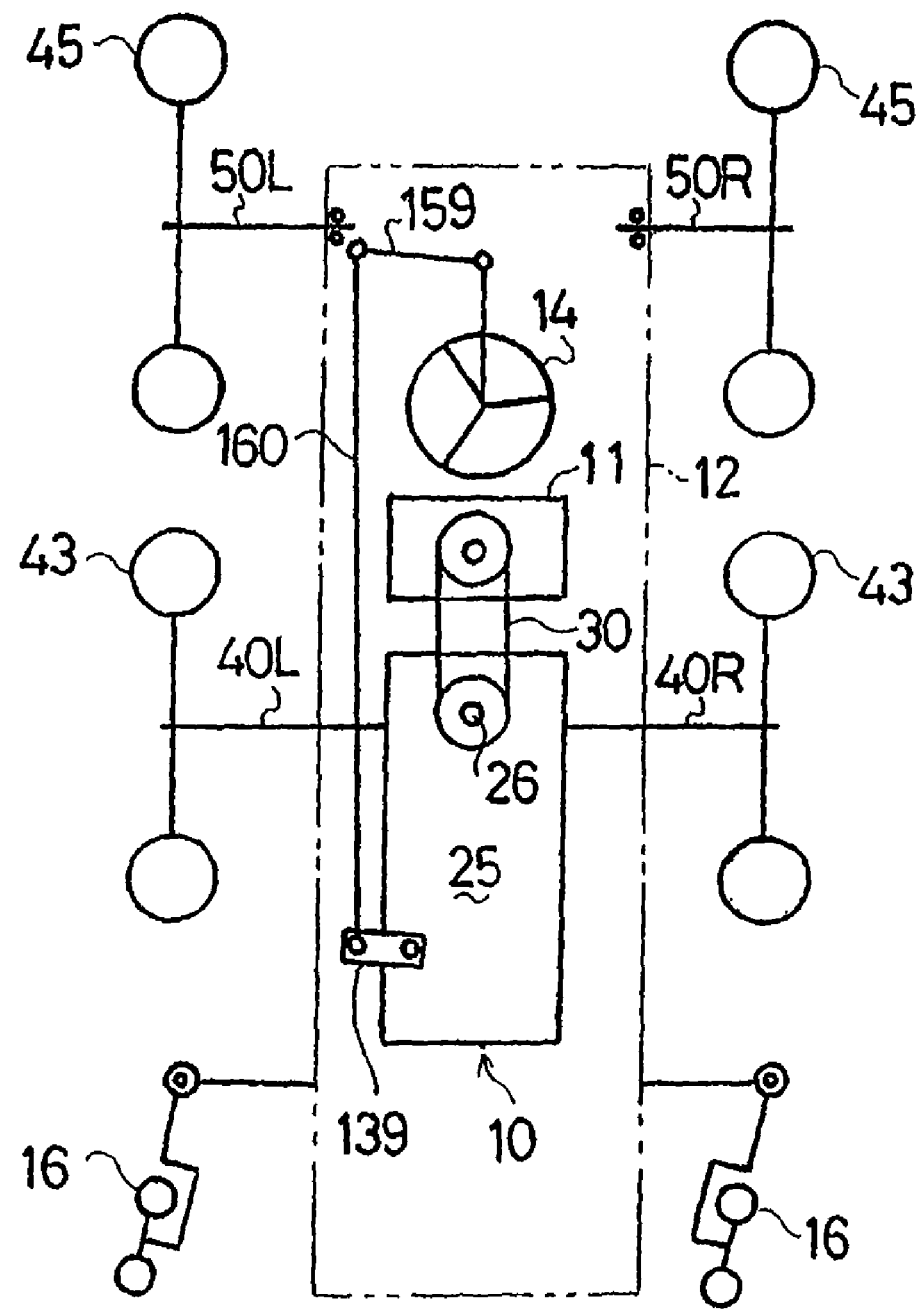
FIG. 4 is a schematic view of the six-wheel vehicle of FIG. 3, wherein castors 16 and third wheels 45 are exchanged with each other.

Therefore, in each of FIGS. 3 and 4, for increasing the gripping force against the ground surface, in addition to castors 16, a pair of third running wheels 45 are fixed onto outer ends of respective second axles 50L and 50R journalled by vehicle chassis 12 in parallel to running-driving axles 43 and either before or behind first running wheels 43. Incidentally, castors 16 are disposed oppositely to third running wheels 45 with respect to first running wheels 43. In FIG. 3, third running wheels 45 are behind first running wheels 43, and in FIG. 4, they are in front of first running wheels 43.

Accordingly, the vehicle of each of FIGS. 3 and 4 is a six-wheel vehicle, wherein the pair of castors 16 are laterally turned into the running direction of the vehicle in addition to the difference of rotary speed between left and right first running wheels 43 during the steering of the vehicle so as to further reduce the turning radius of the vehicle, and on the other hand, the pair of third wheels 46 are provided so as to increase the traveling stability of the vehicle.

However, the castor is hard to be viewed by the operator because it is disposed under a floor of the vehicle, and the castor is independent of steering wheel 14, whereby, in the state where the vehicle stops, it is difficult to distinguish which direction the castors are in.

For example, in a case when the castor stops while leftwardly turning, then the vehicle starts while steering wheel 14 is rightwardly turned, the castors may instantaneously be turned from the left side to the right side, whereby the vehicle, for a moment, moves in the direction of a letter S, resulting in the operator being misguided.

In order to solve the problem, steerable running wheels whose lateral turning depends upon the manipulation of steering wheel 14 may be provided.

Figure 5:
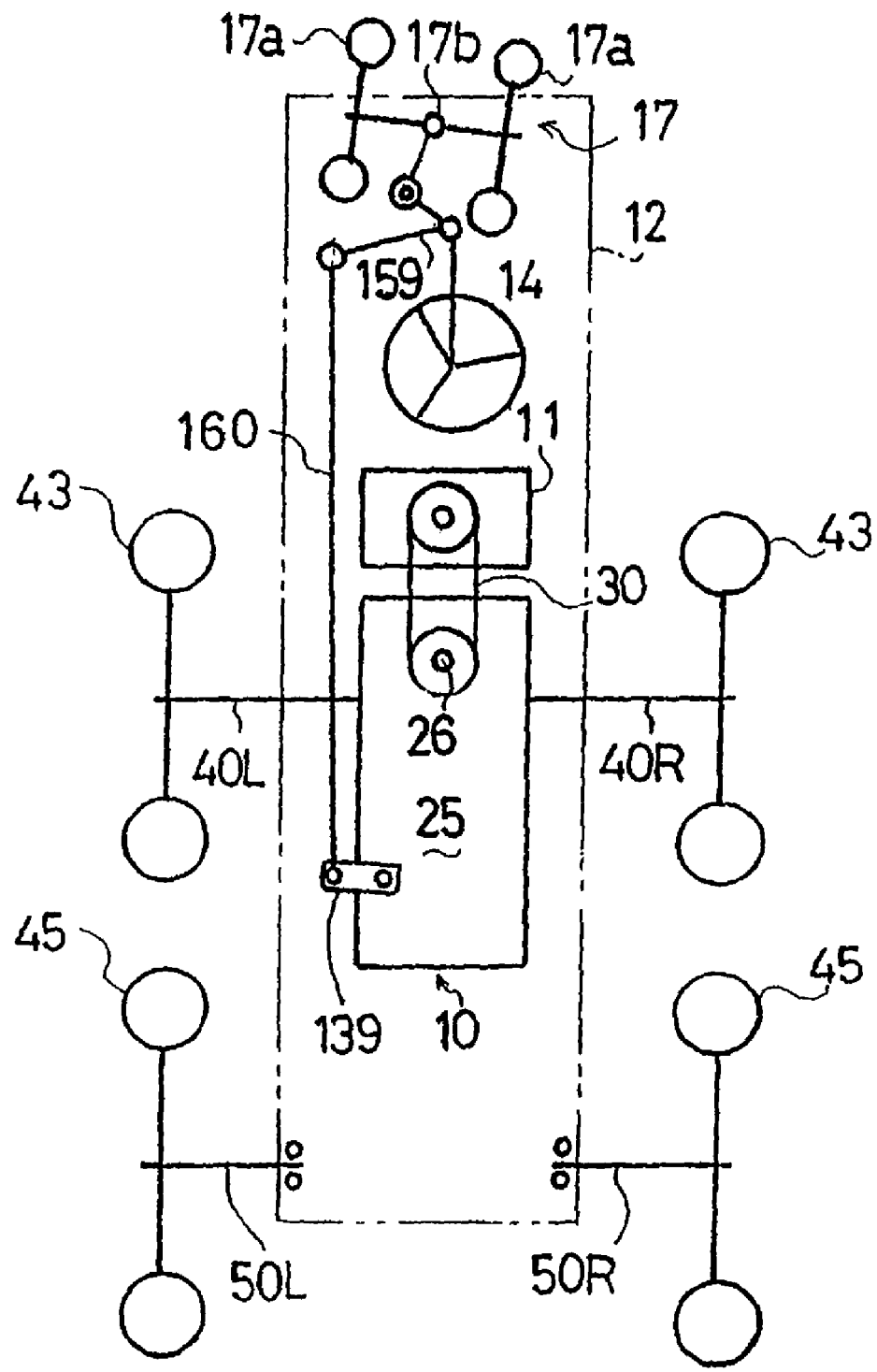
FIG. 5 is a schematic view of the six-wheel vehicle of FIG. 3, wherein steerable running wheel structure 17 replaces castors 16.

Referring to FIG. 5, instead of castors 16, a steerable running wheel structure 17 is disposed in the lateral middle of the front portion of the vehicle of FIG. 3. The steerable running wheel structure 17 comprises a pair of steerable running wheels 17a and a lateral-rotation pivot 17b arranged between the pair of steerable running wheels 17a, similarly with the structure of a nose landing gear of a long-range jet. Lateral-rotation pivot 17b is connected with steering wheel 14 through a linkage, an actuator and the like so as to be rotated by the manipulation of steering wheel 14, thereby laterally turning the pair of steerable running wheels 17a. This structure is advantageous in reduction of the turning radius similarly with a single castor 16 provided on the lateral middle portion of the vehicle. However, the pair of steerable running wheels 17a have a greater gripping force than the single castor 16.

Furthermore, the direction of steerable running wheels 17a can be recognized by viewing the position of steering wheel 14, thereby solving the above problem.

Figure 6:
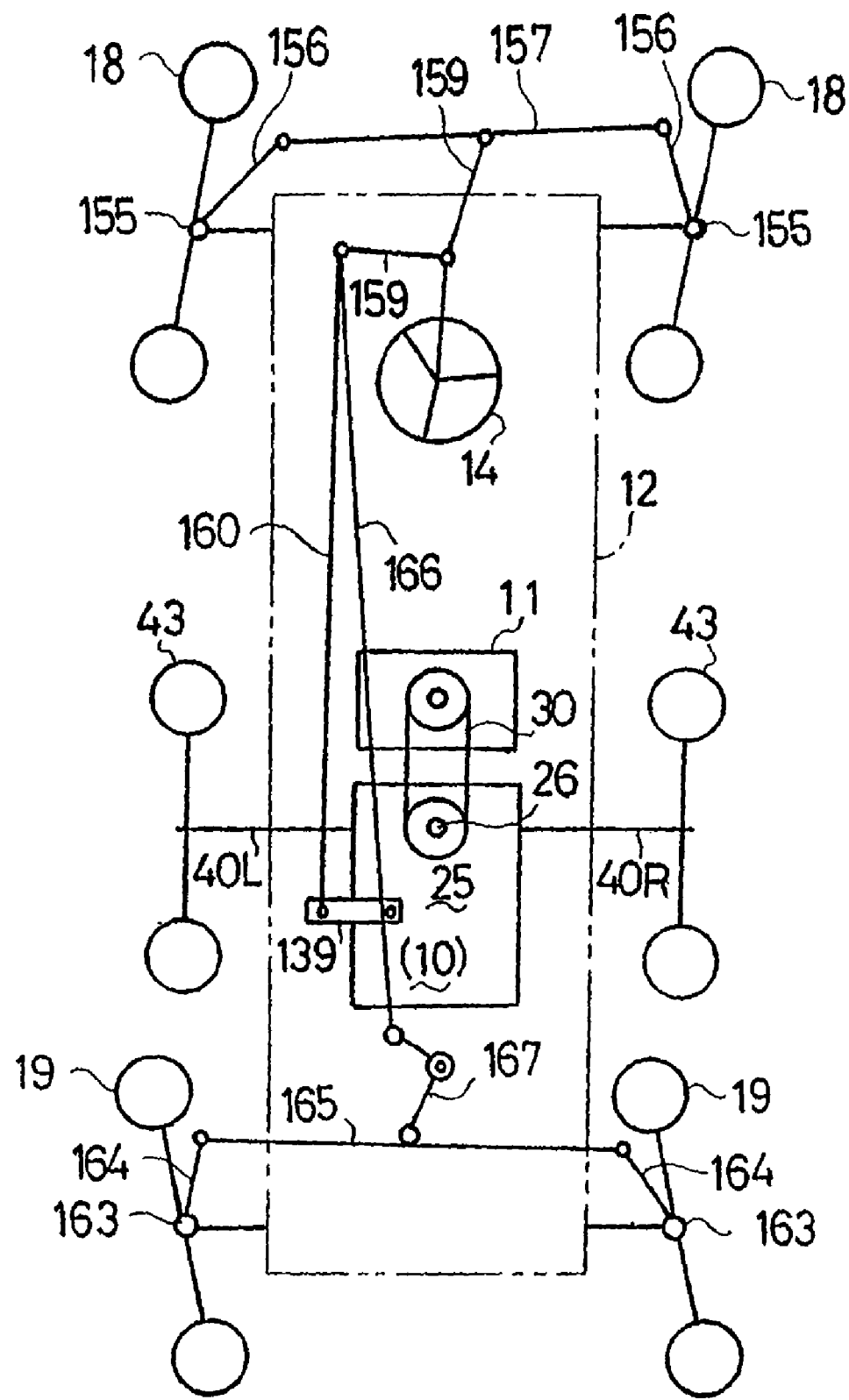
FIG. 6 is a schematic view of a six-wheel vehicle having first wheels 43 and two pair of steerable running wheels 18 and 19.

It is ordinary that a pair of steerable running wheels 18 which are laterally turned by manipulation of steering wheel 14 are disposed before the pair of first running wheels 43. Referring to FIG. 6, a pair of steerable running wheels 19 are additionally arranged behind first running wheels 43.

Front steerable running wheels 18 are supported to king pins 156 in vehicle chassis 12 before axle driving/steering unit 10, knuckle arms 156 are fixed to king pins 155, and left and right knuckle arms 156 are pivotally connected with each other through a tie rod 157. Tie rod 157 is connected to one end of pitman arm 159, and the other end thereof is connected in interlocking with a stem of steering wheel 14 through a gear.

Rear steerable running wheels 19 are supported onto king pins 163 rotatably supported onto vehicle chassis 12. Knuckle arms 164 are fixed to king pins 163 and pivotally connected with each other through a tie rod 165. Tie rod 165 is connected to pitman arm 159 through a bell crank arm 167 and a connecting link 166.

Knuckle arms 156 and 164 and tie rods 157 and 165, when steering wheel 14 is fully turned, tilt at about 80° in this embodiment.

Preferably, rear steerable running wheels 19 are laterally turned in the lateral opposite direction of the laterally turned front steerable running wheels 18.

Next, description will be given on various embodiments of a vehicle wherein the driving force of running-driving axles 40L and 40R is transmitted to other running wheels.

Figure 7:
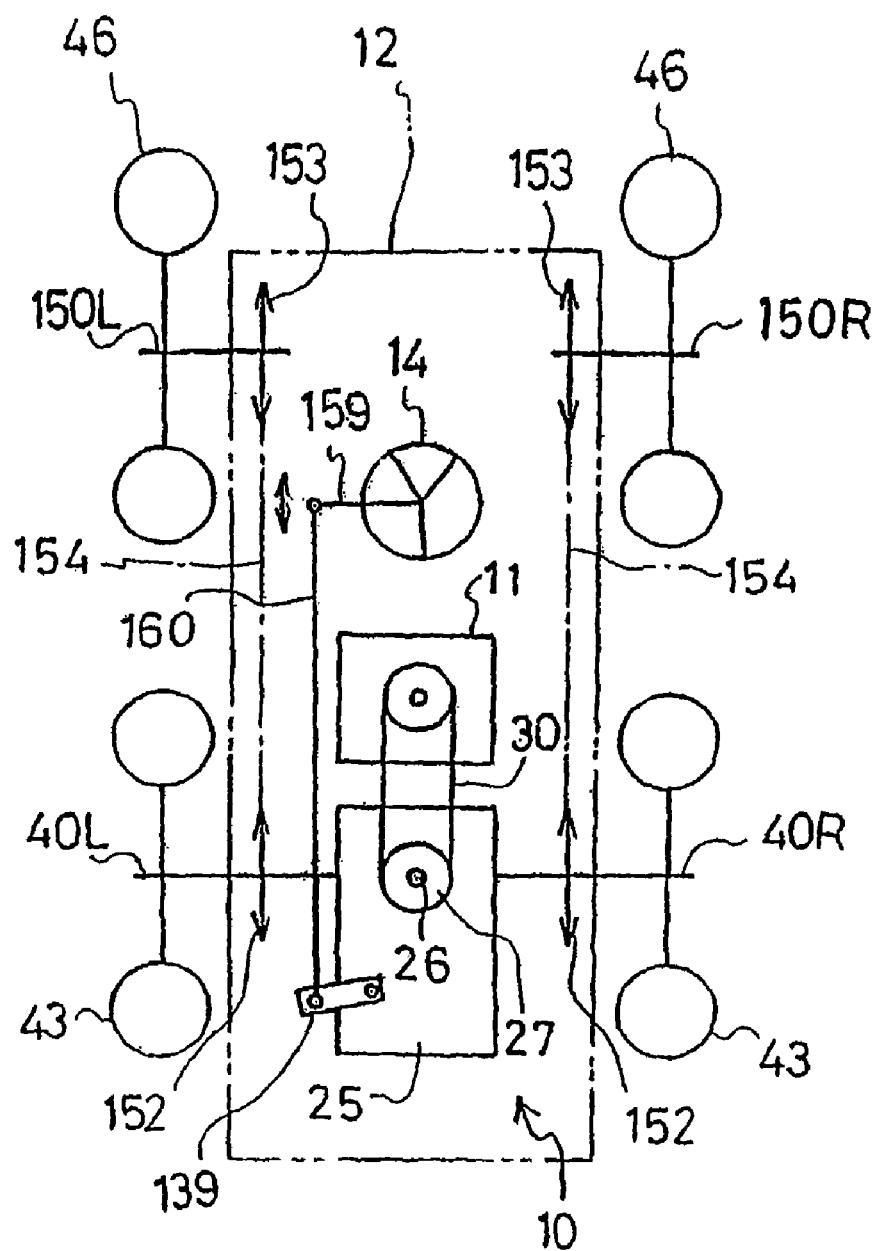
FIG. 7 is a schematic view of a four-wheel vehicle as a preferred embodiment of a multi-axle vehicle having first drive wheels 43 and second drive wheels 46 drivingly connected with each other.

Referring to FIG. 7, a pair of left and right running-driven axles 150L and 150R as the second axles are rotatably supported by vehicle chassis 12 in parallel to left and right running-driving axles 40L and 40R as axles of first running wheels (first running-driving wheels) 43. A pair of second running-driving wheels 46 are fixed onto outer ends of axles 150L and 150R.

Sprockets (or pulleys) 152 are fixed onto running-driving axles 40L and 40R, and sprockets 153 are fixed onto running-driven axles 150L and 150R, respectively, and a chain (or a belt) 154 is interposed between each sprocket 152 and each sprocket 153 on the same side of the vehicle, so as to drive running-driven axles 150L and 150R in the same direction and at the same rotary speed with running-driving axles 40L and 40R.

In such the construction, a plurality of left and right running wheels (four wheels in the embodiment of FIG. 7) are simultaneously driven in the same direction and in at equal rotational speed while the vehicle is running straight forward. When steering wheel 14 is rotated, running-driving wheels 43 and 46 on the turning side of steering wheel 14 are accelerated, and opposite running-driving wheels 43 and 46 are decelerated, whereby the vehicle turns left or right. Whether the vehicle runs straight or turns, all running wheels 43 and 46 are driven so as to enable the vehicle to run effectively on rough or soft ground. Thus, the construction of this embodiment can be applied to, for example, a skid steering loader, a carrier or an amphibious vehicle. Also, second running-driving wheels 46 are driven synchronously to respective first running-driving wheels 43 so as to prevent wheels 46 from being dragged on the ground, thereby reducing the damage of the ground.

Figure 8:
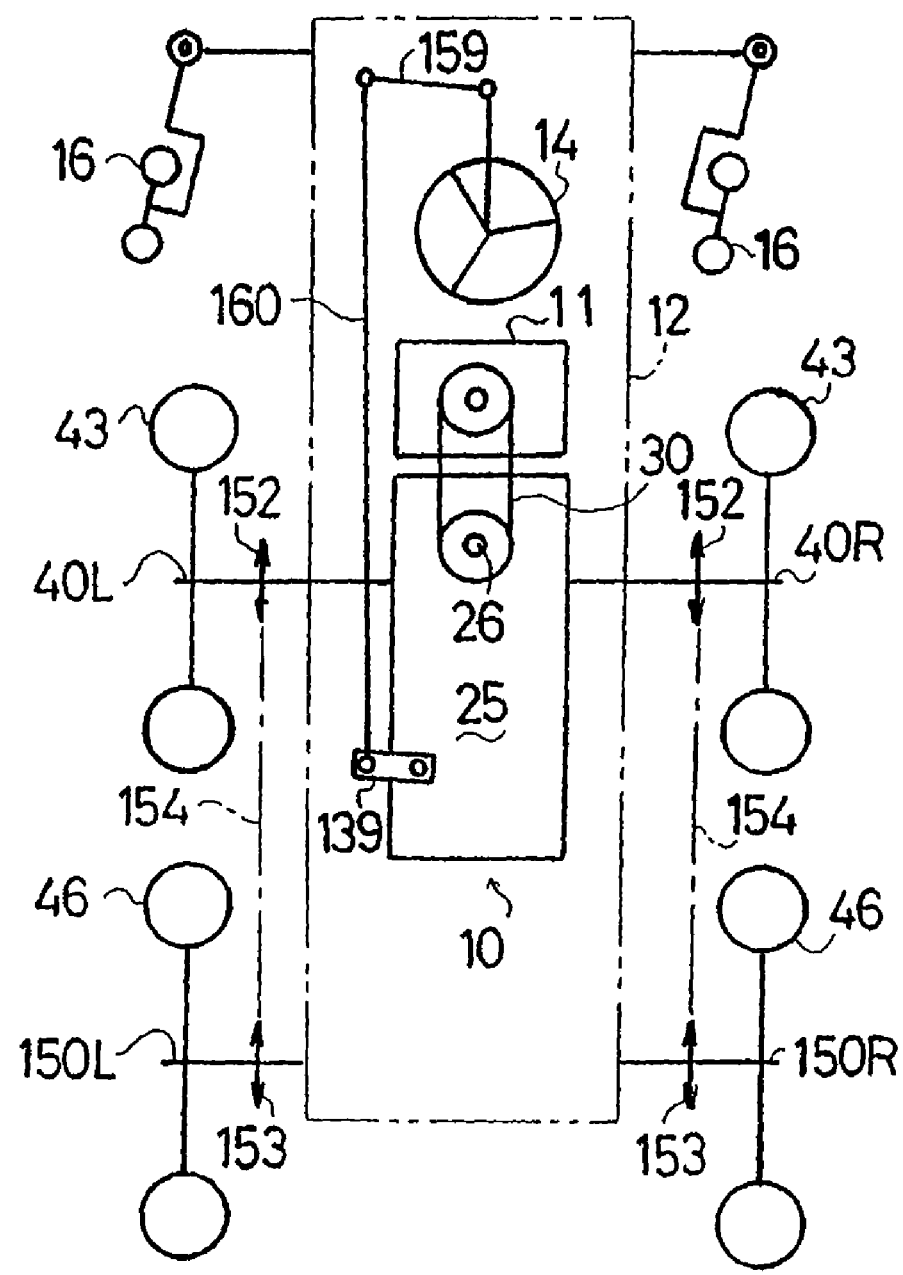
FIG. 8 is a schematic view of a six-wheel vehicle as the vehicle of FIG. 7 further provided with castors 16.
Figure 9:
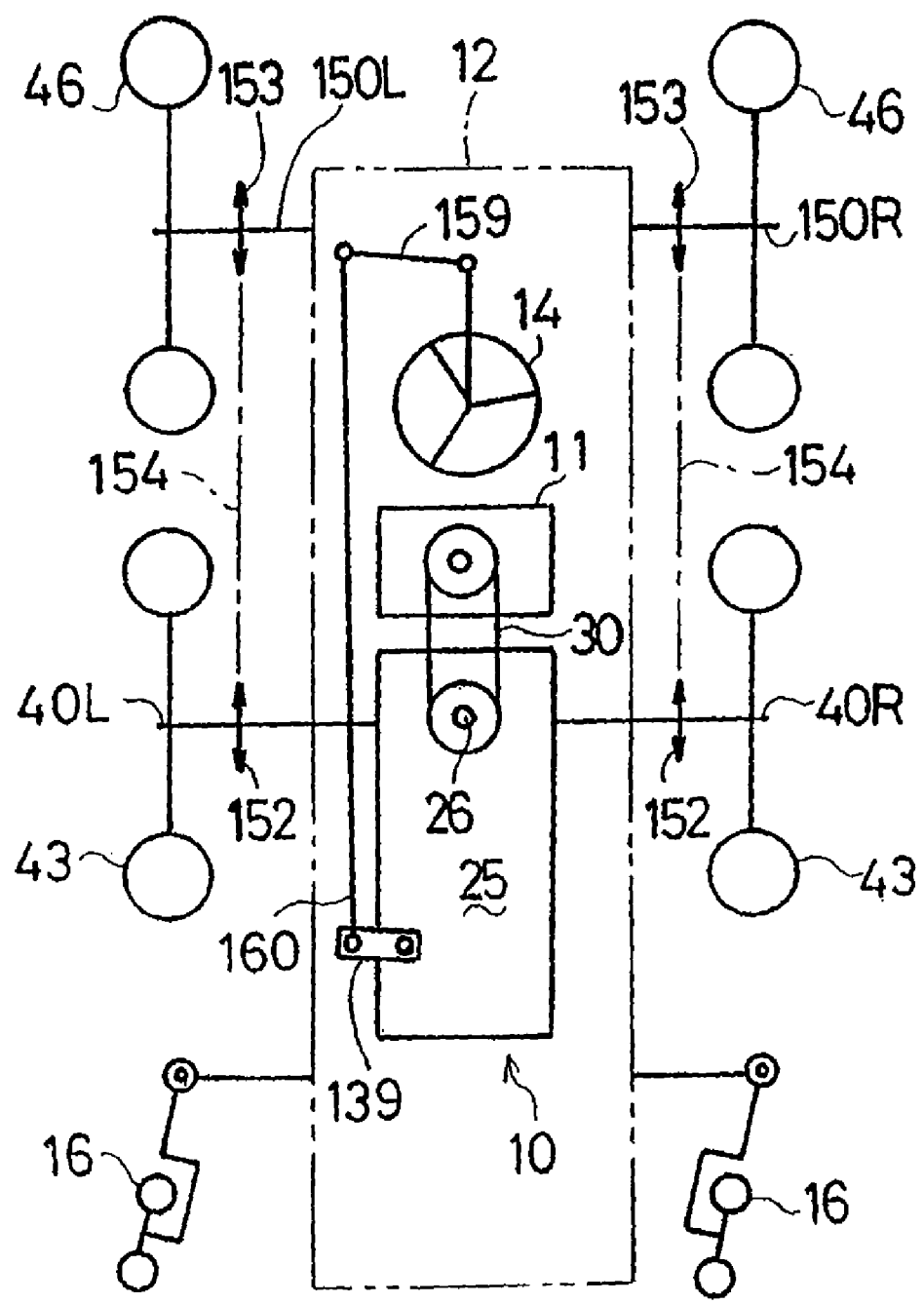
FIG. 9 is a schematic view of the six-wheel vehicle of FIG. 7, wherein castors 16 and third wheels 45 are exchanged with each other.
Figure 10:
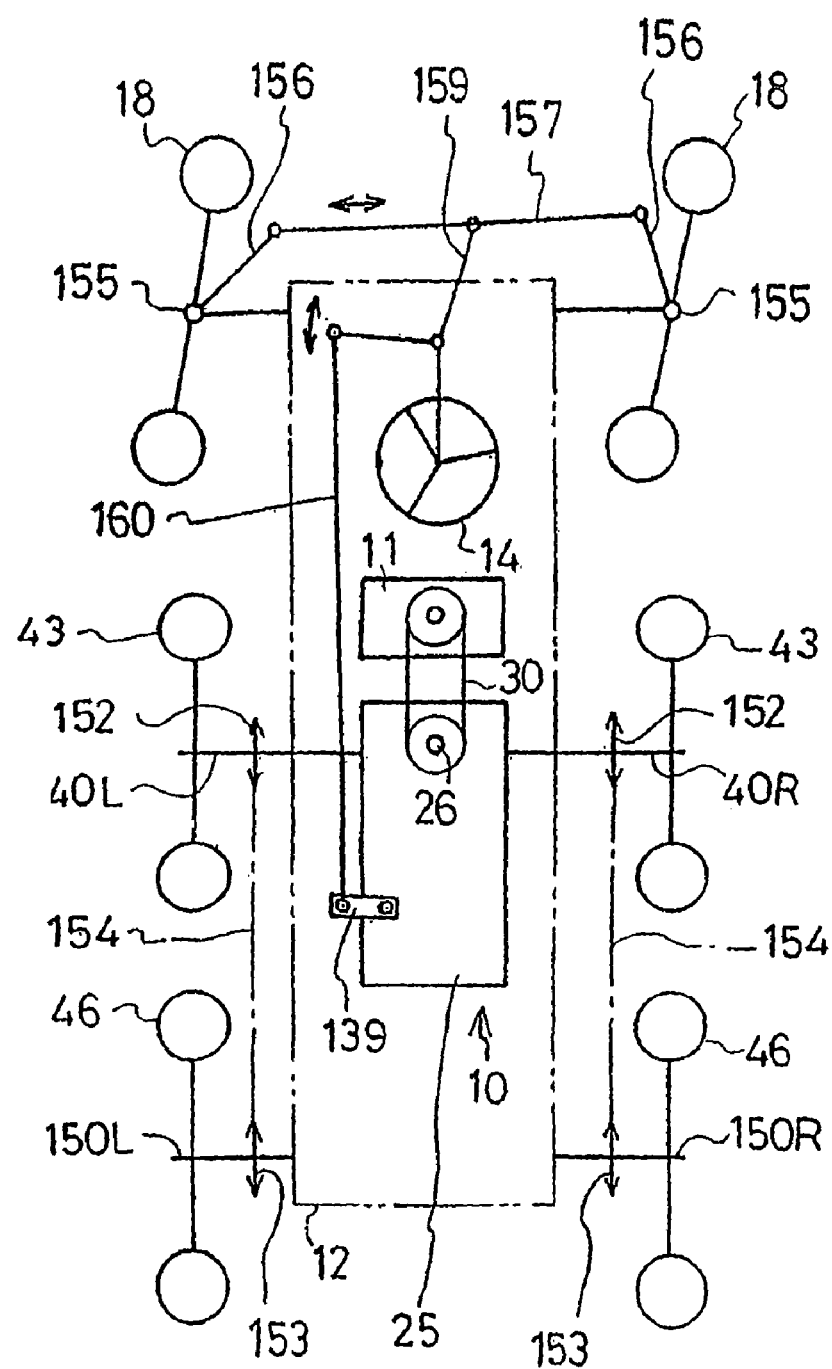
FIG. 10 is a schematic view of the six-wheel vehicle of FIG. 7, wherein steerable running wheels 18 replace castors 16.

Furthermore, each of FIGS. 8-10 shows a six-wheel vehicle additionally provided with a pair of running wheels which are laterally rotated into the running direction of the vehicle during the steering of the vehicle. Referring to FIGS. 8 and 9, castors 16 are provided as such running wheels. In FIGS. 8-10, of the six running wheels, first running-driving wheels 43 are arranged at the longitudinal middle. Castors 16 serving as second running wheels and second running-driving wheels 46 serving as third running wheels are arranged in front of and behind first running-driving wheels 43, respectively in FIG. 8, and behind and in front of wheels 43, respectively, in FIG. 9. Referring to FIG. 10, second running-driving wheels 46 are arranged behind first running-driving wheels 43, and front steerable running wheels 18 turned by steering wheel 14 are in front of first running-driving wheels 43 similarly with FIG. 6.

In such constructions, when steering wheel 14 is rotated, the rotary speed of first and second running-driving wheels 43 and 46 on one lateral side becomes different from that of first and second running-driving wheels 43 and 46 on the other lateral side. Simultaneously, castors 16 or steerable running wheels 18 are laterally turned into the running direction of the vehicle oriented by steering wheel 14. Accordingly, even when a whole length of vehicle body is made larger, the vehicle can smoothly make a small turn. Also, the wheels scarcely cause dragging while the vehicle is turning, thereby enabling the vehicle to turn without roughening a field.

Referring to FIGS. 11-20, the first running wheels attached to outer ends of respective running-driving axles 40L and 40R as output shafts of axle driving/steering unit 10 are steerable driving wheels 47 serving as running-driving wheels and also as steerable running wheels laterally turned by steering wheel 14.

In this regard, steerable driving wheels 47 are supported onto king pins 163 rotatably supported onto vehicle chassis 12. Knuckle arms 164 are fixed to king pins 163 and pivotally connected with each other through a tie rod 165. Tie rod 165 is connected to pitman arm 159 through a bell crank arm 167 and a connecting link 166. Pitman arm 159 is connected to arm 139 for rotating movable swash plate 76 of steering HST 22 through connection link 161 as mentioned above.

Due to such a construction, steering wheel 14 is manipulated (turned leftward or rightward) so as to make the rotary speeds of left and right steerable driving wheels 47 driven by axle driving/steering unit 10 different from each other, and simultaneously to make both steerable driving wheels 47 turn laterally.

Figure 11:
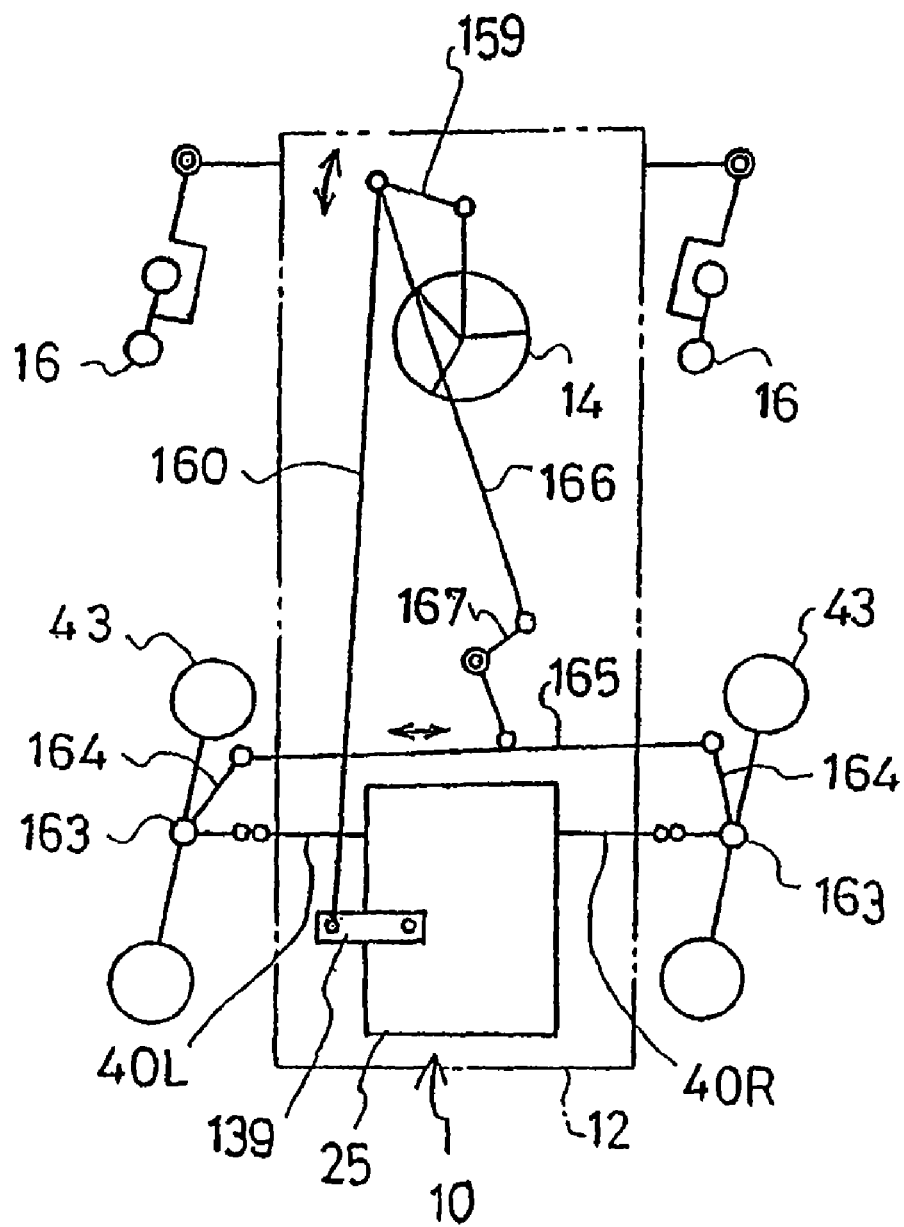
FIG. 11 is a schematic view of a four-wheel vehicle having steerable drive wheels 47 driven by axle driving/steering unit 10 and turned by manipulation of a steering wheel 14, wherein castors 16 are provided.

For an embodiment of a vehicle having such steerable driving wheels 47, firstly, FIG. 11 shows a vehicle having a pair of castors 16 in front of left and right steerable driving wheels 47 so as to be turnable on a small circle.

Figure 12:
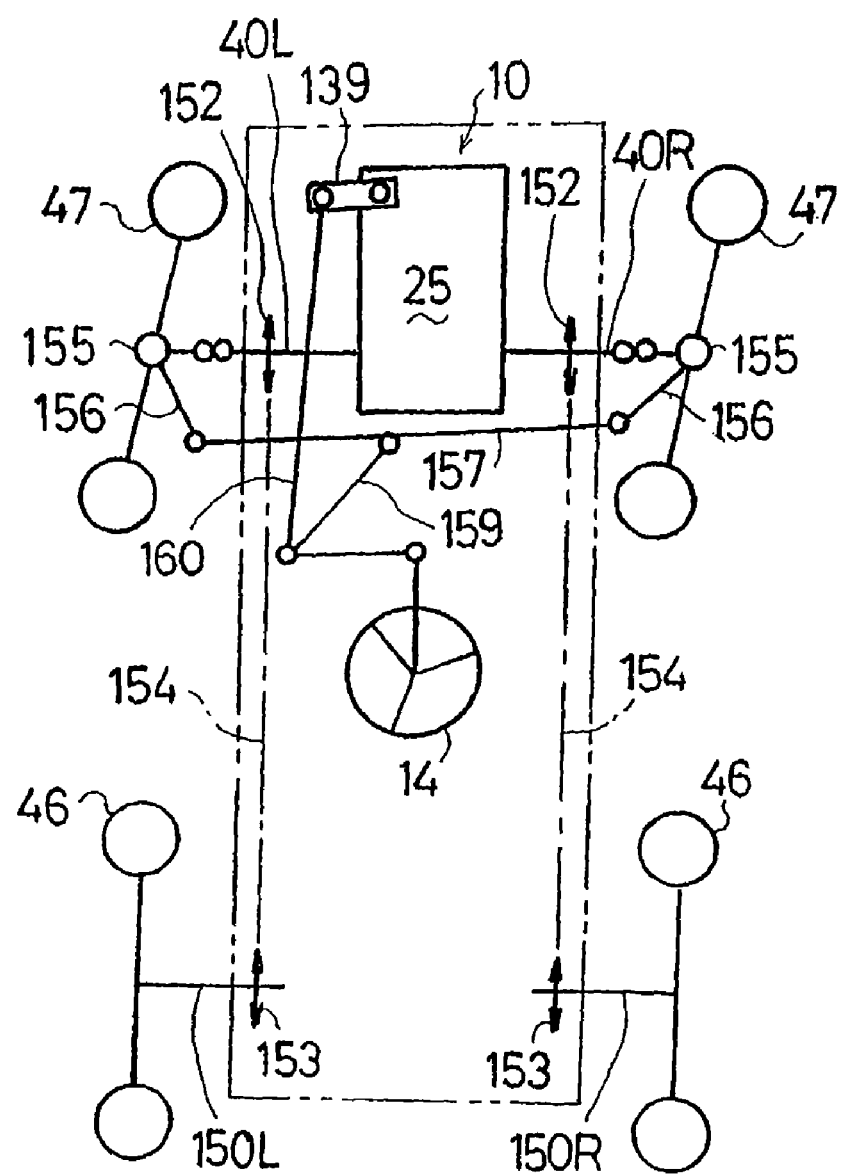
FIG. 12 is a schematic view of a four-wheel vehicle having steerable drive wheels 47, wherein second drive wheels 46 drivingly connected with steerable drive wheels 47 are provided.

The vehicle of FIG. 12 is a four-wheel vehicle having front steerable driving wheels 47 as the first running-driving wheels, and rear second running-driving wheels 46. The driving forces of left and right running-driving axles 40L and 40R onto which steerable driving wheels 47 are attached are transmitted through sprockets 152 and 153 and chains 154 to respective left and right running-driven axles 150L and 150R onto which second running-driving wheels 46.

Figure 13:
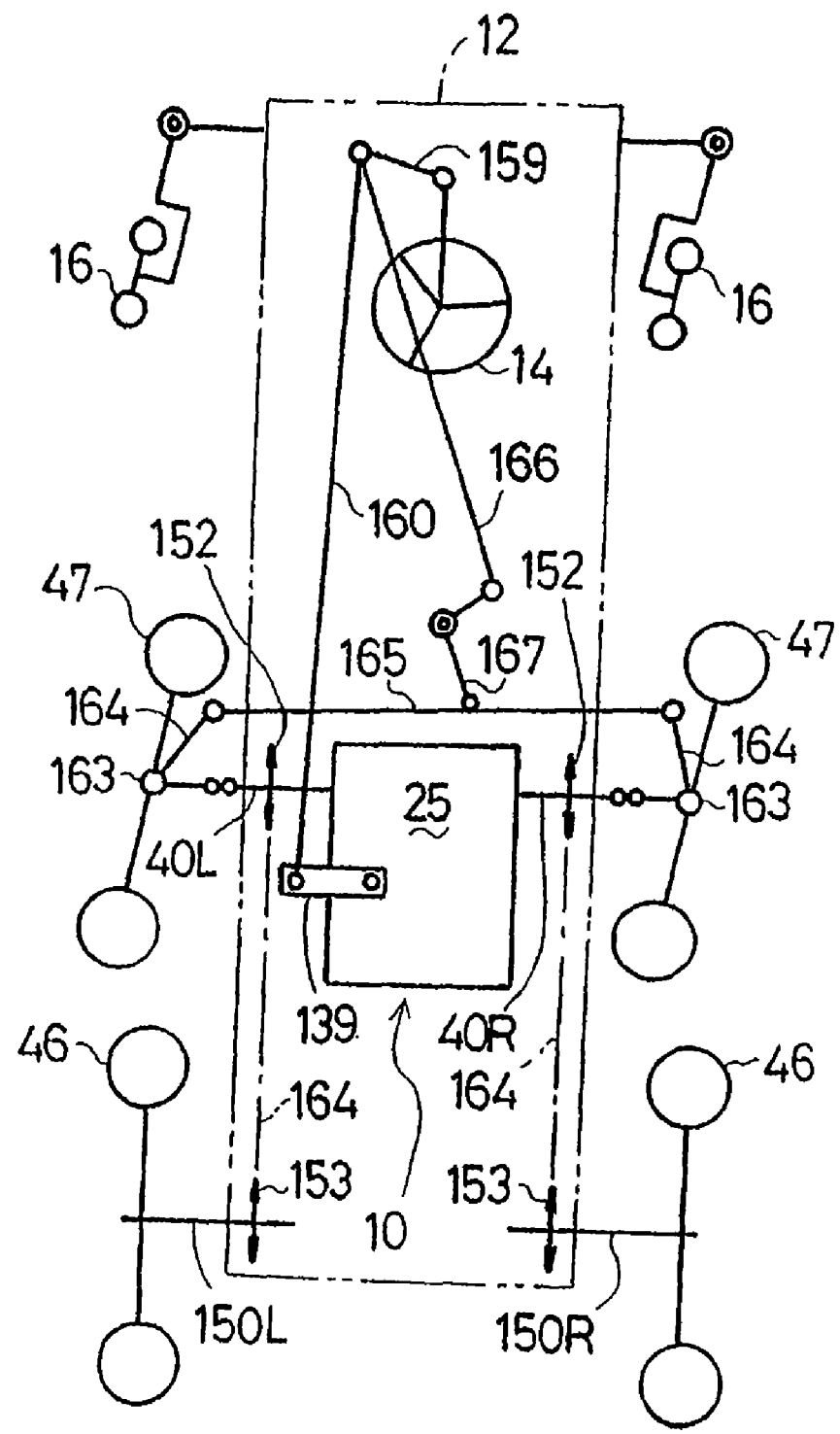
FIG. 13 is a schematic view of a six-wheel vehicle having steerable drive wheels 47 as the vehicle of FIG. 12 further provided with castors 16.

The vehicle of FIG. 13 serves as a combination of both embodiments of FIGS. 11 and 12. In other words, this is a six-wheel vehicle provided with a pair of second running-driving wheels 46, into which the driving forces of steerable driving wheels 47 as the first running-driving wheels, and a pair of castors 16.

FIG. 13 shows that castors 16, steerable driving wheels 47 and second running-driving wheels 46 serve as front wheels, longitudinal middle wheels, and rear wheels, respectively. However, the positional relationship among wheels 16, 47 and 46 in the longitudinal direction of the vehicle is not limited to the embodiment shown.

Figure 14:
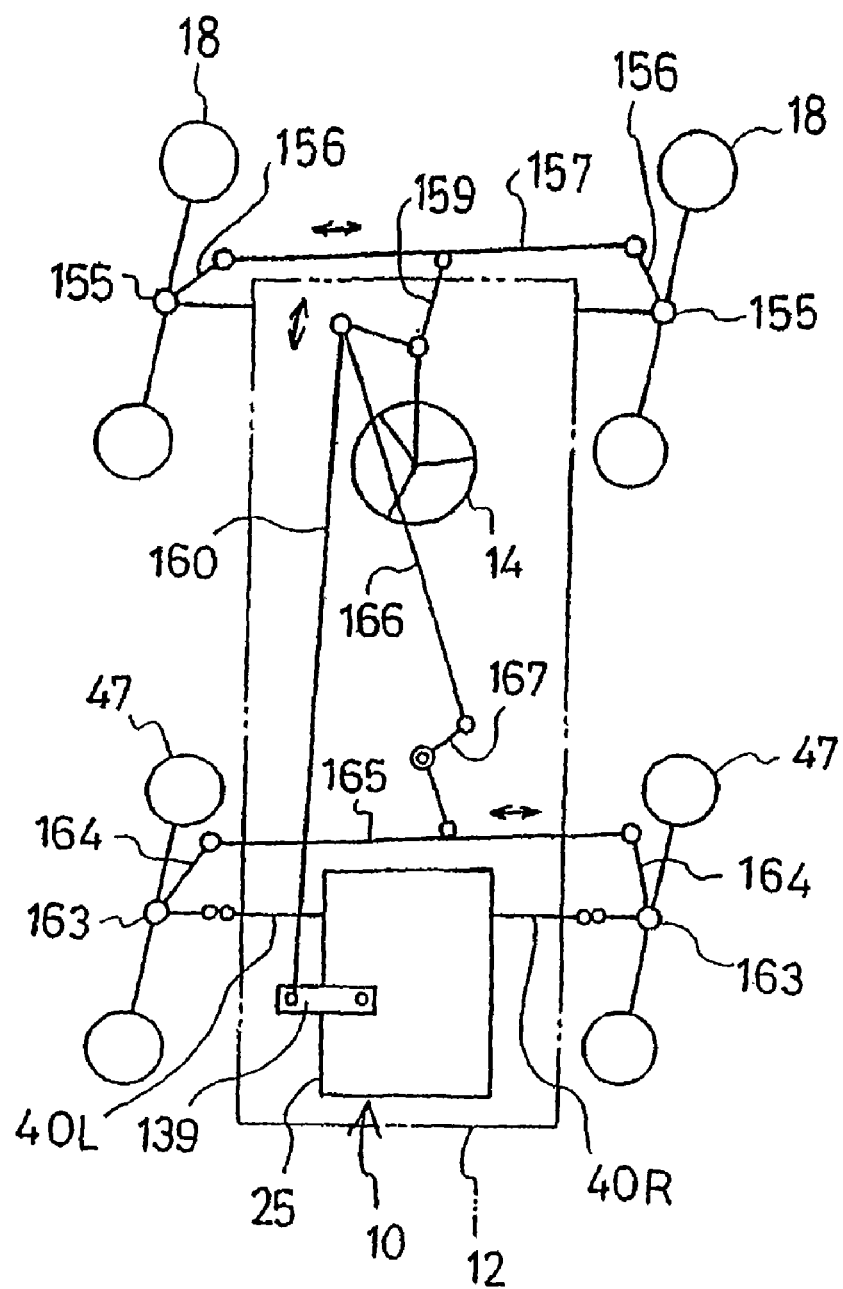
FIG. 14 is a schematic view of a four-wheel vehicle having steerable drive wheels 47, wherein steerable running wheels 18 are provided.
Figure 15:
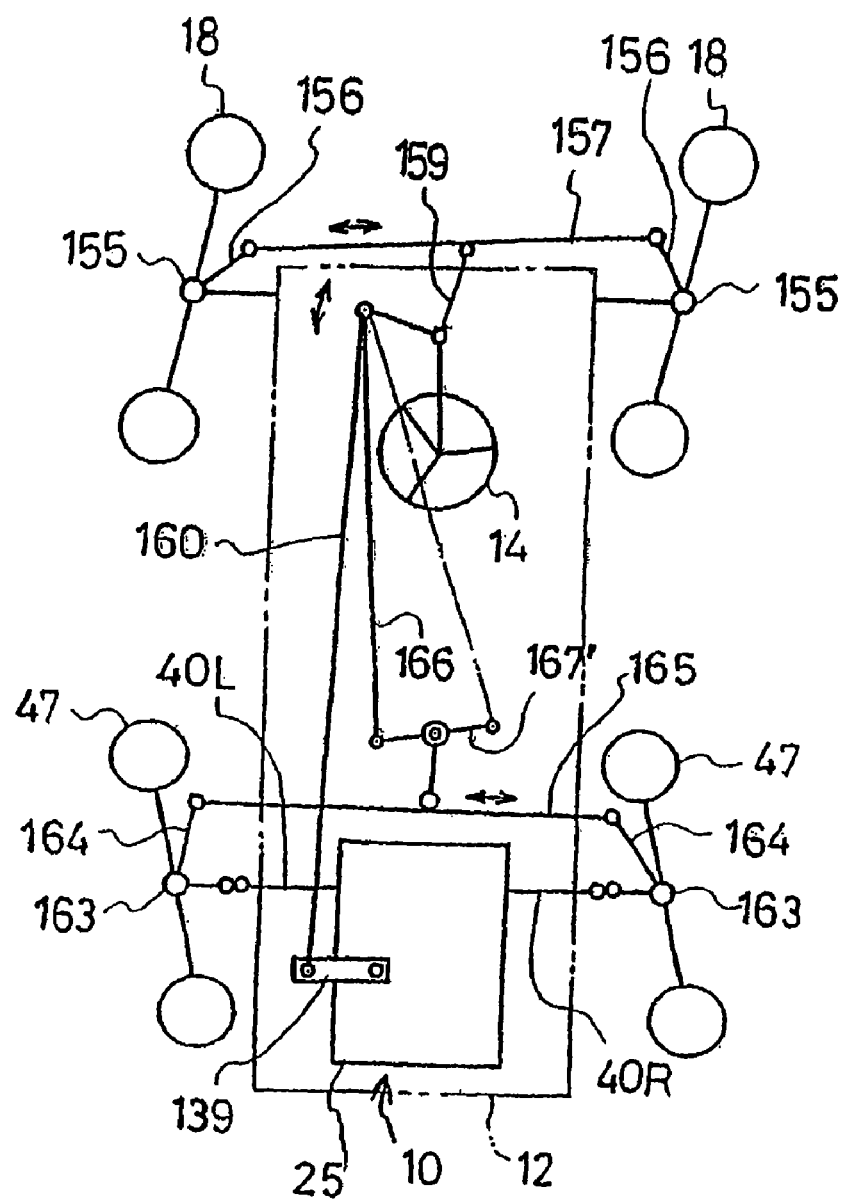
FIG. 15 is a schematic view of a four-wheel vehicle similar with that of FIG. 14, wherein the lateral turning direction of steerable drive wheels 47 in accordance with the manipulation of steering wheel 14 can be switched.

The vehicle of each of FIGS. 14 and 15 is a four-wheel vehicle wherein the pair of steerable driving wheels 47 are rear running wheels, and a pair of left and right steerable running wheels 18 as shown in FIG. 6, which are turned laterally by manipulation of steering wheel 14, are front running wheels.

Referring to FIG. 14, the lateral turning directions of steerable driving wheels 47 and steerable running wheels 18 during the rotation of steering wheel 14 coincide with each other. In FIG. 15, they are opposite, that is, steerable running wheels 18 are turned laterally to the side of rotated steering wheel 14 and steerable driving wheels 47 are turned laterally oppositely to the side of rotated steering wheel 14.

Referring to FIG. 15, a pivotal joint point between a T-like shaped bell crank arm 167' and connection link 166 can be positionally changed so as to change a lateral turning direction of rear steerable driving wheels 47 with respect to the rotating direction of steering wheel 14, according to different running conditions. When the vehicle is to run fast or is to make a turn while keeping its posture in parallel, connection link 166 is disposed along a phantom line shown in FIG. 15 to be connected to arm 167', thereby constituting a linkage which is similar with that consisting of connection link 166 and bell crank arm 167 of the embodiment shown in FIG. 14, so that all front and rear running wheels 18 and 47 can be moved substantially in parallel, whereby the road or field is prevented from being roughened, the turning radius can be diminished and side slip can be prevented. When the vehicle is to make U-turn, for example, while farming on a narrow field, connection link 166 is disposed along a full line shown in FIG. 6 to be connected to arm 167', so that rear steerable driving wheels 47 are turned laterally opposite to the lateral turning direction of front steerable running wheels 18, whereby the vehicle can make a U-turn with a greatly reduced radius without a large rotational degree of steering wheel 14.

It should be noted that, in both the embodiments shown in FIGS. 14 and 15, the lateral turning angles of front and rear running wheels 18 and 47 are determined in correspondence to the difference between the rotary speeds of left and right running-driving axles 40L and 40R driven by axle driving/steering unit 10.

Figure 16:
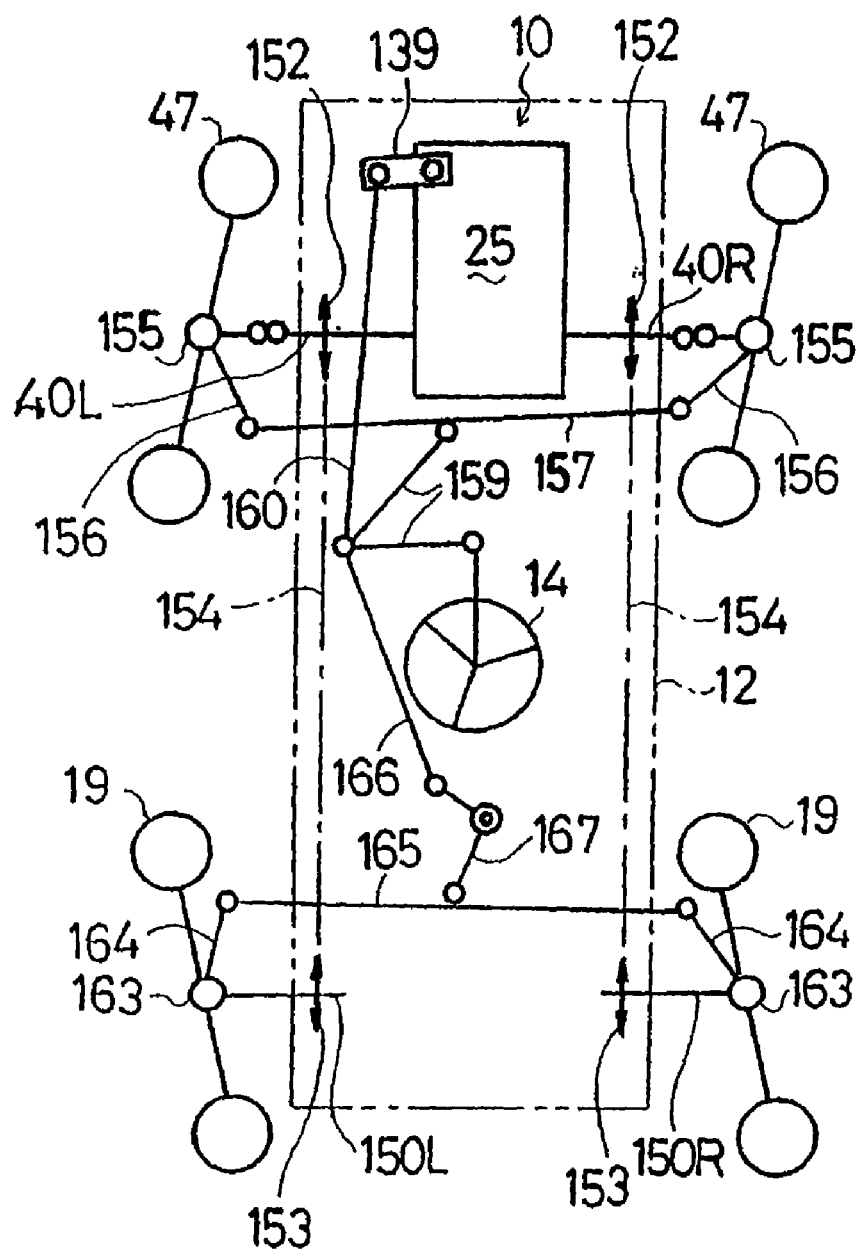
FIG. 16 is a schematic view of a four-wheel vehicle having steerable drive wheels 47, wherein steerable running wheels 19 also serving as second drive wheels 46 are provided.

The vehicle of FIG. 16 is a four-wheel vehicle, wherein the pair of steerable driving wheels 47, which become different from each other in their rotary speeds and are laterally turned during the manipulation of steering wheel 14, serve as front running wheels, and a pair of steerable running wheels 19, which are connected to pitman arm 159 through connection link 166 and so on as shown in FIG. 6, serve as rear running wheels. Additionally, axles of steerable running wheels 19 are running-driven axles 150L and 150R to which driving forces are transmitted from running-driving axles 40L and 40R of steerable driving wheels 47 through sprockets 152 and 153 and chains 154. In brief, steerable running wheels 19 also serve as second running-driving wheels 46.

Accordingly, steering wheel 14 is rotated so as to make all front and rear running wheels 47 and 19 differ in their rotary speeds between left running wheels 47 and 19 and right running wheels 47 and 19, and laterally rotate, whereby the vehicle turns left or right. Preferably, rear steerable running wheels 19 are laterally turned oppositely to the lateral turning direction of front steerable driving wheels 47 which are laterally turned to the side of rotated steering wheel 14 (into the running direction of the vehicle).

Figure 17:
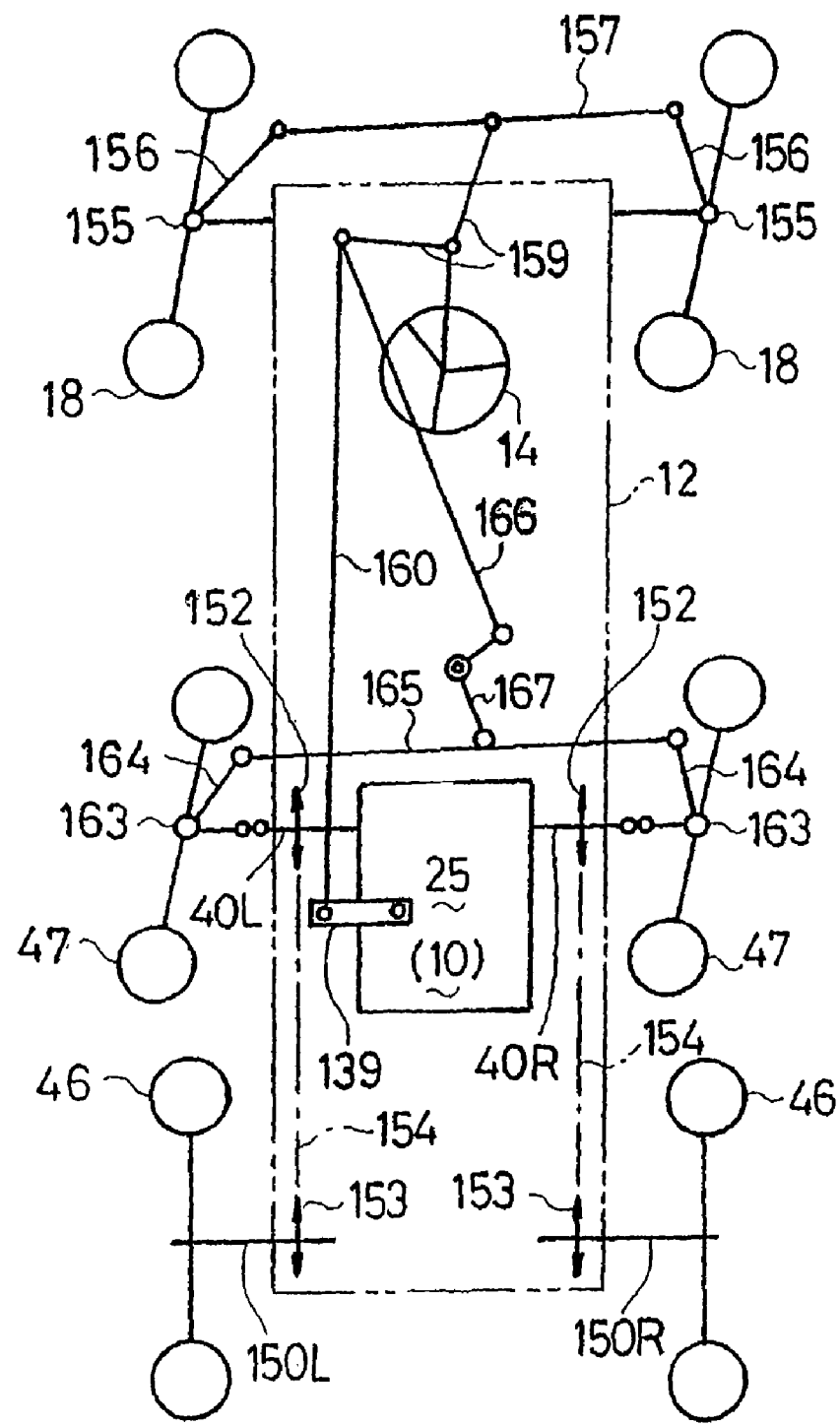
FIG. 17 is a schematic view of a six-wheel vehicle having steerable drive wheels 47, steerable running wheels 18 and second drive wheels 46.

The vehicle of FIG. 17 is a six-wheel vehicle, wherein a pair of second running-driving wheels 46 are provided as rearmost running wheels in addition to four steerable running wheels 18 and 47 arranged as shown in FIG. 14 (in this case, steerable driving wheels 47 are laterally turned oppositely to the lateral turning direction of steerable running wheels 18 during rotation of steering wheel 14). Driving forces are transmitted from running-driving axles 40L and 40R of steerable driving wheels 47 to running-driven axles 150L and 150R of second running-driving wheels 46 through sprockets 152 and 153 and chains 154.

Figure 18:
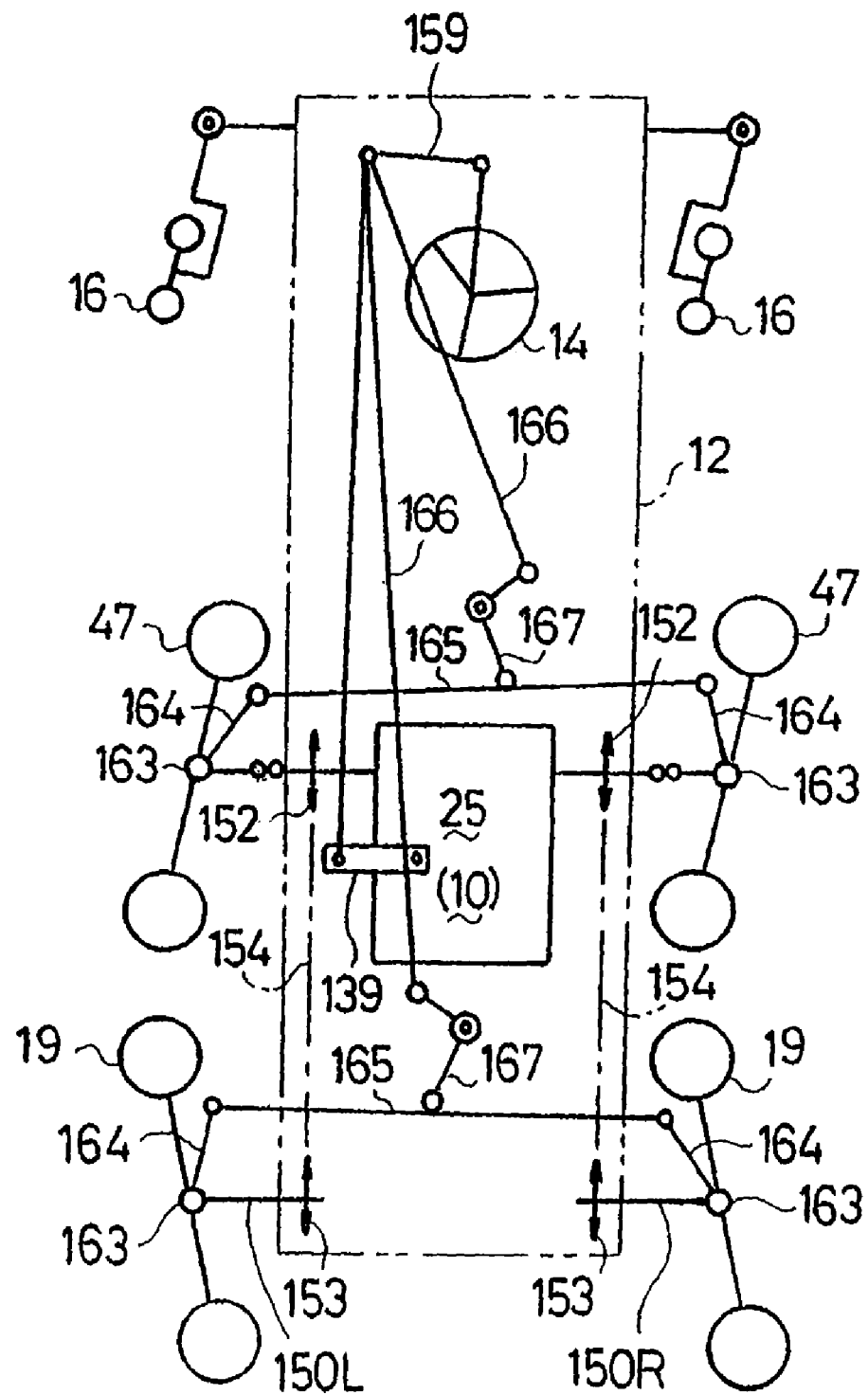
FIG. 18 is a schematic view of a six-wheel vehicle having steerable drive wheels 47, castors 16, and steerable running wheels 19 also serving as second drive wheels 46.
Figure 19:
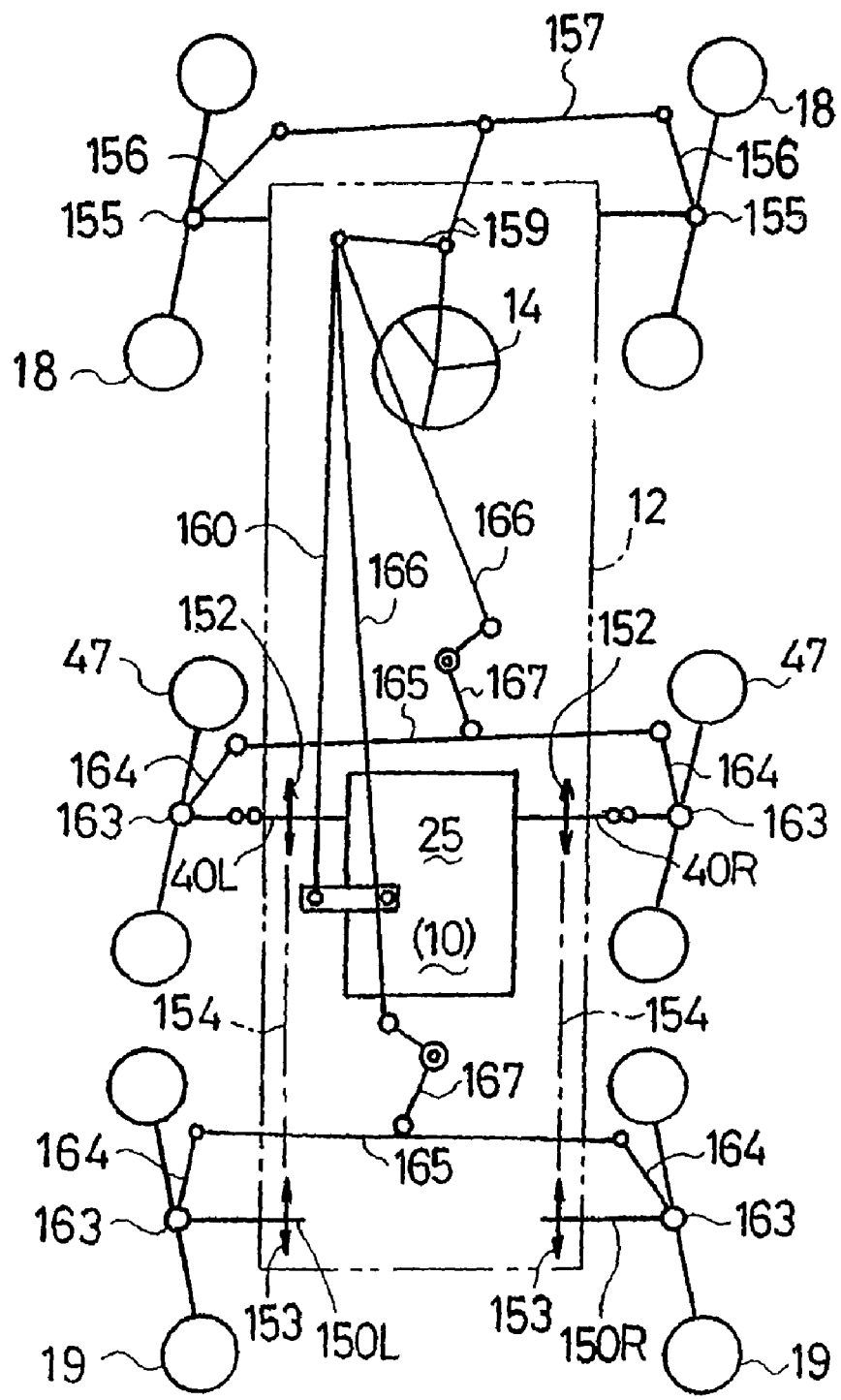
FIG. 19 is a schematic view of the six-wheel vehicle of FIG. 18, wherein steerable running wheels 18 replace castors 16.

The vehicle of each of FIGS. 18 and 19 is a six-wheel vehicle having the arrangement of running wheels 47 and 19 (in this case, steerable running wheels 19 are laterally turned oppositely to the lateral turning direction of steerable driving wheels 47 during rotation of steering wheel 14) as shown in FIG. 16. In addition to running wheels 47 and 19, for serving as frontmost running wheels, the vehicle of FIG. 18 is provided with a pair of castors 16, and the vehicle of FIG. 19 is provided with a pair of steerable running wheels 18 steered by steering wheel 14.

Figure 20:
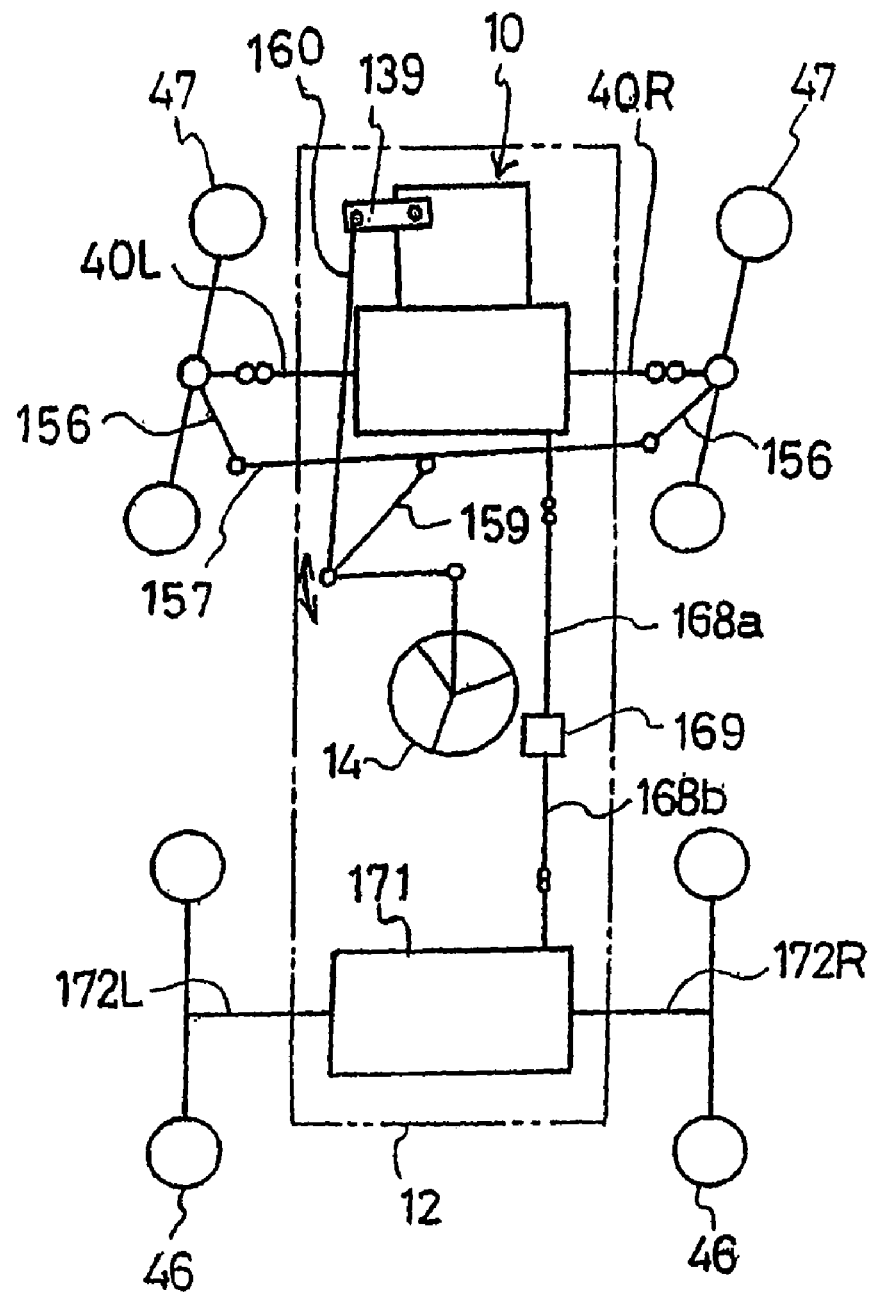
FIG. 20 is a schematic view of a four-wheel vehicle having steerable drive wheels 47 and second drive wheels 46, wherein second drive wheels 46 are drivingly connected with steerable drive wheels 47 through another transmitting structure.

Next, description will be given on a vehicle of FIG. 20 having another transmitting structure interposed between running-driving axles 40L and 40R as output shafts of axle driving/steering unit 10 and another pair of axles.

A pair of left and right running-driven axles 172L and 172R are rotatably supported by vehicle chassis 12 in parallel to left and right running-driving axles 40L and 40R onto which steerable driving wheels 47 are attached (in this case, running-driven axles 172L and 172R are disposed behind running-driving axles 40L and 40R). A differential unit 171 is disposed so as to differentially connect left and right running-driven axles 172L and 172R with each other. Onto the outer ends of running-driven axles 172L and 172R are fixed second running-driving wheels 46. Between motor shaft 54 of main driving HST 21 and an input shaft of differential unit 171 are interposed transmission shafts 168a and 168b in series which are differentially connected with each other through a center differential unit 169, so as to drive second running-driving wheels 46. Steering wheel 14 is operatively connected with arm 139 for turning movable swash plate 76 of steering HST 22 through pitman arm 159 and connection link 160.

In such the construction, when steering wheel 14 is rotated, left and right steerable running wheels 47 serving as front running wheels are turned laterally conforming with a rotational angle of steering wheel 14 and simultaneously, they are given a difference of rotary speed therebetween through steering HST 22 driven by the rotational manipulation of steering wheel 14. Furthermore, second running-driving wheels 46 serving as rear running wheels are driven substantially in synchronism with the driving of steerable driving wheels 47, thereby enabling the vehicle to travel steadily while exactly applying the driving force onto the ground without dragging rear running wheels 43.

Hitherto have been described some embodiments of such a vehicle that steering wheel 14 is so operated as to generate a rotary speed difference between left and right running-driving wheels 43 and to turn steerable running wheels 41 laterally. However, if steering wheel 14 and steerable running wheels 41 are connected to each other through a conventional linkage, lateral turning angles of steerable running wheels are restricted because the tilt angle of tie rod 157 is restricted. As a result, the differential rotation of running-driving wheels 43 cannot be used efficiently, thereby compelling the vehicle to turn on an unexpectedly large circle.

The following steering system and some vehicles employing the steering system, which will be described in accordance with FIGS. 21 to 48, are a preferred solution to this problem.

Description will now be given of a vehicle shown in FIG. 21. Left and right drive axles 40L and 40R are rotatably supported by transmission housing 25 mounted on a longitudinally intermediate portion of vehicle chassis 12, and left and right running-driving wheels 43 (43L and 43R) are fixed onto respective outer ends of drive axles 40L and 40R. Left and right steerable running wheels 41 (41L and 41R) are disposed in front of respective wheels 43. A steering linkage 100 comprises left and right steering gear units 101L and 101R interlocking respective wheels 41 to steering wheel 14. Alternatively, steering linkage 100 and steerable running wheels 41 may be disposed behind transmission housing 25 and running-driving wheels 43.

Steering wheel 14 is connected to a center pivotal joint 69 on an intermediate portion of a tie rod 110 through a steering gear box 68. The movement of tie rod 110 according to rotation of steering wheel 14 is transmitted through link 160 to control lever 139 for rotating movable swash plate 76 of steering HST 22 in transmission housing 25 so as to rotate left and right drive axles 40L and 40R, i.e., first running wheels 43, at different speeds, thereby turning the vehicle.

Figure 22:
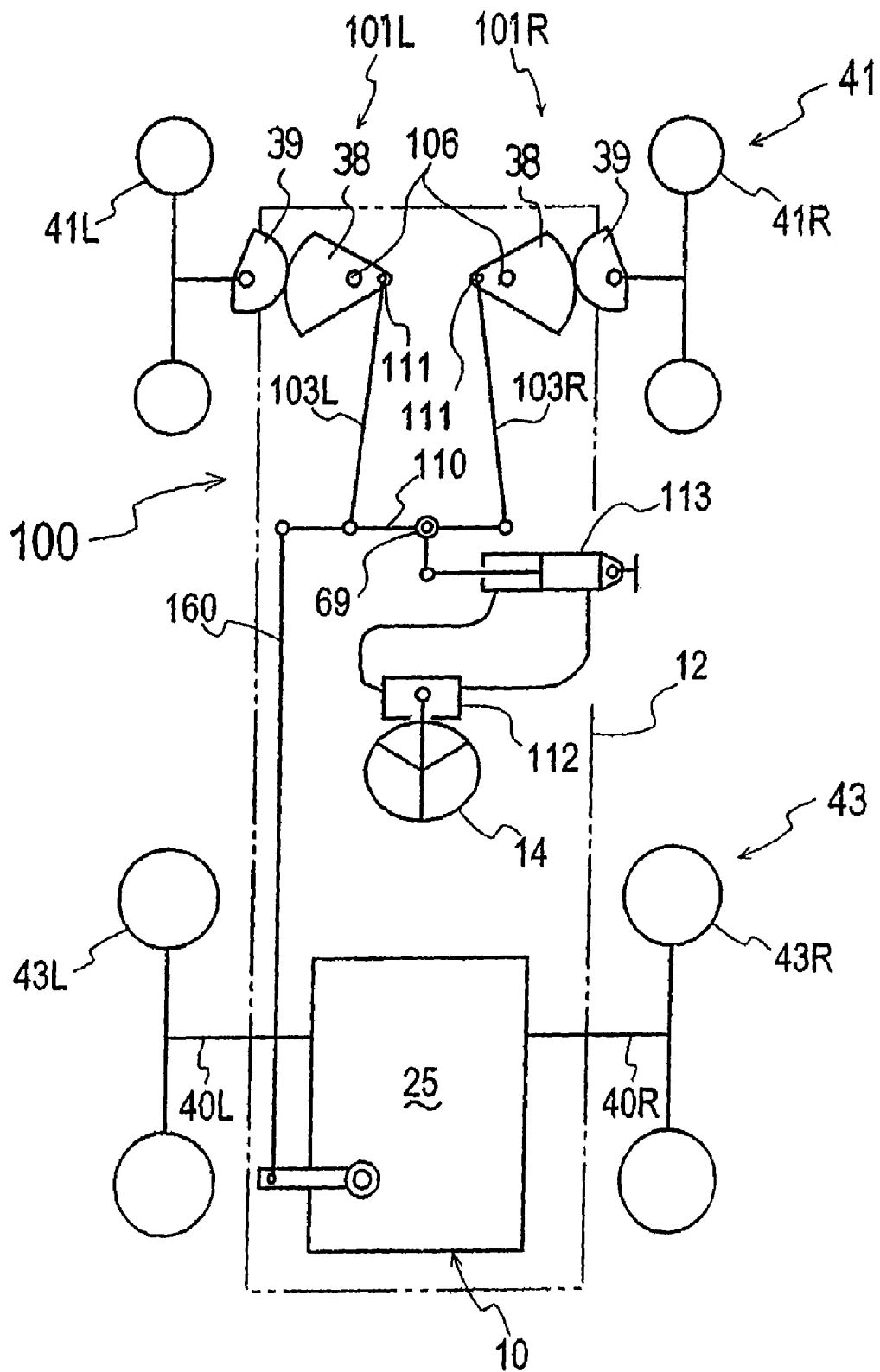
FIG. 22 is a diagrammatic plan view of a four-wheel running vehicle provided with steering linkage 100 including a hydraulic power steering cylinder 113.

As shown in FIG. 22, a hydraulic power steering cylinder 113 may be alternatively interposed between steering wheel 14 and joint 69 so as to change the rotary force of steering wheel 14 into hydraulic power. In this case, a hydraulic control valve 112 for controlling cylinder 113 takes the place of steering gear box 68. That is, steering wheel 14 is rotated so as to control valve 112, thereby reducing the manipulating force required for rotating steering wheel 14. Also in this case, the swing of tie rod 110 by telescoping of cylinder 113 is transmitted to steering linkage 100 so as to turn steerable running wheels 41 laterally, and transmitted to the transmission in housing 25 through link 160 so as to rotate running-drive wheels 43 differentially.

Figure 23:
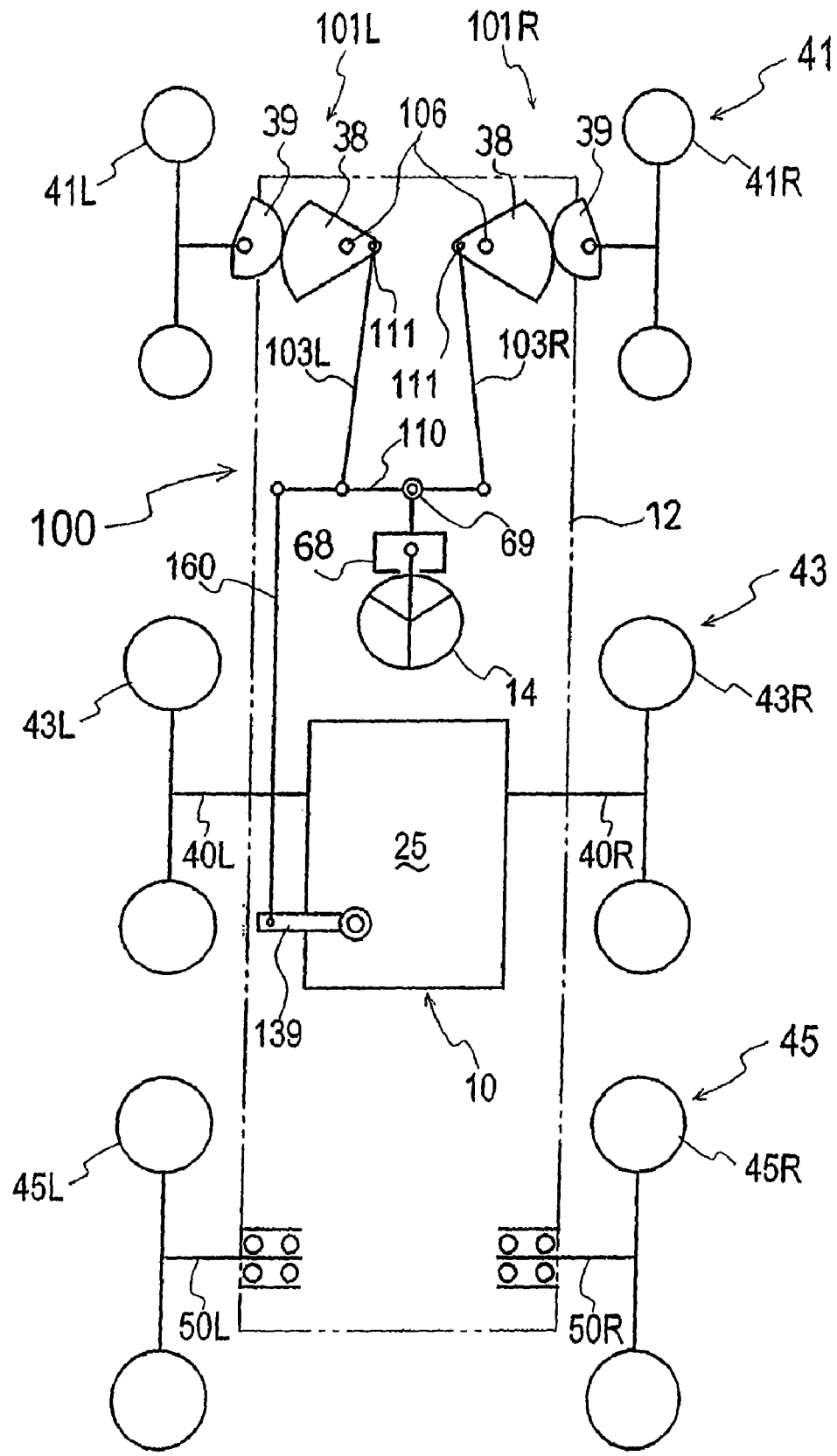
FIG. 23 is a diagrammatic plan view of a six-wheel running vehicle provided with steering linkage 100 which turns left and right steerable running wheels 41L and 41R while amplifying the lateral turning angle of wheels 41L and 41R in connection with operation of axle driving/steering apparatus 10.

As shown in FIG. 23, the vehicle employing steering linkage 100 may be a six-wheel running vehicle having additional left and right wheels 45L and 45R. Wheels 45L and 45R are fixed onto outer ends of respective left and right axles 50L and 50R rotatably supported by chassis 12. Alternatively, wheels 45 may be rotatably provided around respective axles 50 fixed to chassis 12.

In FIG. 23, wheels 45 do not receive driving force but rotate independently of wheels 43. Alternatively, wheels 45 may be rotated by driving force transmitted from driving axles 40L and 40R as shown in later-discussed FIGS. 45 to 48. Furthermore, shown steering linkage 100 may be provided with the hydraulic power steering system as shown in FIG. 22.

As mentioned above, steering linkage 100 is constructed from steering wheel 14 to left and right steerable running wheels 41L and 41R through tie rod 110 and left and right steering gear units 101L and 101R (101, if it is not specified to be left or right) for turning steerable running wheels 41 leftward and rightward in connection with the differential rotation of first running wheels 43 according to operation of steering wheel 14.

A mechanism of steering linkage 100 will be described on the assumption that steerable running wheels 41 are set in a straight traveling state.

Since left and right steering gear units 101L and 101R are constructed laterally symmetrically to each other, some figures (such as FIG. 25) illustrate one of steering gear units 101. It may be understood that the other omitted steering gear unit 101 is constructed laterally symmetrically to shown steering gear unit 101.

Figure 24:
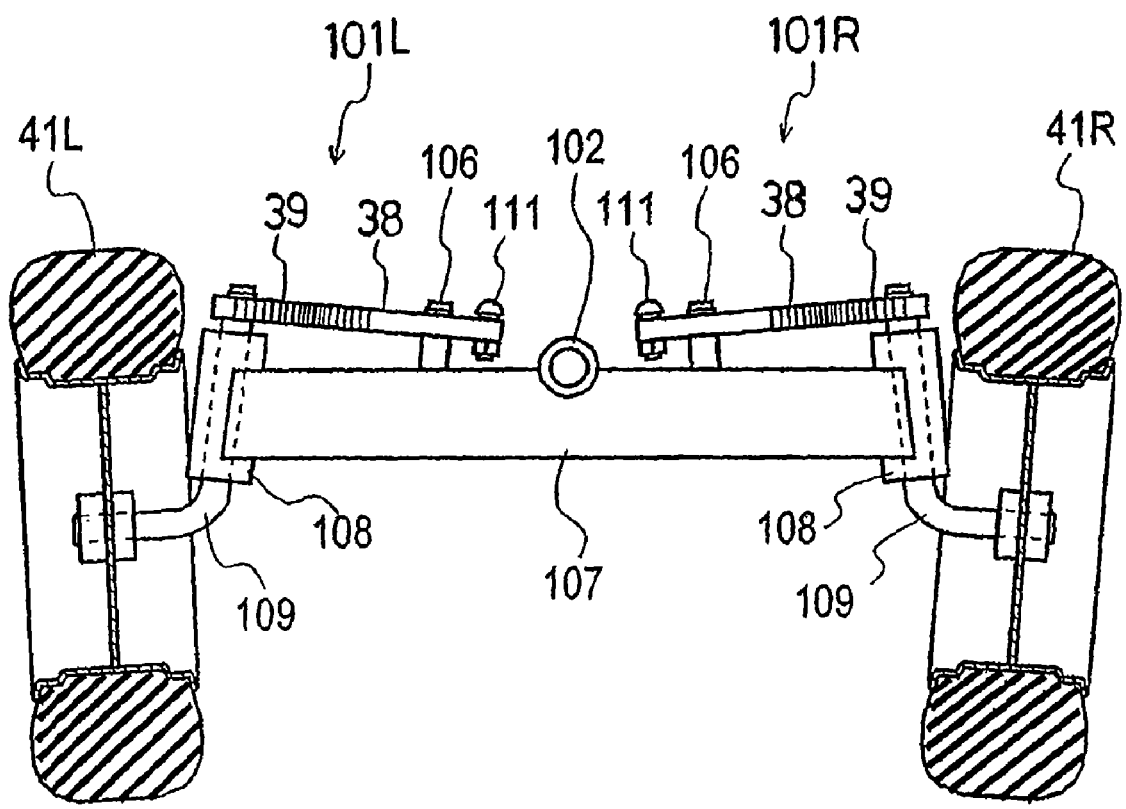
FIG. 24 is a rear view of right and left steering gear units 101R and 101L constituted by spur gears 38 and 39, interlocking with right and left steerable running wheels 41R and 41L, respectively.

As shown in FIG. 24, an axle beam 107 is vertically rotatably hung on the front portion of chassis 12 through a center pin 102 so as to be extended laterally. Left and right sector gears serving as drive gears 38 are disposed above axle beam 107 laterally oppositely to each other with respect to center pin 102 so as to face their toothed peripheries laterally distally. Drive gears 38 are pivoted through approximately vertical pivot pins 106 respectively onto axle beam 107 so as to be substantially horizontally rotatable. Left and right pivotal joints 111 are attached to respective proximal ends of drive gears 38 (more close to the lateral middle of vehicle than respective pivotal pins 106). Left and right rods 103L and 103R (103, if it is not specified to be left or right) are pivotally connected at their one ends to tie rod 110 oppositely to each other with respect to center pivotal joint 69, and pivotally connected at their other ends to respective drive gears 38 through respective pivotal joints 111.

When steering wheel 14 is rotated from its neutral position (a straight traveling setting position), tie rod 110 is tilted so that one of rods 103L and 103R is pushed forward so as to rotate the toothed periphery of corresponding gear 38 backward, and the other is pulled backward so as to rotate the toothed periphery of the other gear 38 forward.

Kingpin supporters 108 are fixed onto left and right ends of axle beam 107, respectively. Each of a pair of L-like shaped kingpins 109 is substantially vertically passed through respective supporters 108 while being allowed to rotate substantially horizontally. Each of kingpins 109 is bent and extended laterally distally under supporter 108 so as to serve as a pivot of each of steerable running wheel 41.

Figure 26:
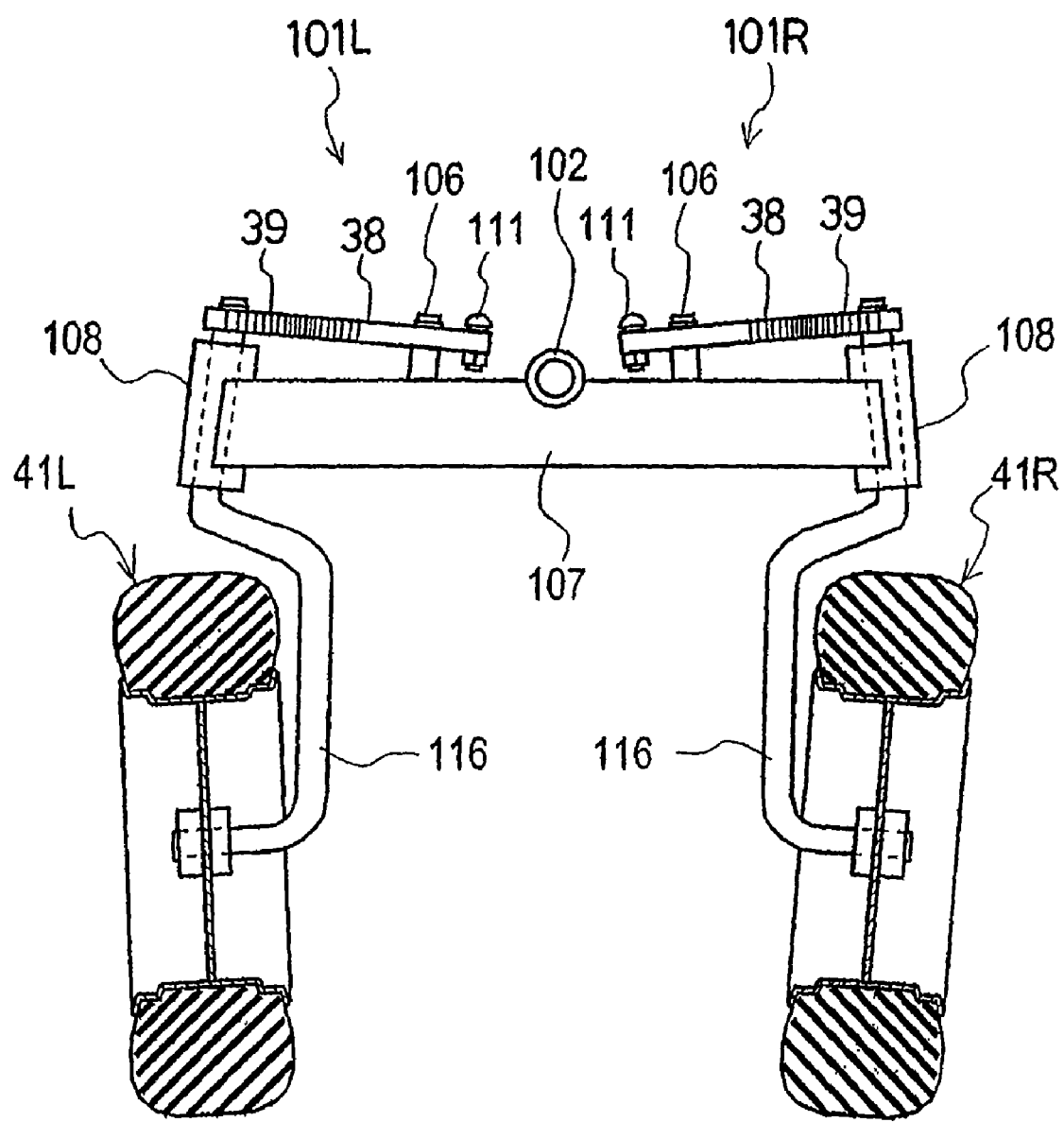
FIG. 26 is the same view with FIG. 24, wherein cranked kingpins 116 support respective steerable running wheels 41R and 41L.

As shown in FIG. 26, cranked kingpins 116 may replace L-like shaped kingpins 109. Each kingpin 116 is rotatably passed through supporter 108 substantially vertically downward, bent laterally proximally between a bottom of supporter 108 and a top of tire 41b of steerable running wheel 41, extended downward along an inside surface of steerable running wheel 41, and bent and extended laterally distally so as to pivot steerable running wheel 41.

In comparison with the case shown in FIG. 24 where steerable running wheels 41 are disposed laterally outward from respective left and right ends of axle beam 107 with kingpins 109, the vehicle bottom height can be increased by using kingpins 116 so as arrange steerable running wheels 41 below axle beam 107 and just under or laterally inward from the respective left and right ends of axle beam 107 as shown in FIG. 26. Thus, there is reduced such a problem when the vehicle travels and turns on a rough or soft ground that a bottom of the vehicle is damaged by touching the ground or the vehicle cannot travel because of slumping of steerable running wheels 41. Further, the vehicle can be laterally narrowed substantially as much as axle beam 107 so that the vehicle can travel on a narrow road or field.

Figure 25:
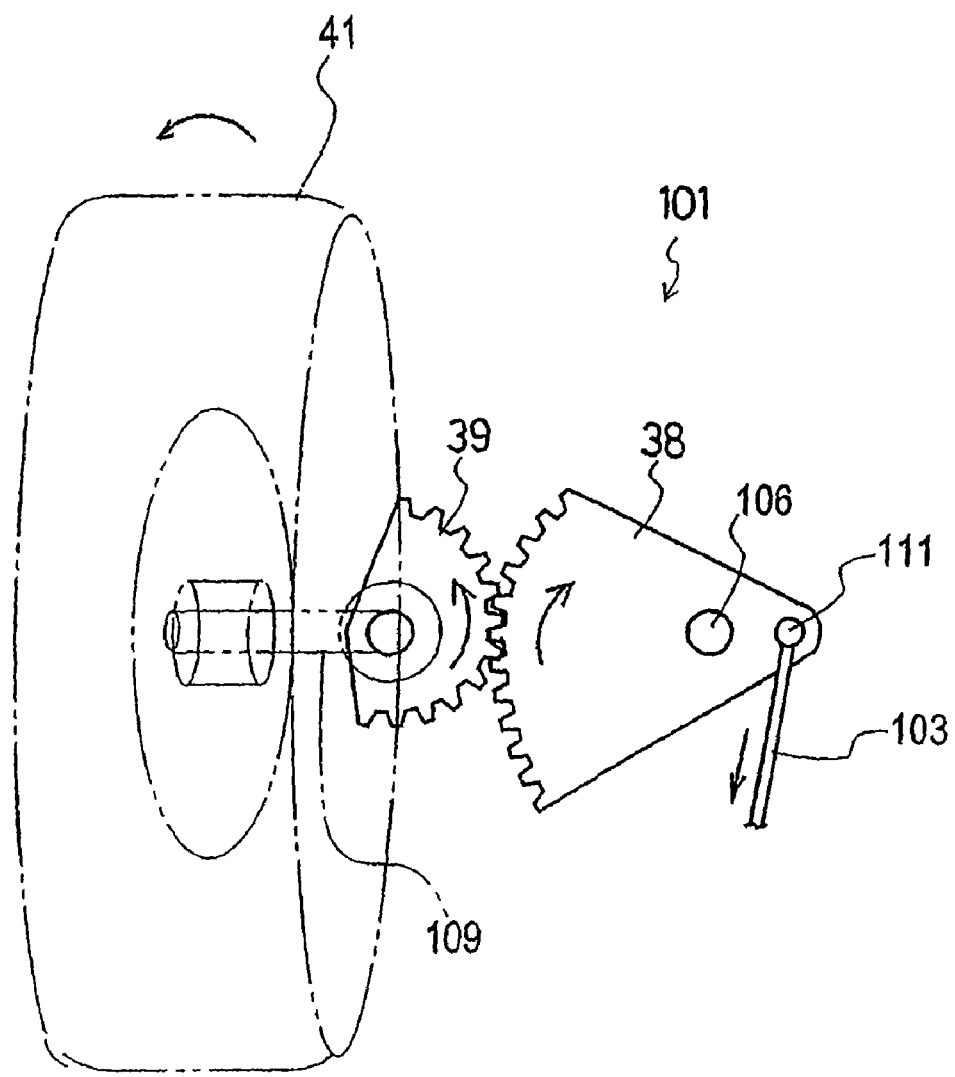
FIG. 25 is a plan view of steering gear unit 101 shown in FIG. 23.

As shown in FIGS. 24 to 26, each of left and right sector gears serving as follower gears 39 is fixed at its distal end onto the top of each of kingpins 109 (116) so that each of kingpins 109 (116) serves as a pivot of each of follower gears 39 and rotates substantially horizontally integrally with each of follower gears 39.

A proximal toothed periphery of each follower gear 39 meshes with a distal tooted periphery of each drive gear 38 so as to constitute each of left and right steering gear units 101L and 101R.

Follower gear 39 meshing with drive gear 38 which is rotated so as to move its toothed periphery forward according to rotation of steering wheel 14 is also rotated so as to move its toothed periphery forward, thereby laterally turning corresponding steerable running wheel 41 so as to turn its front end distally. This steerable running wheel 41 is arranged on inside of the vehicle in turning. On the contrary, follower gear 39 rotating so as to move its toothed periphery backward together with meshing drive gear 38 turns corresponding steerable running wheel 41 so as to turn its front end proximally. This steerable running wheel 41 is arranged on outside of the vehicle in turning.

On the straight line connecting the fulcrums of both gears 38 and 39 (i.e., connecting the center of pivot 106 and the center of kingpin 109), a distance of drive gear 38 between its toothed periphery and the center of pivot 106 is referred to as a radius R1 of drive gear 38, and a distance of follower gear 39 between its toothed periphery and the center of kingpin 109 is referred to as a radius R2 of follower gear 39. Hereinafter, those of drive and follower gears of each of steering gear units 101L and 101R according to later-discussed various embodiments, e.g., those of later-discussed bevel gears 82 and 83, are referred to as the same. In each of steering gear units 101L and 101R, radius R1 of drive gear 38 is larger than radius R2 of follower gear 39 meshing with the drive gear 38 so that, when drive gear 38 is rotated, follower gear 39 rotates at a larger angle than drive gear 38. Therefore, while the tilt angle of tie rod 110 according to rotation of steering wheel 14 is small, steerable running wheels 41 can be turned laterally at large angles.

The pivot of drive gear 38 constituted by pin 106 is parallel to the pivot of follower gear 39 constituted by kingpin 109 (116) so that mutually meshing gears 38 and 39 are spur gears.

Figure 27:
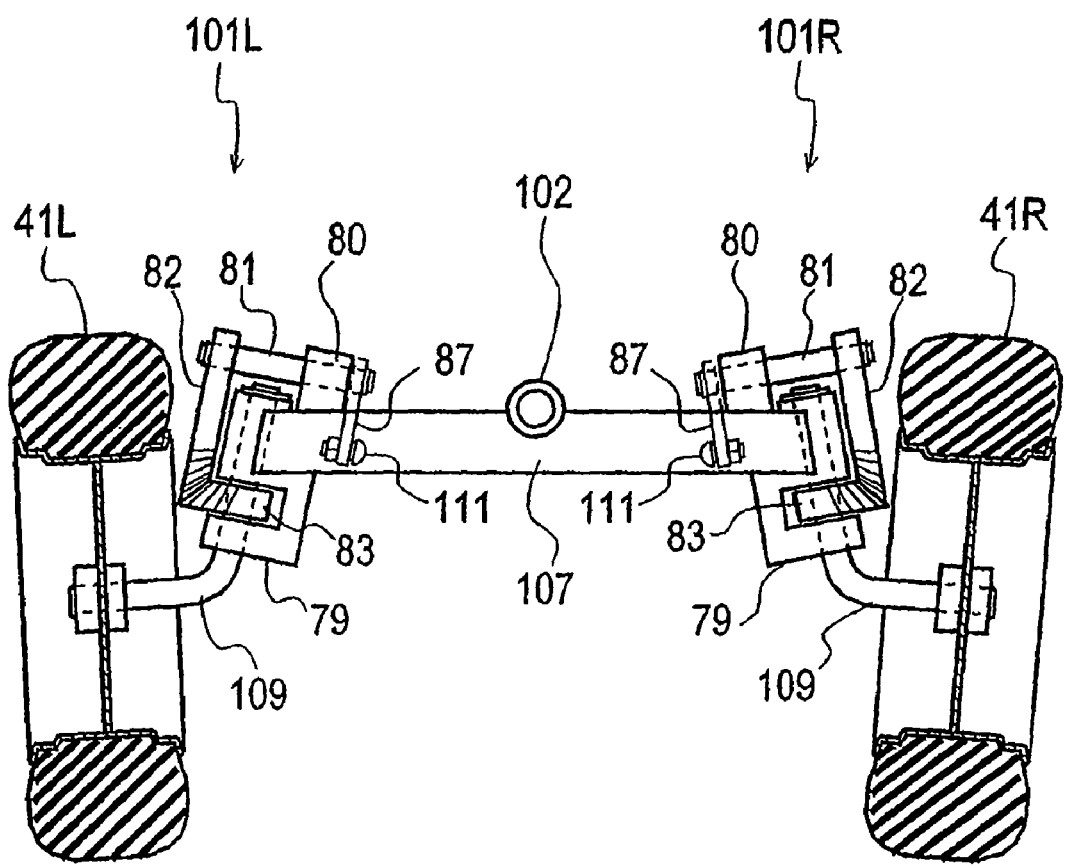
FIG. 27 is a rear view of right and left steering gear units 101R and 101L constituted by bevel gears 82 and 83, interlocking with right and left steerable running wheels 41R and 41L, respectively.
Figure 28:
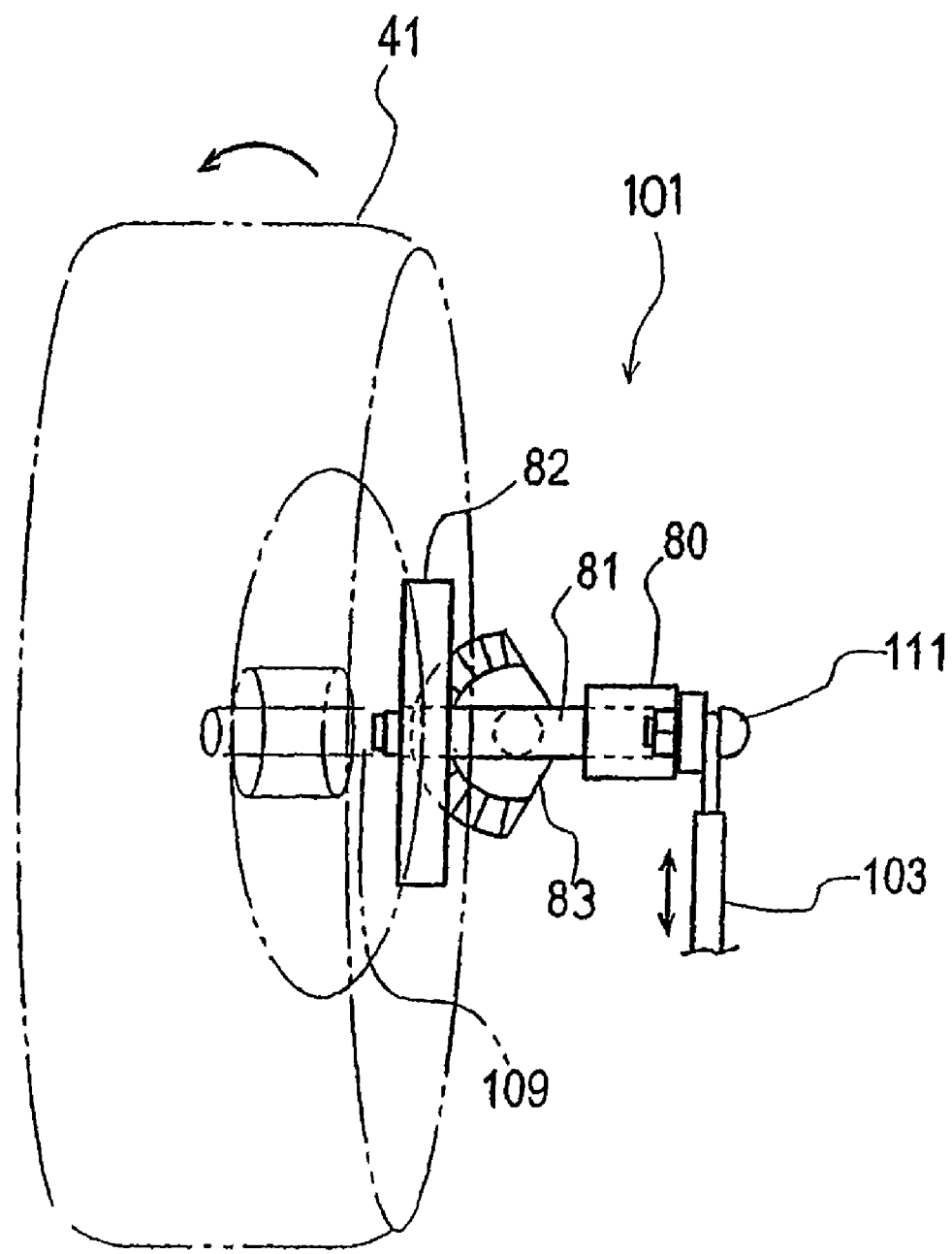
FIG. 28 is a side view of steering gear unit 101 shown in FIG. 27.
Figure 29:
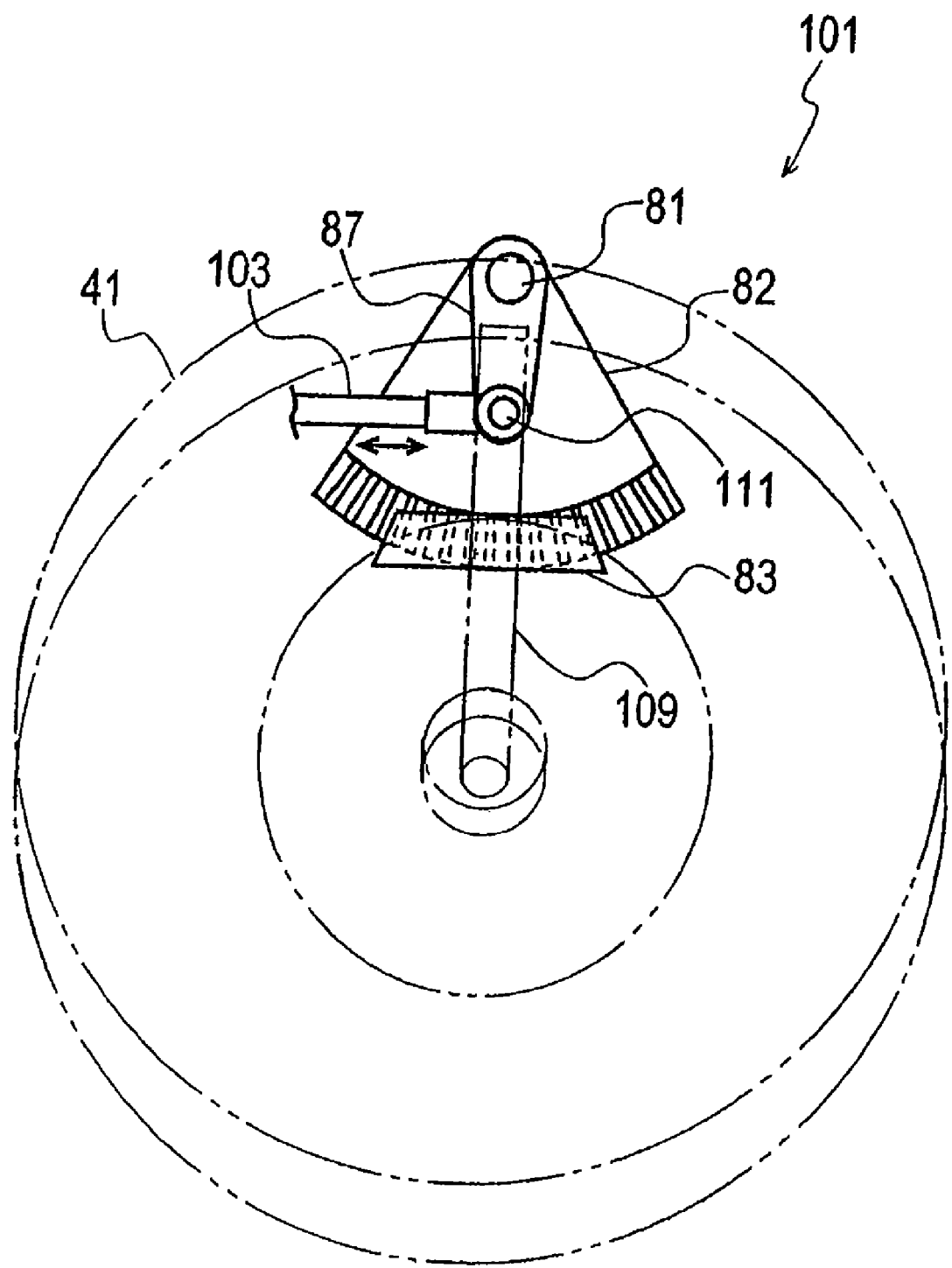
FIG. 29 is a plan view of steering gear unit 101 shown in FIG. 27.

Alternatively, as shown in FIGS. 27 to 29, mutually meshing bevel gears 82 and 83 may replace mutually meshing spur gears 38 and 39. Radius R1 of bevel gear 82 serving as a drive gear is larger than radius R2 of bevel gear 83 serving as a follower gear. Therefore, during rotation of drive gear 82, follower gear 83 rotates at a larger angle than drive gear 82, so that the lateral turning angles of steerable running wheels 41 can be large while the swing angle of tie rod 110 caused by rotation of steering wheel 14 is restricted.

Referring to FIGS. 27 to 29, a pair of bearings 80 are mounted on the top surface of axle beam 107 adjacently to the respective left and right ends of axle beam 107. Lateral pivot pin 81 rotatably penetrates each bearing 80. Arm 87 is fixed at its lower end to a proximal end of each pivot pin 81, and pivotally connected at its upper end to respective rod 103L and 103R through pivotal joint 111. Drive gear 82 is fixedly hung from a distal end of each pivot pin 81 so as to arrange its toothed periphery below.

Supporters 79 for pivoting respective kingpins 109 are fixed onto the respective left and right ends of axle beam 107. Each supporter 79 is notched under axle beam 107. Follower gear 82 is fixed around a vertical intermediate portion of kingpin 109 in the notched space of supporter 79, and disposed perpendicularly to drive gear 82 so that the laterally distal toothed periphery of follower gear 83 meshes with the toothed peripheral bottom of drive gear 82.

When steering wheel 14 is rotated so as to push one of rods 103L and 103R forward and pull the other backward through tie rod 110, one couple of gears 82 and 83 is rotated forward so as to laterally turn corresponding steerable running wheel 41 as one on outside of the vehicle in turning, and the other couple of gears 82 and 83 is rotated backward so as to laterally turn corresponding steerable running wheel 41 as one on inside of the vehicle in turning.

In comparison with the case where spur gears 38 and 39 are disposed above axle beam 107, bevel gears 82 and 83 are disposed laterally outside or below axle beam 107 so as to ensure a large room in the vehicle body above axle beam 107 for peripheral equipments such as lamps.

Variety of bevel gears 82 and 83 allows positions of steerable running wheels 41, a height or width of the vehicle or so on to change easily. Such a simple design change corresponds to variation of a vehicle.

Figure 30:
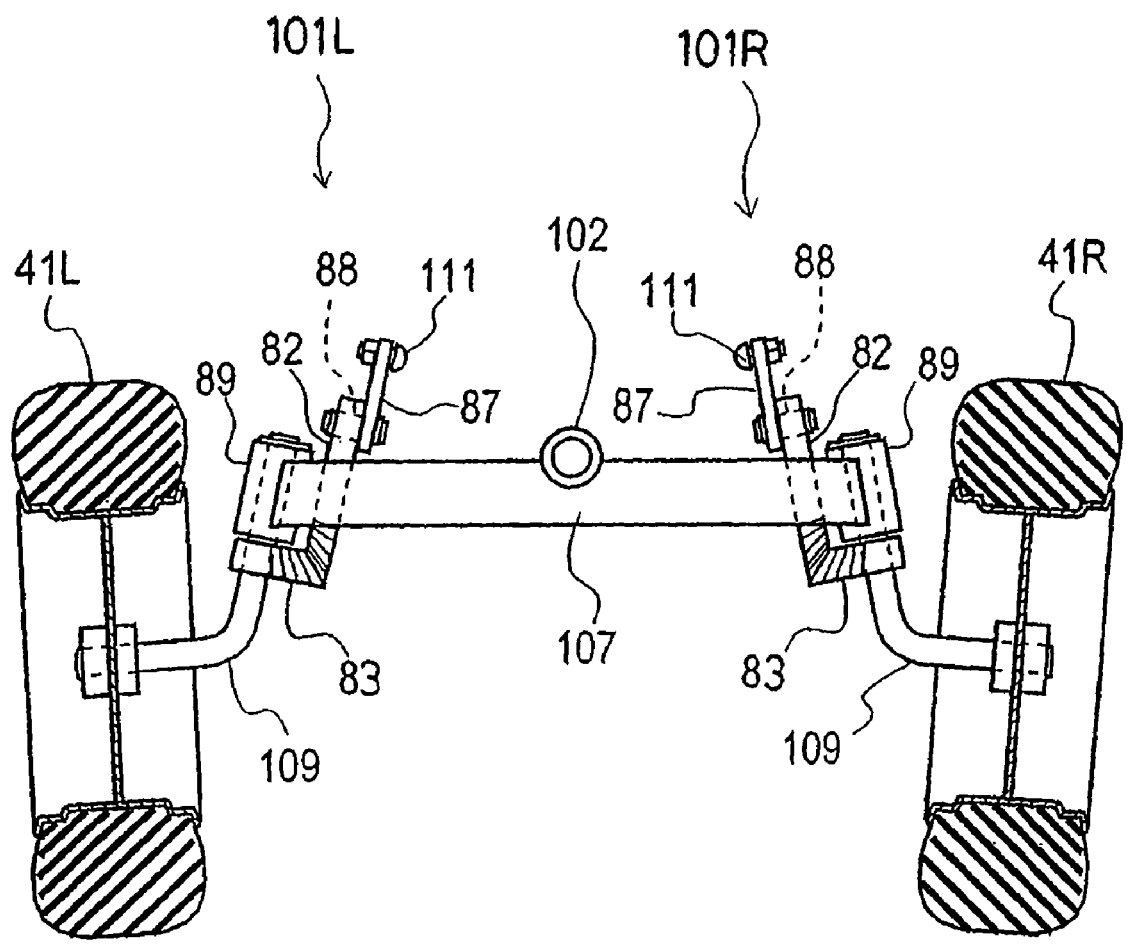
FIG. 30 is a rear view of modified right and left steering gear units 101R and 101L constituted by bevel gears 82 and 83, interlocking with right and left steerable running wheels 41R and 41L, respectively.

Alternatively, as shown in FIG. 30, drive gears 82 may be extended approximately downward from respective arms 87. In this embodiment, drive gears 82 are connected at their upper ends to the lower ends of respective arms 87 through respective pivot pins 88 above axle beam 107, and extended downward so as to arrange their lower toothed periphery below axle beam 107. A pair of cylindrical supporters 87 are fixed onto the left and right ends of axle beam 107 and rotatably support upper portions of kingpins 109, respectively. Follower gears 83 are fixed around vertically intermediate portions of kingpins 109 under supporters 89, respectively. Toothed periphery of respective follower gears 83 are disposed laterally proximally so as to mesh with respective drive gears 82.

Since gears 82 and 83 mutually mesh below axle beam 107 and laterally inward from the left and right ends of axle beam 107, the width of the vehicle can be reduced and the room for arranging some instruments above axle beam 107 can be expanded while gears 82 and 83 are do not hinder steerable running wheels 41 so as to allow steerable running wheels 41 to turn laterally at sufficiently large angles. Furthermore, the teeth of gears 82 and 83 are protected from dust, stones or the like splashed by steerable running wheels 41, thereby preventing gears 82 and 83 from being damaged and reducing frequency of maintenance and costs.

Figure 31:
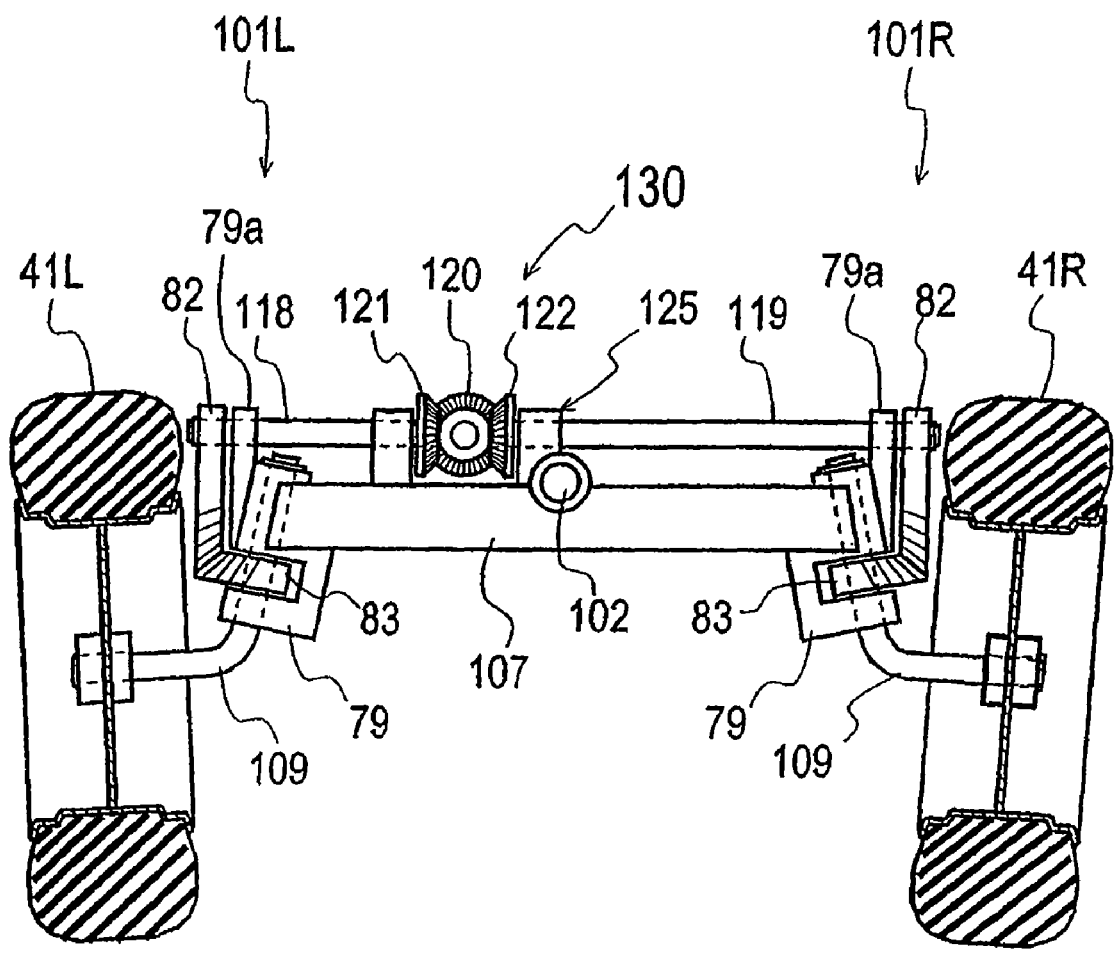
FIG. 31 is a rear view of further modified right and left steering gear units 101R and 101L constituted by bevel gears 82 and 83, interlocking with right and left steerable running wheels 41R and 41L, respectively, wherein the rotational force of a steering wheel 14 is shared between steering gear units 101R and 101L through a differential mechanism 130.
Figure 32A:
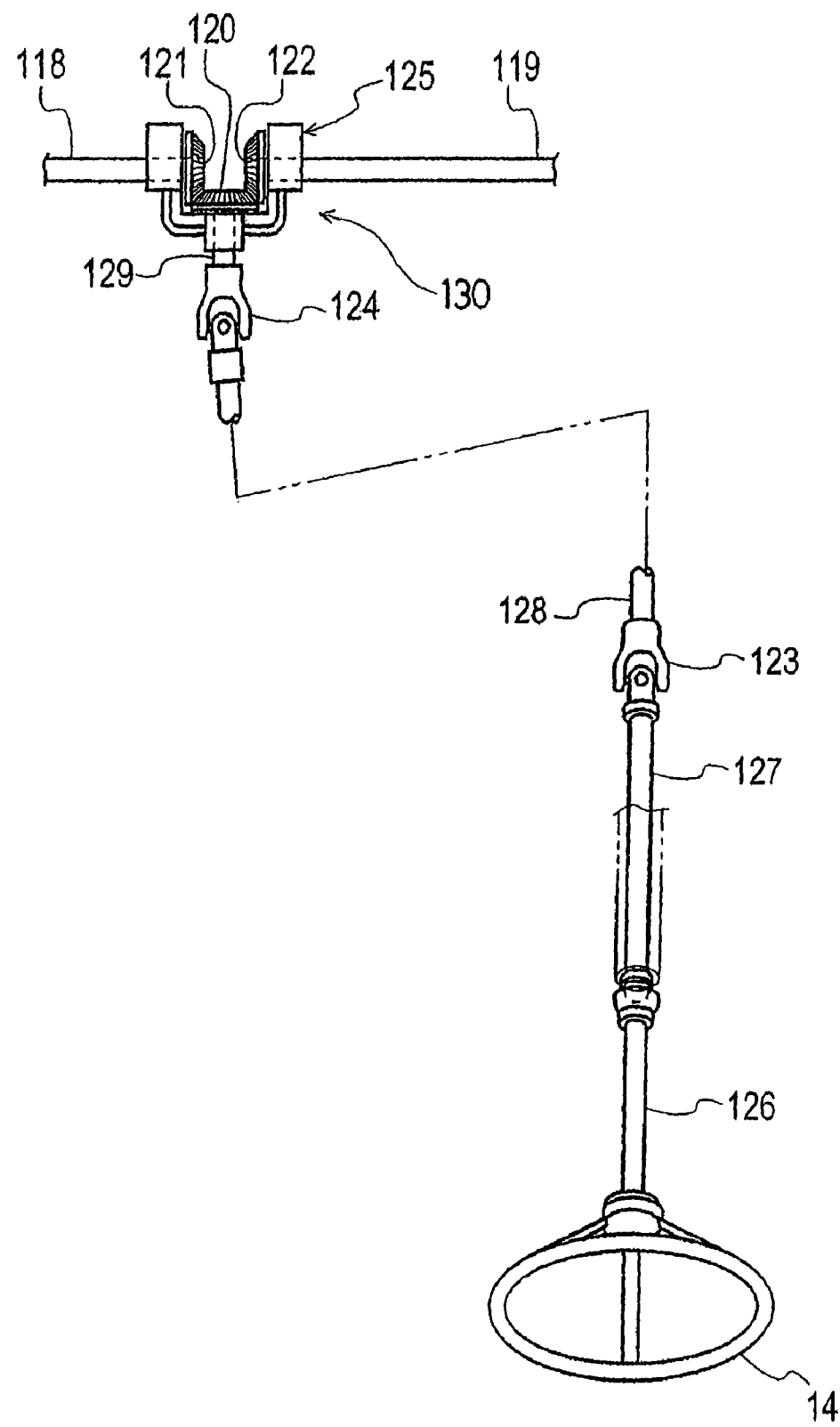
FIG. 32(a) is a plan view of differential mechanism 130 shown in FIG. 31 in connection with steering wheel 14 through a linkage.

Alternatively, as shown in FIGS. 31 and 32(a), left and right drive gears 82 may be interlockingly connected to steering wheel 14 through a differential mechanism 130 including bevel gears 120, 121 and 122, instead of tie rod 110 and rods 103L and 103R.

A steering wheel shaft 126 is extended from the center of steering wheel 14 and a steering column 127 is integrally and coaxially extended from steering wheel shaft 126. A connection rod 128 is extended from steering column 127 through a universal joint 123. A bearing holder 125, which is U-like shaped when viewed in plan, is mounted on the top surface of axle beam 107 so as to extend backward from shafts 118 and 119. An input shaft 129 fixedly provided at its front end with input bevel gear 120 is journalled by a rear portion of bearing holder 125 so as to be disposed perpendicularly to axle beam 107. Input shaft 129 is connected to connection rod 128 through a universal joint 124.

A left shaft 118 is journalled by a left front portion of bearing holder 125 and bevel gear 121 is fixed on a right end of shaft 118. A right shaft 119 is journalled by a right front portion of bearing holder 125 and bevel gear 122 is fixed on a right end of shaft 119. Both gears 121 and 122 are disposed perpendicularly to gear 120 and mesh with gear 120. Left and right shafts 118 and 119 are extended laterally distally along the top surface of axle beam 107 and journalled by respective bearings 79a projecting upward from respective supporters 79 which are fixed onto left and right ends of axle beam 107 so as to journal respective kingpins 109. Drive gear 82 is fixed on a distal end of each of shafts 118 and 119 so as to interlock gear 82 with steerable running wheel 41 through follower gear 83 and kingpin 109, similarly with drive gear 82 of FIGS. 27 to 29.

In this embodiment, left shaft 118 is shorter than right shaft 119. Alternatively, left shaft 118 may be longer than right shaft 119.

Figure 32B:
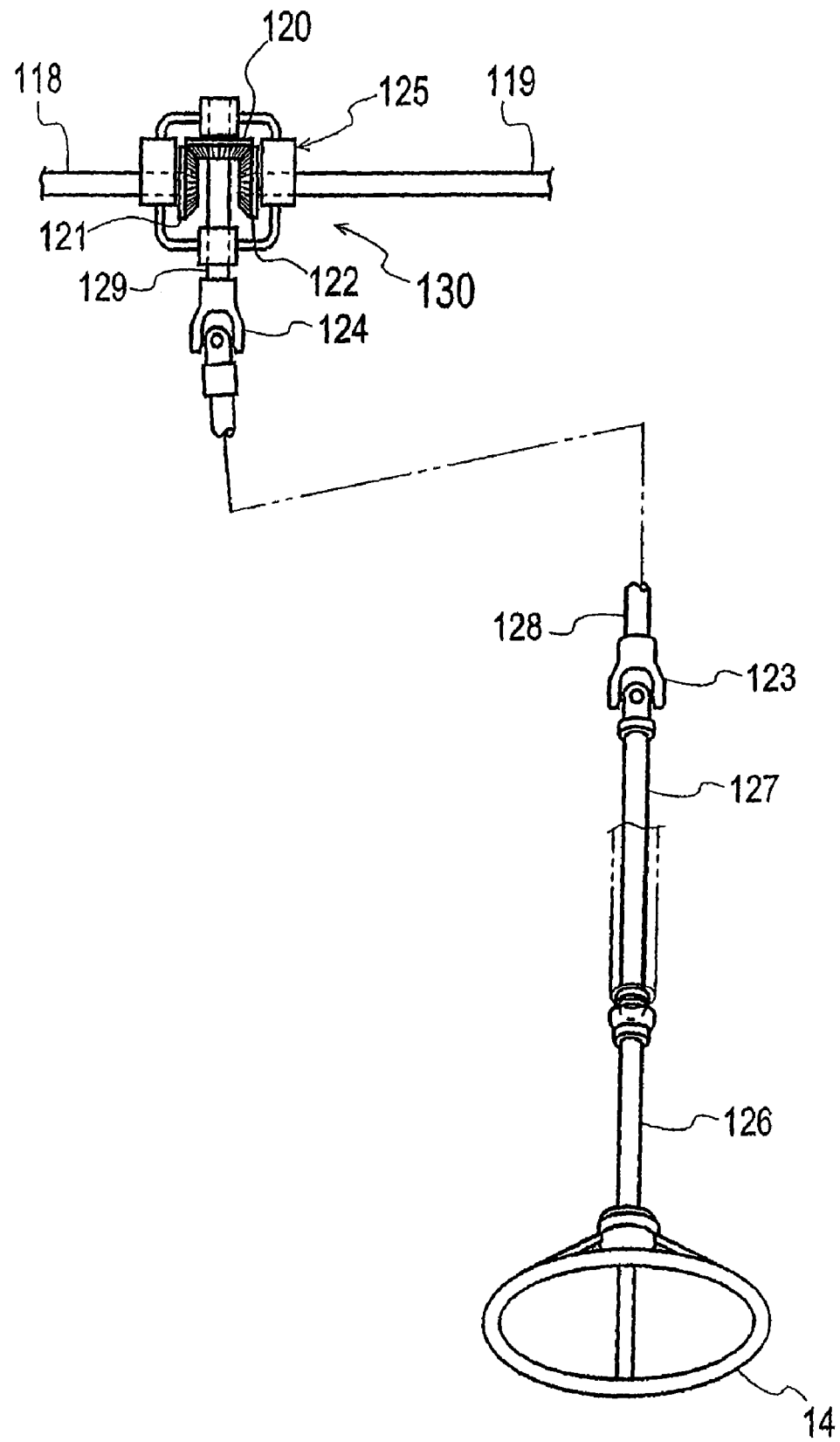
FIG. 32(b) is a plan view of modification of differential mechanism 130 shown in FIGS. 31 and 32(a).

According to the embodiment shown in FIGS. 31 and 32(a), input bevel gear 120 meshes with bevel gears 121 and 122 behind shafts 118 and 119. Alternatively, it may mesh in front of shafts 118 and 119, as shown in FIG. 32(b). In this case, above-mentioned bearing holder 125 is further provided with a portion for journalling the front end of input shaft 129 in front of shafts 118 and 119. Input shaft 125 is extended forward between bevel gears 121 and 122 and journalled by bearing holder 125 before and behind shafts 118 and 119.

Since the vehicle does not require such a wide space for swinging tie rod 110 and rods 103L and 103R between steering wheel 14 and bevel-gear-type differential mechanism 130 attached on axle beam 107, there is more room available on the vehicle for other instruments such as lamps therebetween.

The vehicle having the steering mechanism for laterally turning steerable running wheels 41 according to the embodiment of FIGS. 31 and 32(a) (or FIG. 32(b)) is also constructed so that control lever 139 for rotating movable swash plate 76 of steering HST 22 is moved by manipulating steering wheel 14 so as to drive running-driving wheels 43 differentially, thereby laterally turning the main body of the vehicle.

Description will be given of some embodiments of steering gear units 101L and 101R in steering linkage 100, serving as a system for controlling lateral turning angles of steering running wheels 41.

Figure 33:
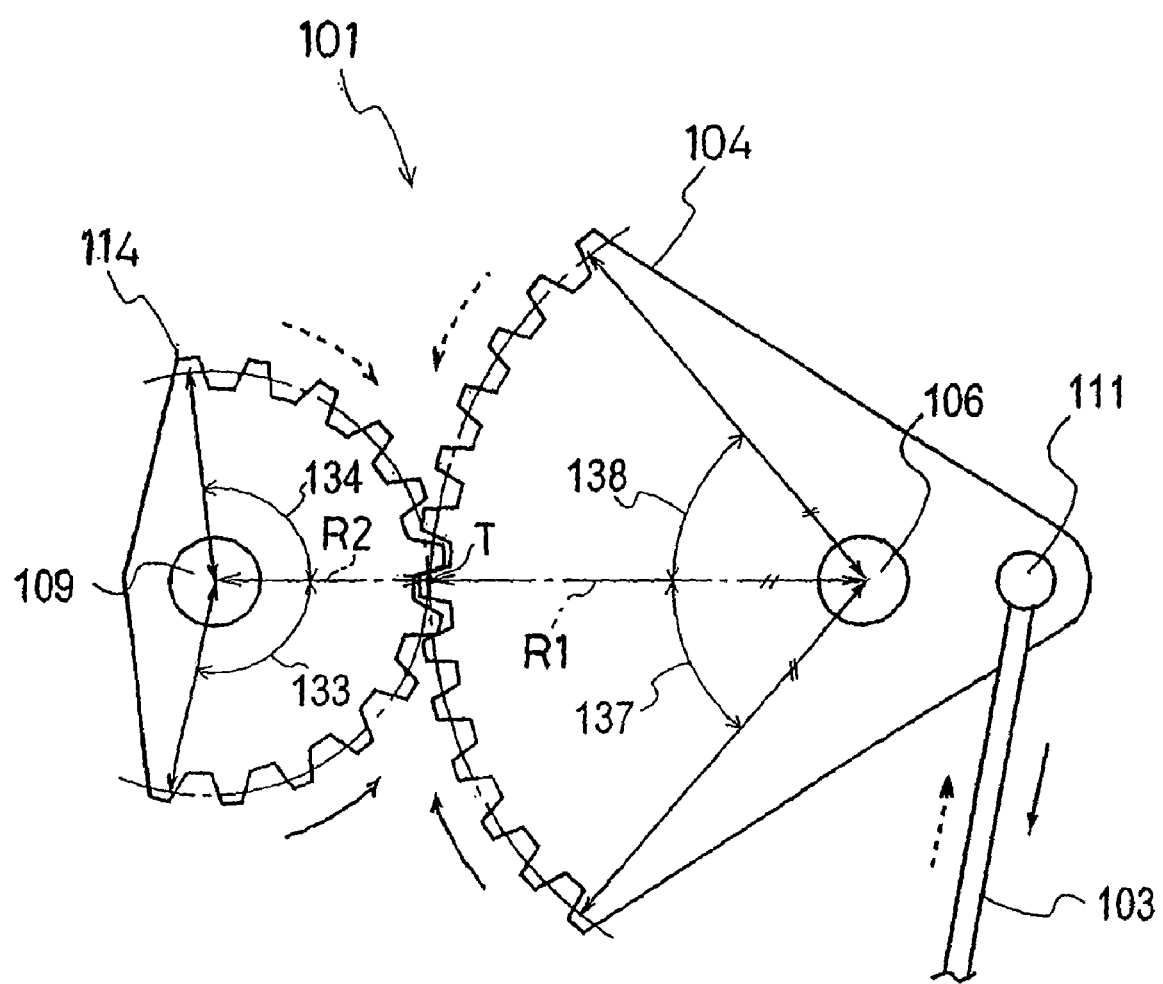
FIG. 33 is a plan view of spur gears 104 and 114 having fixed radii serving as spur gears 38 and 39 of steering gear unit 101.

Spur gears 104 and 114 shown in FIG. 33 serve as spur gears 38 and 39 of steering gear unit 101 as shown in FIGS. 24 to 26. Bevel gears 84 and 85 shown in FIGS. 34 and 35 serve as bevel gears 82 and 83 of steering gear unit as shown in FIGS. 27 to 32. Each of sector gears 104, 114, 84 and 85 has a constant R1 or R2 in the whole range thereof (however many degrees the sector gear is rotated).

Figure 34:
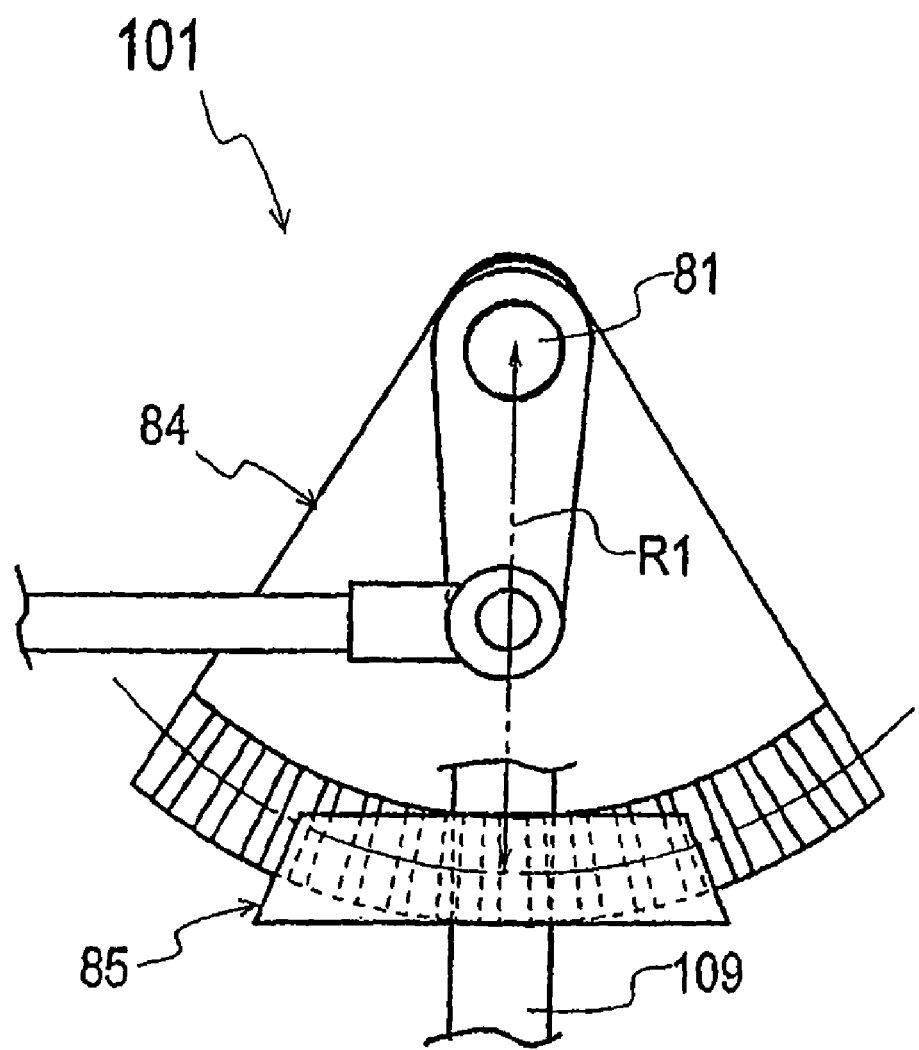
FIG. 34 is a side view of bevel gears 84 and 85 having fixed radii serving as bevel gears 82 and 83 of steering gear unit 101.
Figure 35:
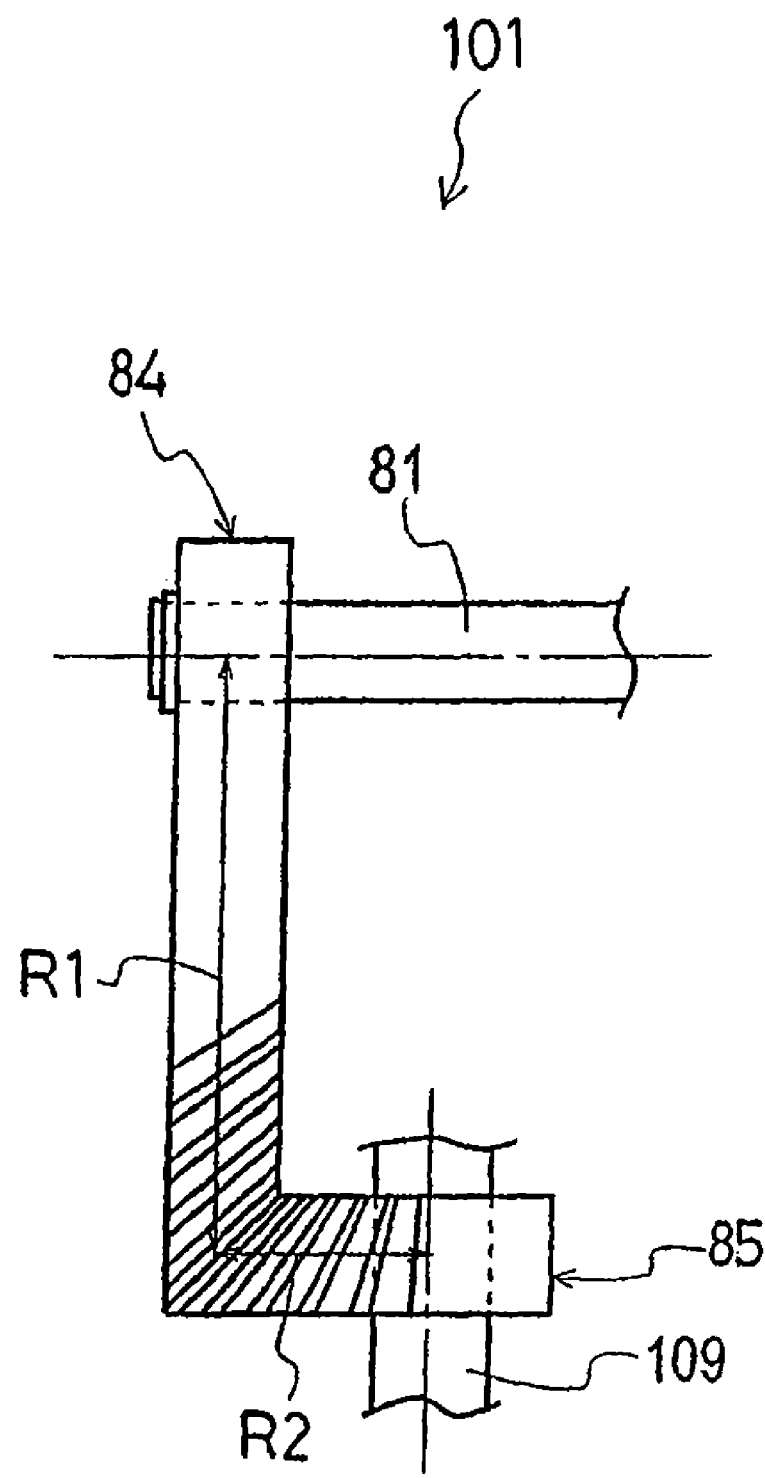
FIG. 35 is a front (rear) view of the same.

Whether it is according to the embodiment of FIG. 33 or the embodiment of FIGS. 34 and 35, the front end of steerable running wheel 41 turns laterally inward as the front end of drive gear 104 or 84 and the front end of follower gear 105 or 85 approach each other (as the rear ends of the drive gear and the follower gear go apart from each other). Conversely, the front end of steerable running wheel 41 turns laterally outward as the front end of drive gear 104 or 84 and the front end of follower gear 114 or 85 go apart from each other (as the rear ends of the drive gear and the follower gear approach each other).

FIG. 33 illustrates mutually meshing spur gears 104 and 114 when they arrange steerable running wheel 41 in a longitudinal direction of the vehicle for straight traveling. Gears 104 and 114 tangentially contact each other through a point T on a line between the centers of pivots 106 and 109. The toothed peripheral range of drive gear 104 ahead of point T is named a front central angle range 138, and that behind point T is named a rear central angle range 137. The toothed peripheral range of follower gear 114 ahead of point T is named a front central angle range 134, and that behind point T is named a rear central angle range 133.

If illustrated steering gear unit 101 interlocks with inside steerable running wheel 41, which is positioned at inside of the vehicle in turning, gears 104 and 114 mesh with each other through their rear central angle ranges 137 and 133 so as to turn the front end of inside wheel 41 laterally outward of the vehicle. If illustrated steering gear unit 101 interlocks with outside steerable running wheel 41, which is positioned at outside of the vehicle in turning, gears 104 and 114 mesh with each other through their front central angle ranges 138 and 134 so as to turn the front end of outside wheel 41 laterally inward of the vehicle.

Drive gear 104 has constant radius R1, and follower gear 114 has constant radius R2 that is smaller than radius R1. Because of R1>R2, the central angle range of gear 114 becomes larger than that of gear 104 if gears 104 and 114 share the same length of toothed periphery. Therefore, rear central angle range 133 of gear 39 is larger than rear central angle range 137 of gear 104, and front central angle range 134 of gear 114 is larger than front central angle range 138 of gear 104. Consequently, the rotational angle of follower gear 114 becomes larger than that of drive gear 104, whether they interlock with inside wheel 41 or outside wheel 41. Namely, steering gear unit 101 amplifies the allowed lateral turning of steerable running wheel 41.

Since the rotational degree of follower gear 114 which laterally rotates substantially integrally with steerable running wheel 41 is always larger than that of drive gear 104, the vehicle can turn on a small circle while the rotational angle of steering wheel 14 being restricted, thereby improving the operability for steering. For example, kingpin 109 may be rotated 180 degrees while steering wheel 14 is rotated 90 degrees.

The same performance is assured in steering gear unit 101 comprised of bevel gears 84 and 85 shown in FIGS. 34 and 35. However, in this case, both radii R1 and R2 are not disposed in a line. As shown in FIG. 35, radius R1 of drive gear 84 is a substantially downward distance from the center of pivot shaft 81 to the abutting surface of gear 84 against gear 85, and radius R2 of follower gear 85 is a substantially horizontal distance from the center of kingpin 109 to the abutting surface of gear 85 against gear 84.

Figure 40:
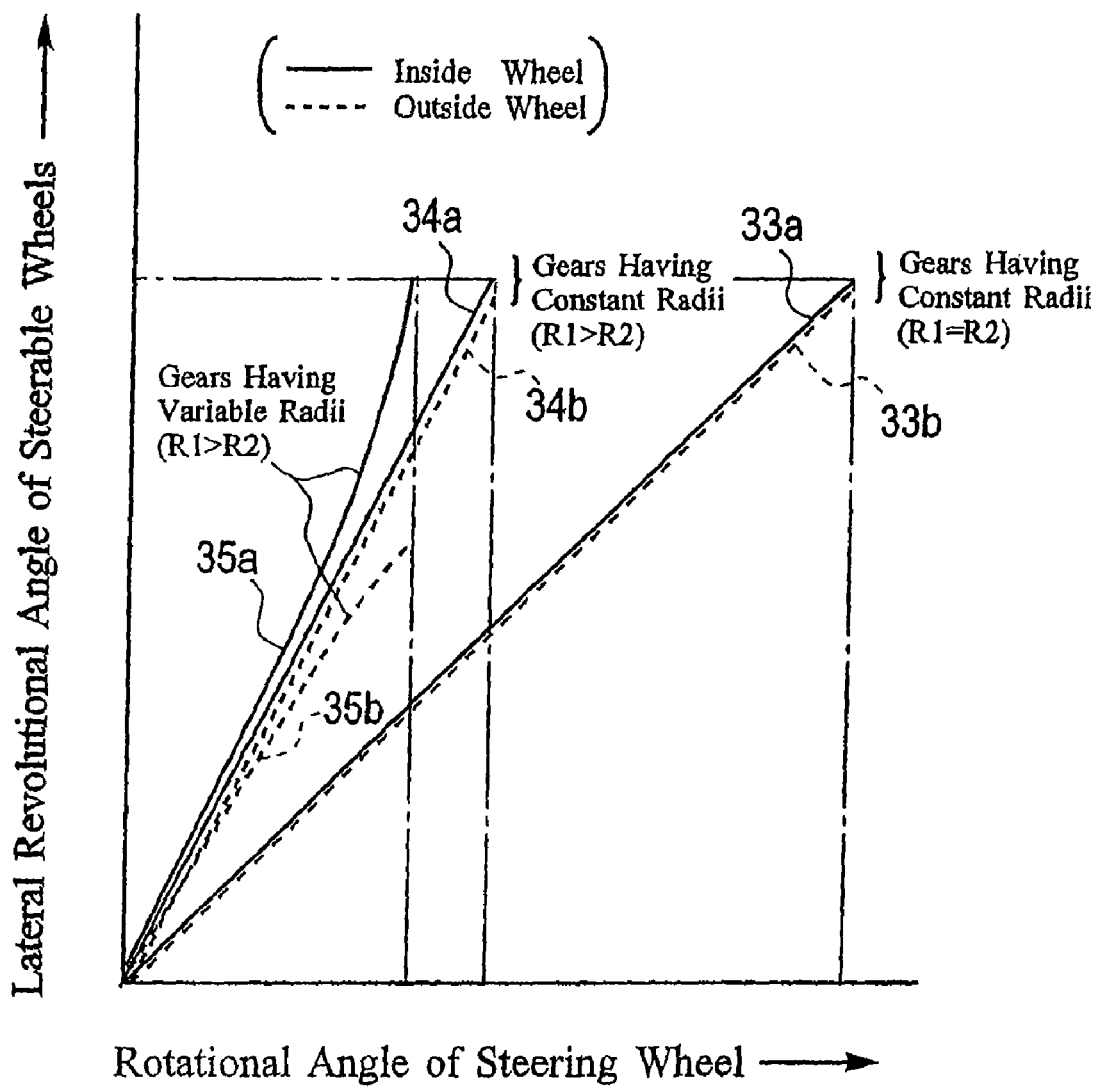
FIG. 40 illustrates graphs expressing variation of lateral turning angles of right and left steerable wheels 41 serving as an inside wheel and an outside wheel of a turning vehicle in relation to rotational angle of steering wheel 14.

Referring to FIG. 40, each of straight line graphs 33a and 33b expresses variation of lateral turning angle of each of inside and outside steerable running wheels 41 in relation to rotational angle of steering wheel 14, in a case where each wheel 41 interlocks with steering gear unit 101 wherein radius R1 of the drive gear is as large as radius R2 of the follower gear. Each of straight line graphs 34a and 34b expresses variation of the same ratio of each of inside and outside wheels 41, in the case where each wheel 41 interlocks with steering gear unit 101 wherein radius R1 of the drive gear is larger than radius R2 of the follower gear. Since graphs 34a and 34b are steeper than graphs 33a and 33b, it turns out that the response of lateral turning of steerable running wheels to steering operation is enhanced when radius R1 of the drive gear is larger than radius R2 of the follower gear as in the present embodiment.

Each of graphs 34a and 34b is straight because it illustrates the variation of turning angle of each wheel 41 when radius R1 of the drive gear and radius R2 of the follower gear are constant (i.e., the gear ratio between the drive gear and the follower gear in steering gear unit 101 is constant) as shown in FIG. 33 or FIGS. 34 and 35. Furthermore, graphs 34a and 34b are as steep as each other. It means that the rate of variation of lateral turning angle of inside wheel 41 is equal to that of outside wheel 41.

However, in this case, since the axes of inside and outside wheels 41 about their own rotations become parallel to each other, it cannot be performed that both extensions of axes of laterally turned inside and outside wheels 41 cross each other at a position coinciding with the lateral turning of the vehicle caused by the differential driving of right and left wheels 43 regardless of rotational angle of steering wheel 14. For realizing this performance, there must be a difference of lateral turning angle between inside wheel 41 and outside wheel 41. Moreover, the lateral turning angle of inside wheel 41 must be larger than that of outside wheel 41.

Figure 36:
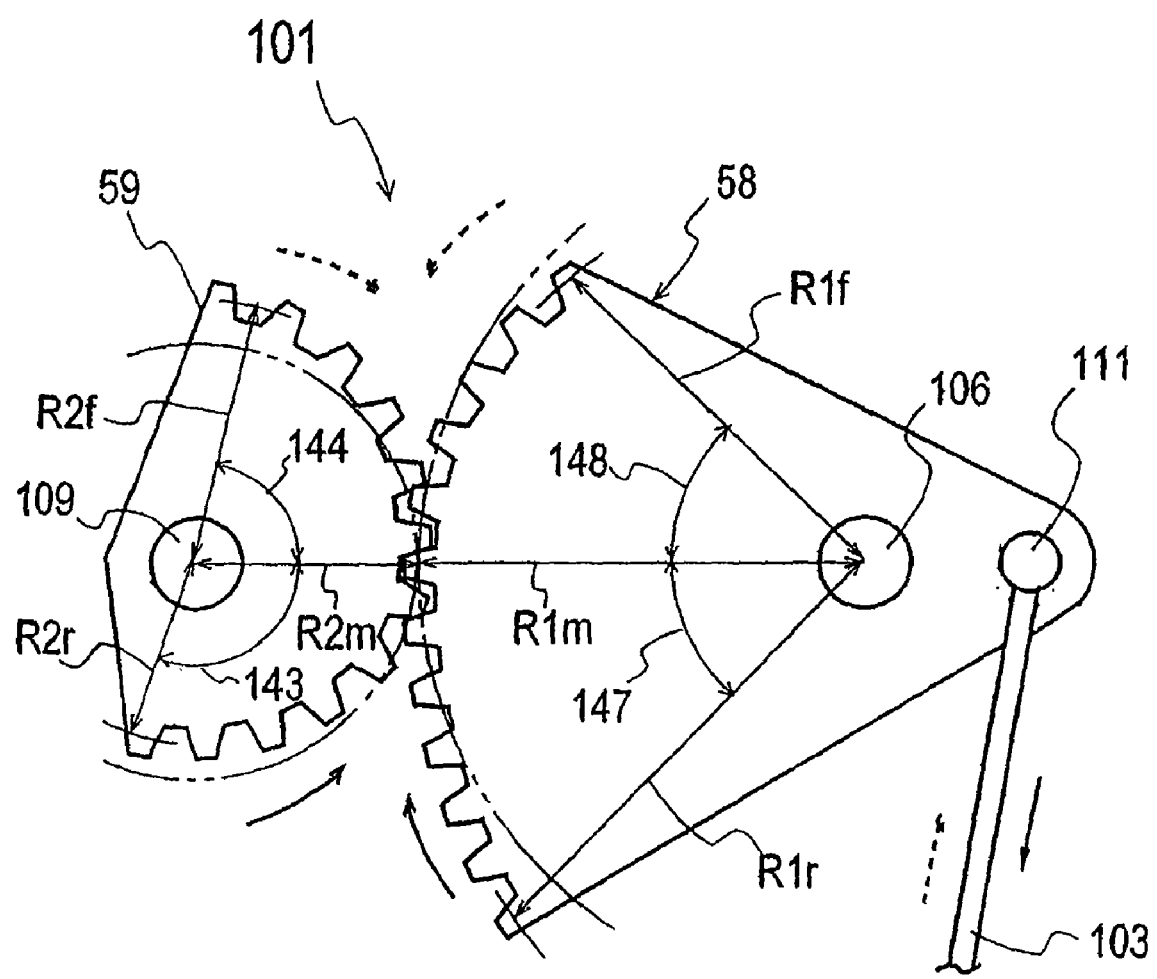
FIG. 36 is a plan view of spur gears 58 and 59 having variable radii serving as spur gears 38 and 39 of steering gear unit 101.

Then, for realizing such a lateral turning angle difference between the drive gear and the follower gear, mutually meshing spur gears 58 and 59 as shown in FIG. 36 serve as spur gears 38 and 39 of steering gear unit 101. Radius R1 of drive gear 58 is larger than radius R2 of follower gear 59 regardless of its rotational direction or angle, thereby amplifying the allowed lateral turning angle of wheel 41. However, radius R1 of drive gear 58 varies according to its rotation, and simultaneously, radius R2 of follower gear 59 varies so as to compensate for the variation of radius R1.

FIG. 36 illustrates mutually meshing spur gears 58 and 59 when they arrange steerable running wheel 41 in a longitudinal direction of the vehicle for straight traveling. Gears 58 and 59 tangentially contact each other through a point T on a line between the centers of pivots 106 and 109. The toothed peripheral range of drive gear 58 ahead of point T is named a front central angle range 148, and that behind point T is named a rear central angle range 147. The toothed peripheral range of follower gear 59 ahead of point T is named a front central angle range 144, and that behind point T is named a rear central angle range 143.

When arranging wheel 41 in the longitudinal direction of the vehicle for straight traveling, radius R1 of drive gear 58 is R1m, and radius R2 of follower gear 59 is R2m, as shown in FIG. 36.

If steering gear unit 101 shown in FIG. 36 interlocks with inside wheel 41, gears 58 and 59 mesh with each other through their rear central angle ranges 147 and 143 so as to turn the front end of inside wheel 41 laterally outward of the vehicle. At this time, radius R1 of drive gear 58 is larger than R1m, and radius R2 of follower gear 59 is smaller than R2m. As the rear ends of gears 58 and 59 approach each other, radius R1 increases and radius R2 decreases so as to compensate for the increase of radius R1. When radius R1 reaches maximum radius R1r and radius R2 reaches minimum radius R2r, the lateral outward turning angle of the front end of inside wheel 41 reaches the maximum.

If steering gear unit 101 shown in FIG. 36 interlocks with outside wheel 41, gears 58 and 59 mesh with each other through their front central angle ranges 148 and 144 so as to turn the front end of inside wheel 41 laterally inward of the vehicle. At this time, radius R1 of drive gear 58 is smaller than R1m, and radius R2 of follower gear 59 is larger than R2m. As the front ends of gears 58 and 59 approach each other, radius R1 decreases and radius R2 increases so as to compensate for the decrease of radius R1. When radius R1 reaches minimum radius R1f and radius R2 reaches maximum radius R2f, the lateral inward turning angle of the front end of outside wheel 41 reaches the maximum.

Therefore, according to increase of rotational angle of steering wheel 14, the gear ratio R2/R1 of steering gear unit 101 interlocking with outside wheel 41 increases so as to reduce the rate of increase of lateral turning angle of outside wheel 41. Simultaneously, the gear ratio R2/R1 of steering gear unit 101 interlocking with inside wheel 41 decreases so as to compensate the increase of that of steering gear unit 101 interlocking with outside wheel 41, thereby increasing the rate of increase of lateral turning angle of inside wheel 41. As a result, the difference of lateral turning angle between inside wheel 41 and outside wheel 41 increases as the rotational angle of steering wheel 14 increases. Graphs 35a and 35b in FIG. 40 express the variation of lateral turning angle of inside and outside wheels 41 in this way.

Figure 37:
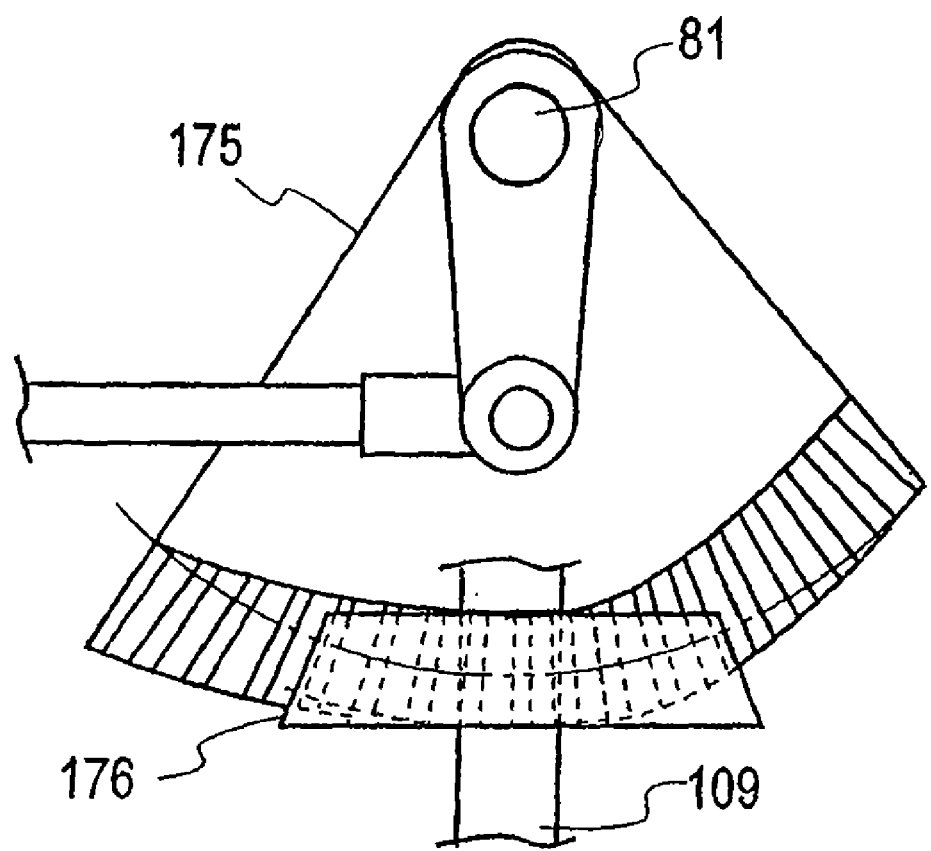
FIG. 37 is a side view of bevel gears 175 and 176 having variable radii serving as bevel gears 82 and 83 of steering gear unit 101.
Figure 38:
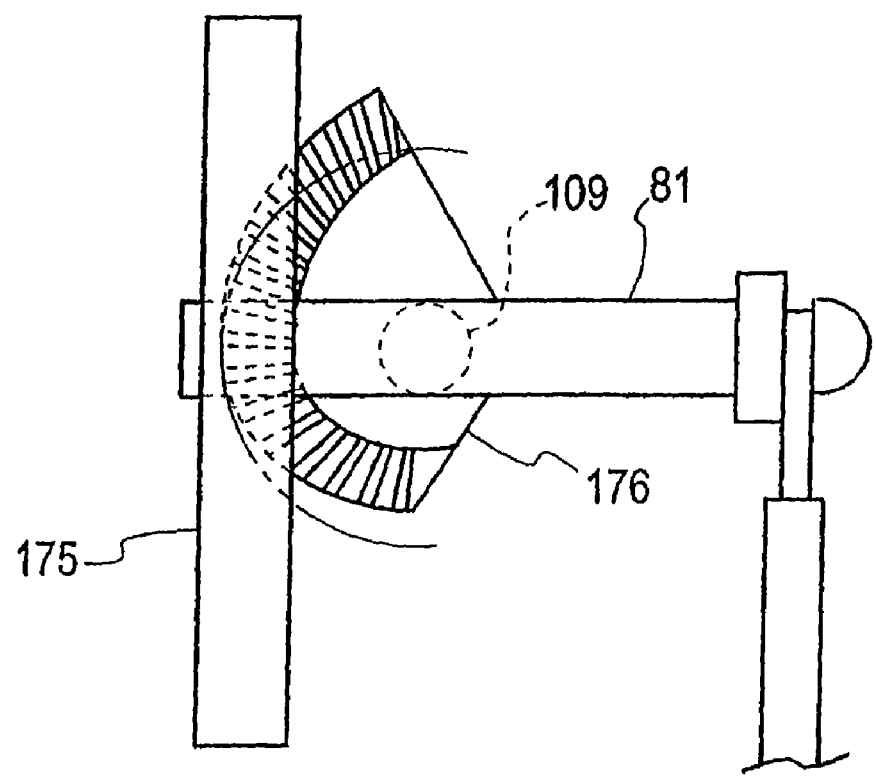
FIG. 38 is a plan view of the same.
Figure 39:
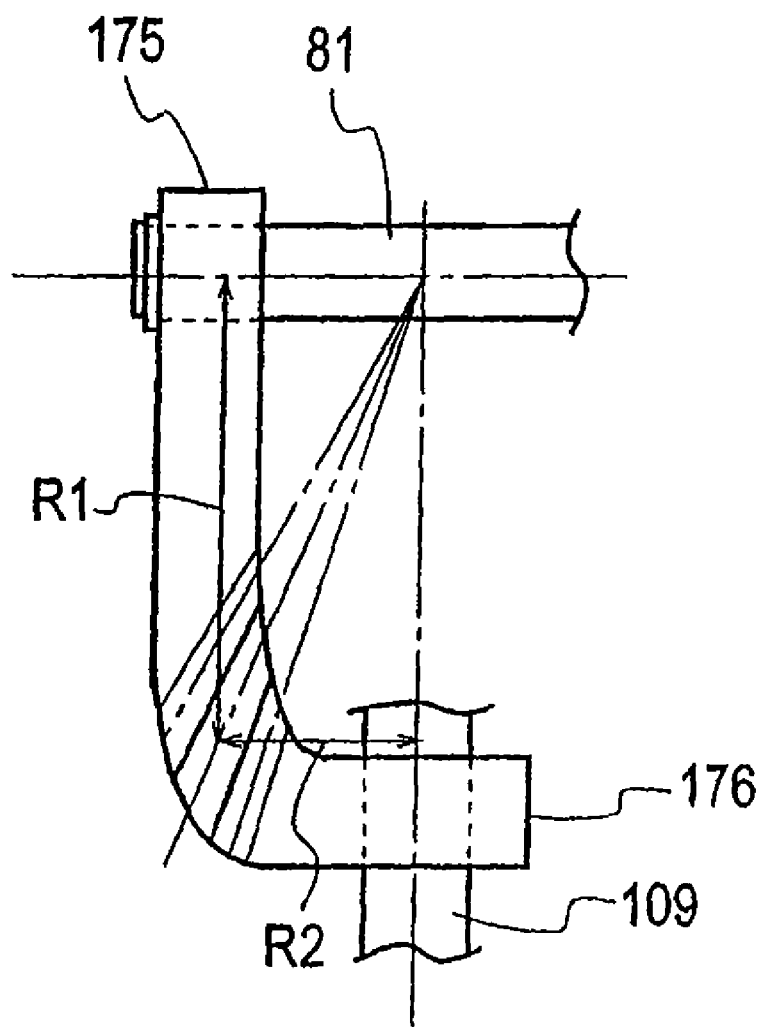
FIG. 39 is a front (rear) view of the same.

Referring to FIGS. 37 to 39, steering gear unit 101 comprising bevel gears 175 and 176 is so constructed that, according to rotation of steering wheel 14 from the straight traveling position, the gear ratio R2/R1 thereof increases when it interlocks with inside wheel 41, and decreases when it interlocks with outside wheel 41, similarly to that comprising spur gears 58 and 59. In other words, according to increase of rotational angle of steering wheel 14, the increasing rate of lateral turning angle of inside wheel 41 is increased while the increasing rate of lateral turning angle of outside wheel 41 is decreased so as to compensate for the increase of that of inside wheel 41. Graphs 35a and 35b in FIG. 40 also express the variation of lateral turning angle of inside and outside wheels 41 by steering gear units 101L and 101R comprising bevel gears 175 and 176.

For assuring such a variation of gear ratio R2/R1, respective toothed edges of drive gear 175 and follower gear 176 are actually bent at approximately 45 degrees so as to face and mesh mutually. In FIGS. 37 and 38, such bent toothed edges of gears 175 and 176 are omitted for convenience.

Description will now be given of aspects of a vehicle employing left and right steering gear units 101L and 101R of FIG. 36 having variable gear ratios, in accordance with FIGS. 41 to 44 and FIGS. 45 to 48. Hereinafter, only left turning of the vehicle is disclosed, however, the vehicle performs similarly in not-shown right turning. Furthermore, steering gear units 101L and 101R comprising bevel gears 175 and 176 shown in FIGS. 37 and 38 also enables the vehicle to turn in the same way.

Figure 21:
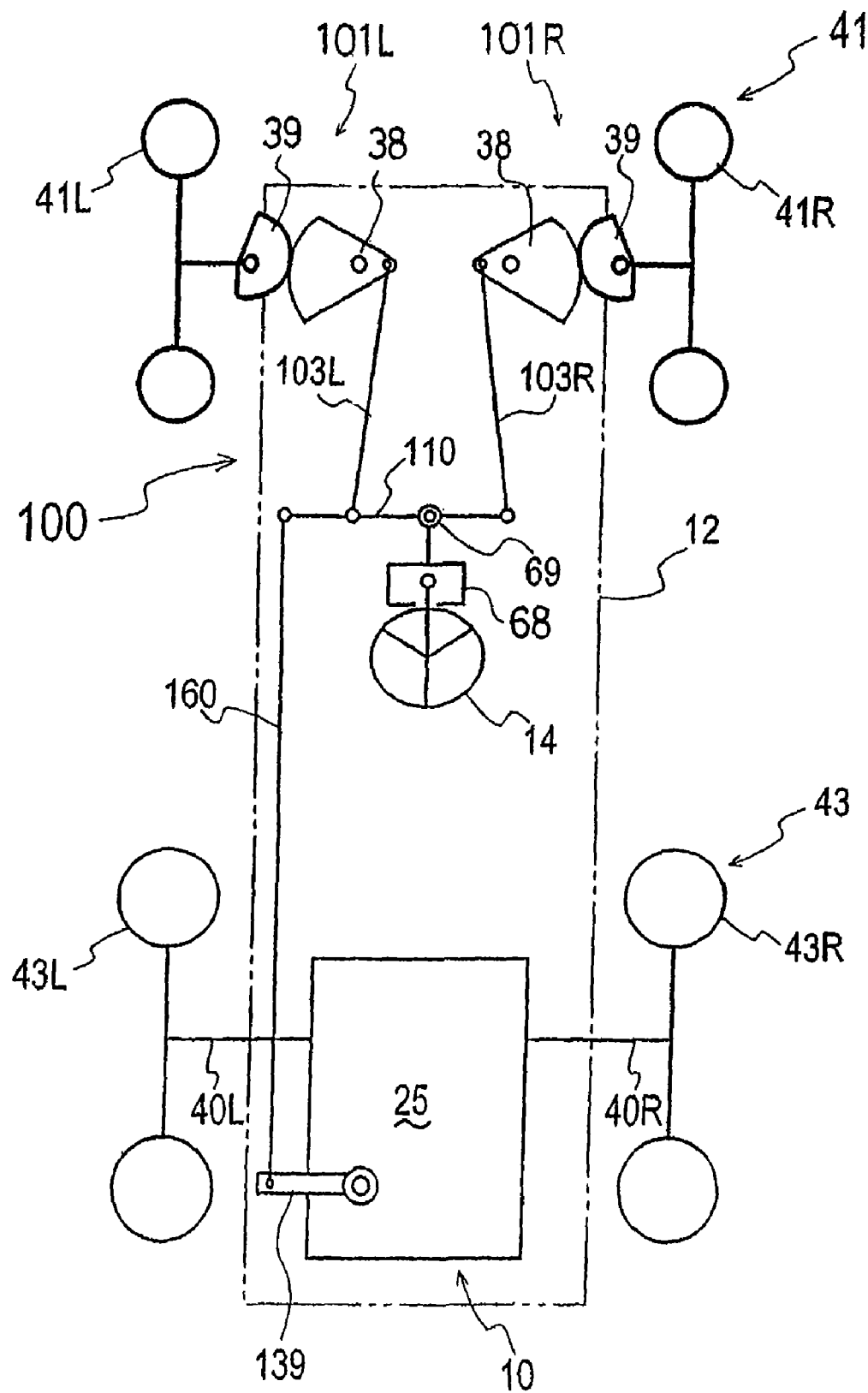
FIG. 21 is a diagrammatic plan view of a four-wheel running vehicle provided with a steering linkage 100 which turns left and right steerable running wheels 41L and 41R while amplifying the lateral turning angle of wheels 41L and 41R in connection with operation of axle driving/steering apparatus 10.

The four-wheel vehicle shown in FIGS. 41 to 44, having two right and left steerable running wheels 41 and two right and left running-driving wheels 43, is identical to the vehicle shown in FIG. 21 wherein variable gears 58 and 59 serve as gears 38 and 39.

Figure 41:
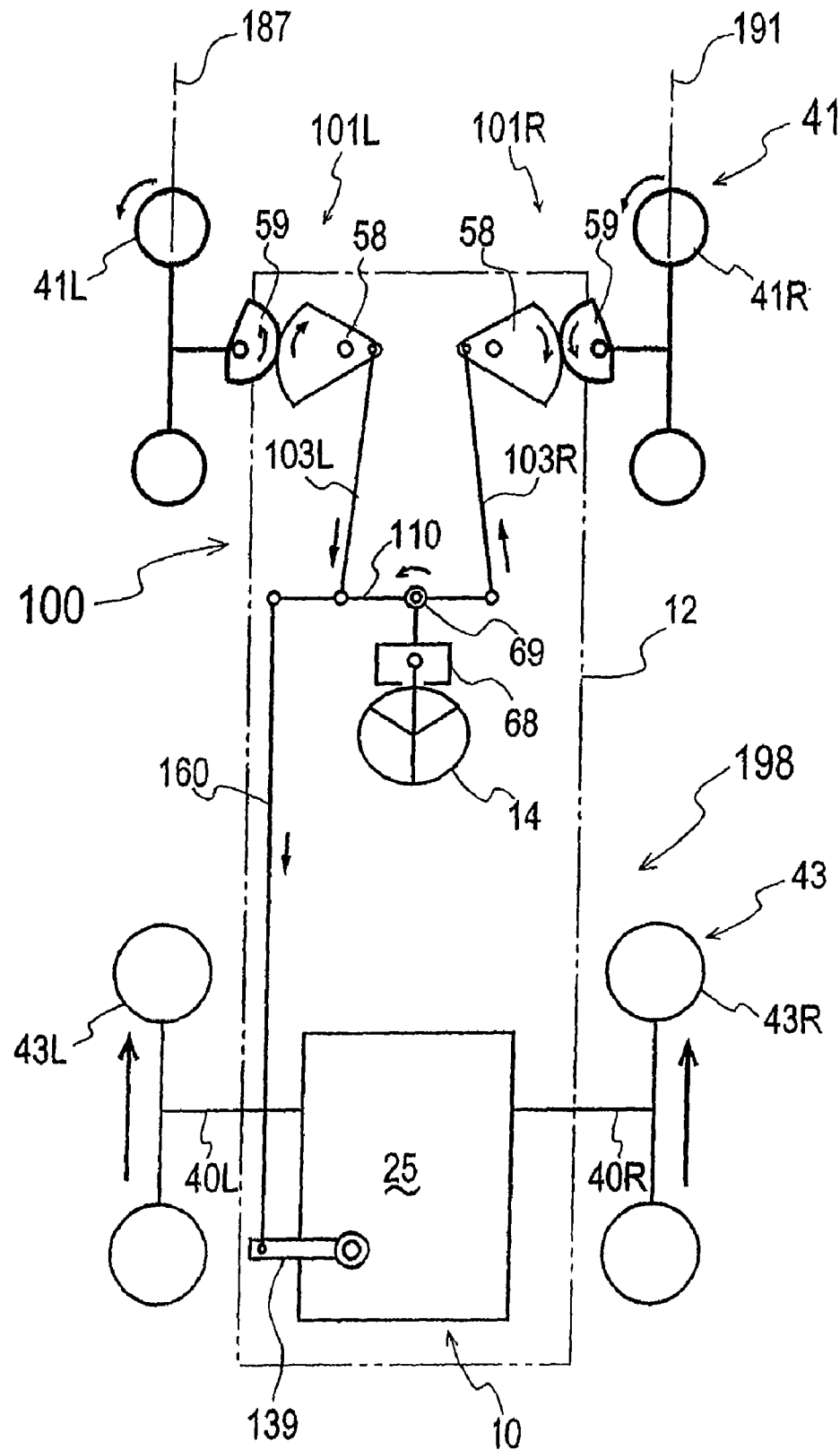
FIG. 41 is a diagrammatic plan view of a four-wheel running vehicle employing variable gears 58 ad 59 serving as steering gear units 101R and 101L, wherein the vehicle travels straight forward.

As shown in FIG. 41, when steering wheel 14 is set in a neutral position for straight-traveling, left and right steerable running wheels 41 are disposed on respective lines 187 and 191 that are longitudinal with respect to the vehicle. At this time, both left and right running-driving wheels 43L and 43R are driven at the same speed in the same direction (in this embodiment, forward).

Left wheel 43L serving as inside wheel 43 which is disposed at inside of the vehicle in turning, is decelerated correspondingly to the left rotational angle of steering wheel 14 from the neutral position, so that the rotary speed of left wheel 43L becomes smaller than that of right wheel 43R serving as outside wheel 43 which is disposed at outside of the vehicle in turning. The turning center of a vehicle body 198 caused by the difference of rotary speed between left and right wheels 43 is essentially disposed on an axial line of axles 40L and 40R extended on the inside of the vehicle in turning (leftward, when the vehicle turns left). According to rotation of steering wheel 14, the difference of rotary speed between inside and outside wheels 43 increases so as to move the turning center of the vehicle on the extended axial line of axles 40 from the exterior of the vehicle to the interior of the vehicle (the lateral middle of the vehicle between left and right wheels 43). Therefore, the radius of turning circle of the vehicle decreases according to the increase of rotational angle of steering wheel 14.

Accordingly, in order to prevent wheels 41L and 41R from hindering the turning of vehicle body 198 caused by the differential rotation of wheels 43L and 43R (to prevent wheel 41L or 41R from traverse-slipping), the centers of the lateral turning circles of wheels 41L and 41R, whose radii are extended axes of respective wheels 41, must coincide with the turning center of the vehicle caused by the differential driving of wheels 43 or be disposed close to the lateral middle of the vehicle more than the turning center of the vehicle. For reducing the turning circle of the vehicle so as to promote turning of the vehicle, the centers of lateral turning of wheels 41 are preferably disposed close to the lateral middle of the vehicle more than the turning center of the vehicle caused by the differential drive of wheels 43. Alternatively, if necessary, the centers of lateral turning of wheels 41 may be disposed apart from the lateral middle of the vehicle more than the turning center of the vehicle caused by the differential drive of wheels 43 so as to expand the turning circle of the vehicle.

However, if the traveling speed is controlled regardless of rotation of steering wheel 14, the turning center of vehicle body 198 caused by differential rotation of wheels 43 moves on the axial line of axle 40 according to variation of traveling speed while the rotational angle of steering wheel 14 is maintained. It is possible to construct the vehicle so as to reduce the traveling speed according to increase of rotational angle of steering wheel 14, or to change the ratio of movement of link 139 to the rotational angle of steering wheel 14 in correspondence to variation of the traveling speed, thereby fixing the turning radius of the vehicle, i.e., fixing the turning center of the vehicle in relation to each rotational angle of steering wheel 14.

Figure 42:
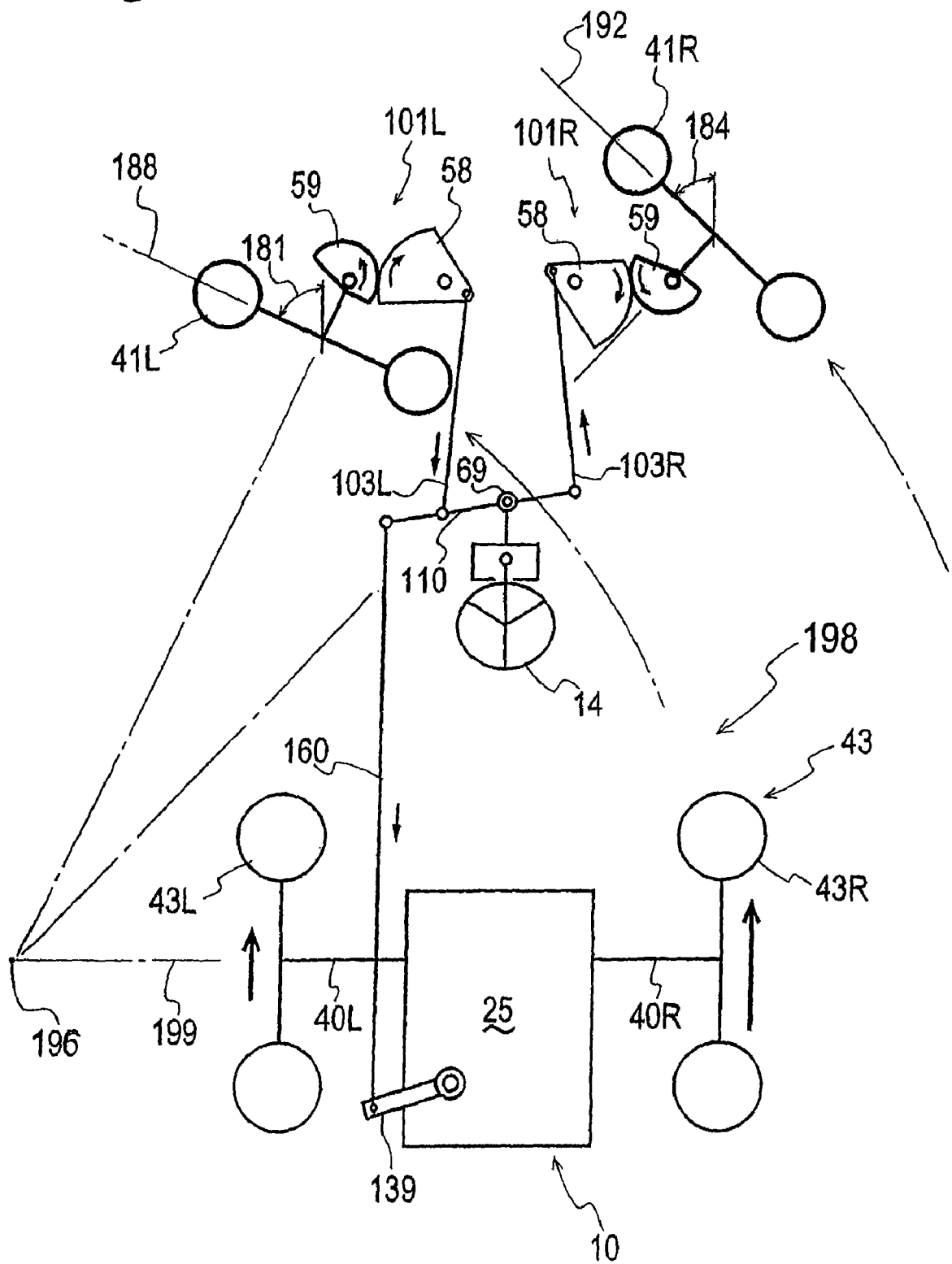
FIG. 42 is a diagrammatic plan view of the same, wherein steering wheel 14 is rotated leftward a little so that left running-driving wheel 43L rotates forward at a reduced speed.
Figure 43:
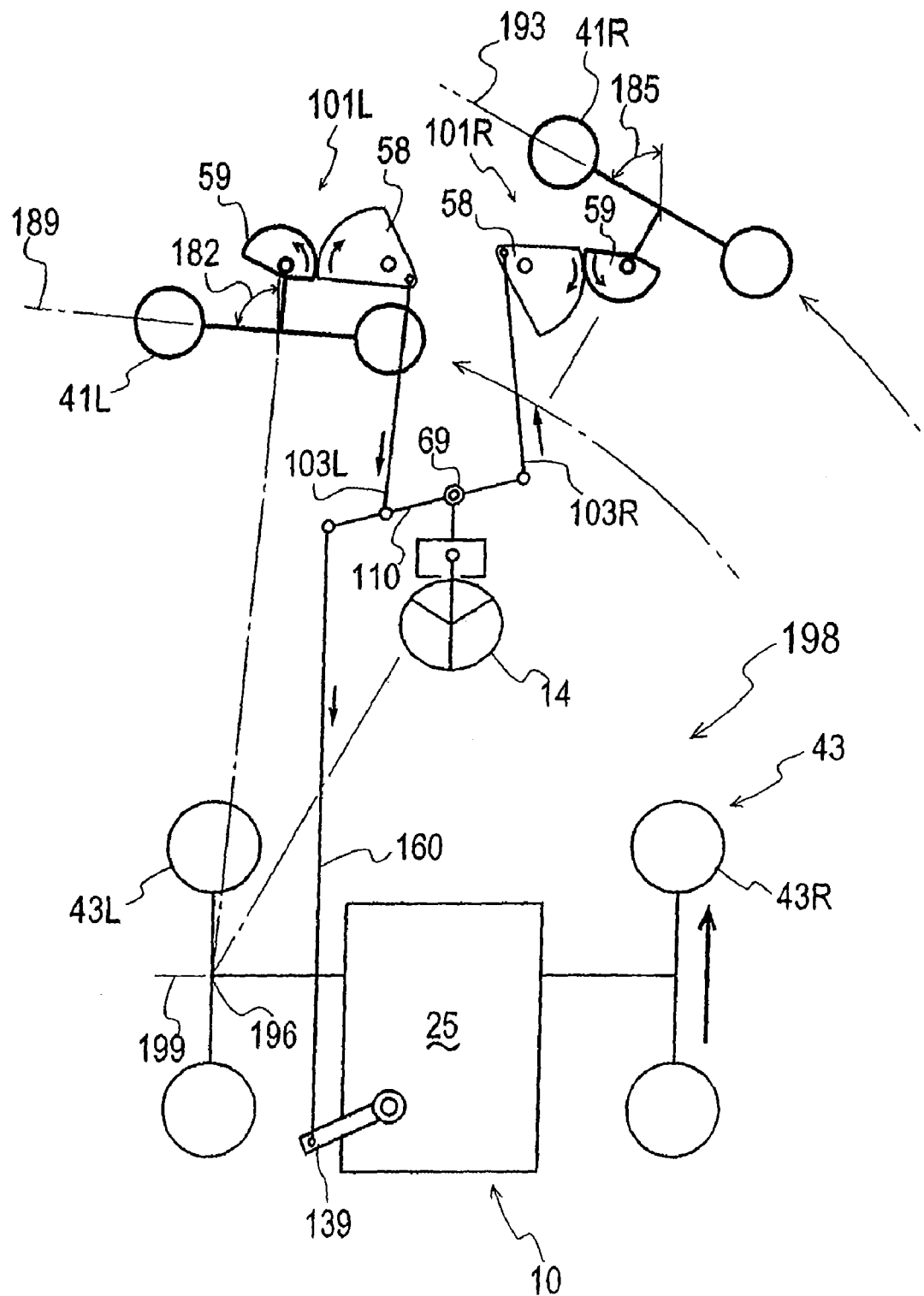
FIG. 43 is a diagrammatic plan view of the same, wherein steering wheel 14 is rotated leftward so greatly as to eliminate the rotary speed of left running-driving wheel 43L.
Figure 44:
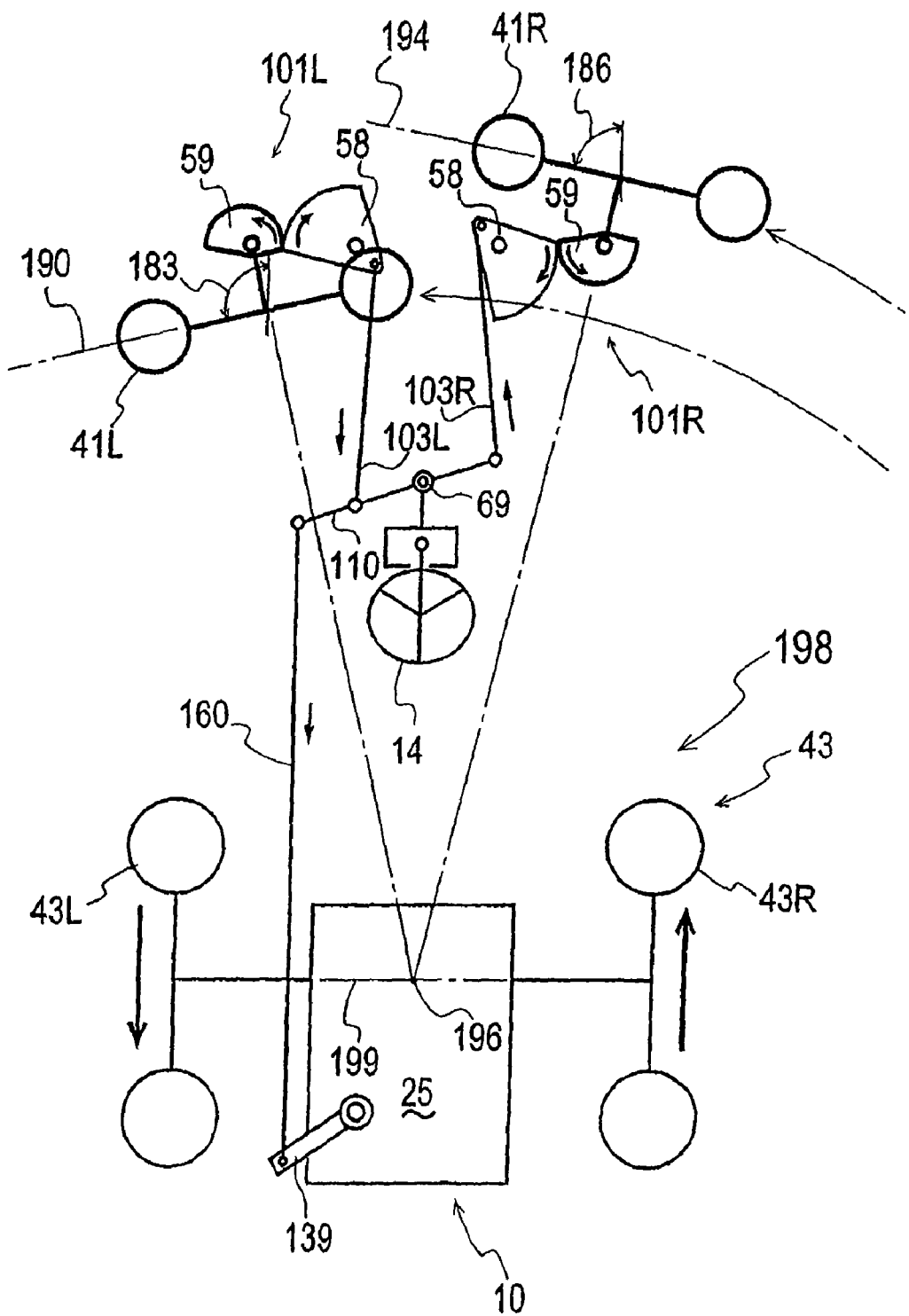
FIG. 44 is a diagrammatic plan view of the same, wherein steering wheel 14 is fully rotated leftward so that left running-driving wheel 43L rotates backward.

According to steering linkage 100 including steering gear units 101L and 101R constituted by gears 58 and 59, as shown in FIGS. 42 to 44, both the centers of lateral turning of wheels 41L and 41R coincide with each other on an extended axial line 199 of axles 40 so that a single point 196 serves as a common turning center point 196 shared by both wheels 41L and 41R. For convenience, the following performance of the vehicle shown in FIGS. 42 to 44, and further, the performance of a six-wheel vehicle shown in FIGS. 45 to 48 will be described on the assumption that the turning center of the vehicle is fixed in relation to each rotation angle of steering wheel 14 regardless of traveling speed, and that point 196 serving as the turning center of wheels 41L and 41R is intended to coincides with the center of turning circle of the vehicle caused by the differential rotation of wheels 43L and 43R. Therefore, in the vehicle shown in FIGS. 42 to 44, the length of line 199 between point 196 and the lateral middle point of the vehicle serves as the turning radius of the vehicle.

Referring to FIG. 42, when steering wheel 14 is turned left a little, the rotary speed of left inside wheel 43L becomes smaller than that of right outside wheel 43R while both wheels 43L and 43R rotates forward, However, the rotational speed difference of wheels 43L and 43R is so small that the turning center of the vehicle is disposed on an extension of line 199 outer-leftward from the vehicle. At this time, left wheel 41L is disposed on a line 188, and right wheel 41R on a line 192. A lateral turning angle 181 of left wheel 41L is formed between line 188 and line 187 shown in FIG. 41. A lateral turning angle 184 of right wheel 41R is formed between line 192 and line 191 shown in FIG. 41. Point 196, serving as the center of concentric turning circles of wheels 41L and 41R, which tangentially contact with respective lines 188 and 192, is disposed on the extension of line 199 outer-leftward from the vehicle so as to coincide with the turning center of the vehicle caused by the differential drive of wheels 43L and 43R. The length of line 199 between point 196 and the lateral middle point of the vehicle serving as the turning radius of the vehicle is so large that the vehicle turns on a large circle.

Referring to FIG. 44, by further rotating steering wheel 14 leftward, the reduced rotary speed left wheel 43L serving as inside wheel 43 reaches zero while right wheel 43R serving as outside wheel 43 still rotates forward, so that the turning center of the vehicle caused by the differential drive of wheels 43L and 43R is placed on wheel 43L. At this time, left wheel 41L is disposed on a line 189, and right wheel 41R on a line 193. A lateral turning angle 182 of left wheel 41L is formed between line 189 and line 187 so as to be larger than angle 181. A lateral turning angle 185 of right wheel 41R is formed between line 193 and line 191 so as to be larger than angle 184. Point 196, serving as the center of concentric turning circles of wheels 41L and 41R, which tangentially contact with respective lines 189 and 193, is disposed on left wheel 43L on line 199 so as to coincide with the turning center of the vehicle caused by the differential drive of wheels 43L and 43R. The length of line 199 between point 196 and the lateral middle point of the vehicle serving as the turning radius of the vehicle is so small that the vehicle turns on a small circle, in other words, the vehicle turns centering on left inside wheel 43L.

Referring to FIG. 44, by fully rotating steering wheel 14 leftward, left wheel 43L serving as inside wheel 43 rotates backward while right wheel 43R serving as outside wheel 43 rotates forward, so that the turning center of the vehicle caused by the differential drive of wheels 43L and 43R is placed on the lateral middle point between wheels 43L and 43R. At this time, left wheel 41L is disposed on a line 190, and right wheel 41R on a line 194. A lateral turning angle 183 of left wheel 41L is formed between line 190 and line 187 to be larger than angle 182. A lateral turning angle 186 of right wheel 41R is formed between line 194 and line 191 so as to be larger than angle 185. Point 196, serving as the center of concentric turning circles of wheels 41L and 41R, which tangentially contact with respective lines 190 and 194, is disposed on the lateral middle point of the vehicle on line 199 between wheels 43L and 43R so as to coincide with the turning center of the vehicle caused by the differential drive of wheels 43L and 43R. Since point 196 coincides with the lateral middle point of the vehicle, the vehicle turns centering on its own lateral middle point. In other words, the vehicle spins.

As the above, when each of steering gear units 101L and 101R is constituted by mutually meshing drive gear 58 and follower gear 59 as shown in FIG. 36, the gear ratio of steering gear unit 101 interlocking with inside wheel 41 is always larger than that of steering gear unit interlocking with outside wheel 41 while steering wheel 14 is rotated either left or right from the neutral position. Accordingly, in FIGS. 42 to 44, lateral turning angles 181, 182 and 183 of left inside wheel 41L are larger than lateral turning angles 184, 185 and 186 of right outside wheel 41R, respectively, so that extensions of axes of left and right wheels 41L and 41R cross each other on the turning side of the vehicle. This crossing point serves as point 196 around which both wheels 41L and 41R turn.

Point 196 moves on axial line 199 of axles 40L and 40R from the exterior of the vehicle on the turning side thereof to the lateral middle of the vehicle according to rotation of steering wheel 14 from its neutral position. The output rotational speed and direction of axle driving/steering apparatus 10 in housing 25 is controlled in relation to the rotational angle of steering wheel 14 so as to make the turning center of the vehicle caused by the differential drive of wheels 43L and 43R coincide with point 196. In this way, running-driving wheels 43L and 43R are properly driven so as to turn the vehicle properly along the lateral turning direction of steerable running wheels 41L and 41R. Since both lateral turning forces of steerable running wheels 41L and 41R and the turning force of the vehicle caused by the differential rotation of running-driving wheels 43L and 43R are concentrated on the substantially single point, each running wheel is prevented from traverse-slipping damaging the ground surface, whereby the vehicle turns properly and steadily.

A six-wheel running vehicle shown in FIGS. 45 to 48, which employs variable gears 58 and 59 serving as gears 38 and 39 of steering gear units 101L and 101R, is provided at the rear portion thereof with running-driven wheels 46L and 46R replacing running wheels 45L and 45R. Wheels 46L and 46R are fixed onto outer ends of respective driven axles 150L and 150R rotatably supported by chassis 12. A sprocket (or a pulley) 153 is fixed on each of axles 50L and 50R. A sprocket (or a pulley) 152 is fixed on each of axles 40L and 40R having each of running-driving wheels 43L and 43R fixed on its outer end. A chain (or a belt) 154 is interposed between sprockets 152 and 153 on each of lateral sides of the vehicle so as to rotate each of axles 150L and 150R at the same speed and in the same direction with each of axles 40L and 40R.

Figure 45:
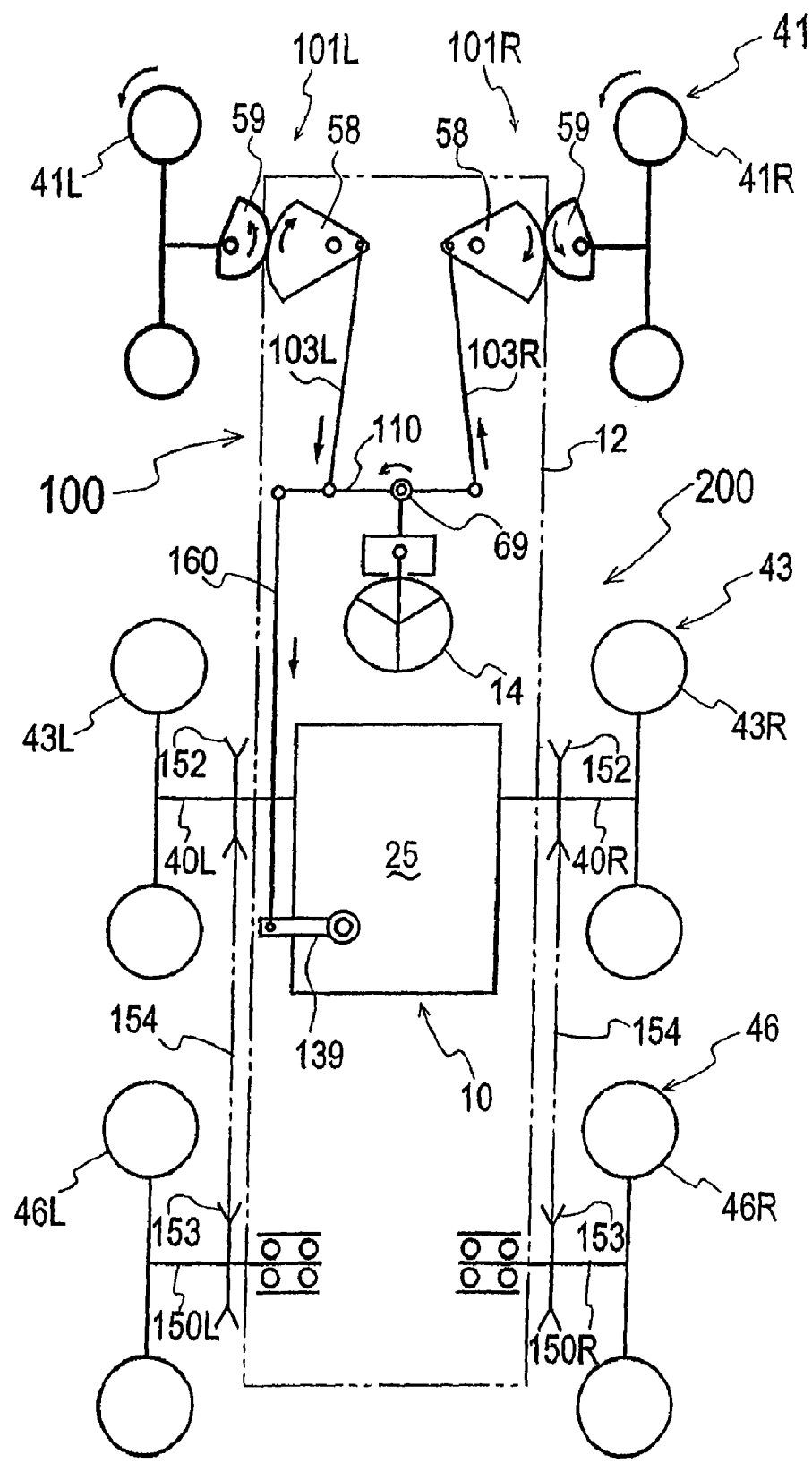
FIG. 45 is a diagrammatic plan view of a six-wheel running vehicle employing variable gears 58 ad 59 serving as steering gear units 101R and 101L, wherein the vehicle travels straight forward.

As shown in FIG. 45, when the vehicle travels straight forward, all running wheels 43L, 43R, 46L and 46R are rotated forward at the same speed by output of axle driving/steering apparatus 10 in housing 25. Steerable running wheels 41L and 41R rotate in the longitudinal direction of the vehicle.

Figure 46:
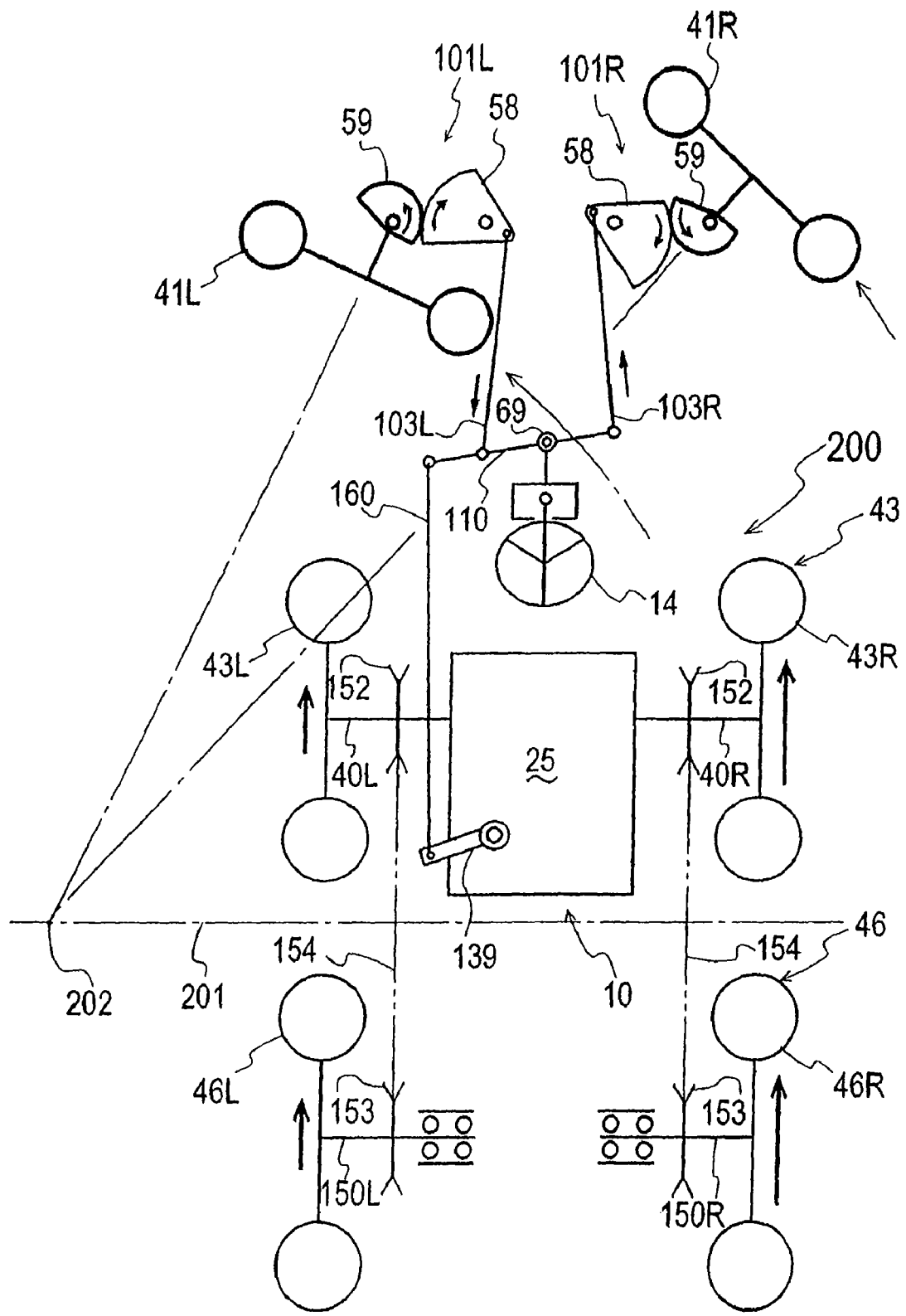
FIG. 46 is a diagrammatic plan view of the same, wherein steering wheel 14 is rotated leftward a little so that left running-driving and driven wheels 43L and 43R rotate forward at a reduced speed.
Figure 47:
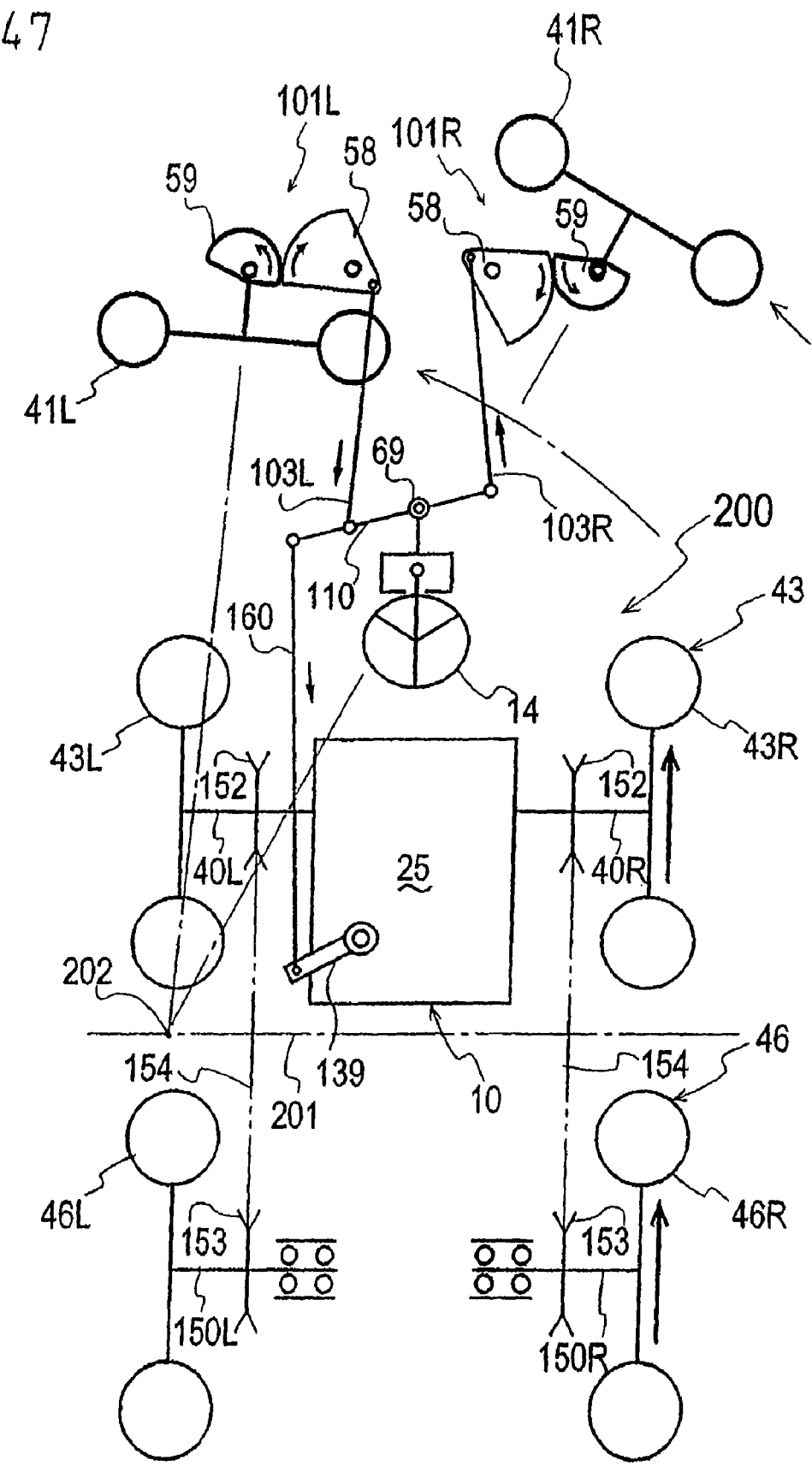
FIG. 47 is a diagrammatic plan view of the same, wherein steering wheel 14 is rotated leftward so greatly as to eliminate the rotary speed of left running-driving and driven wheels 43L and 46L.
Figure 48:
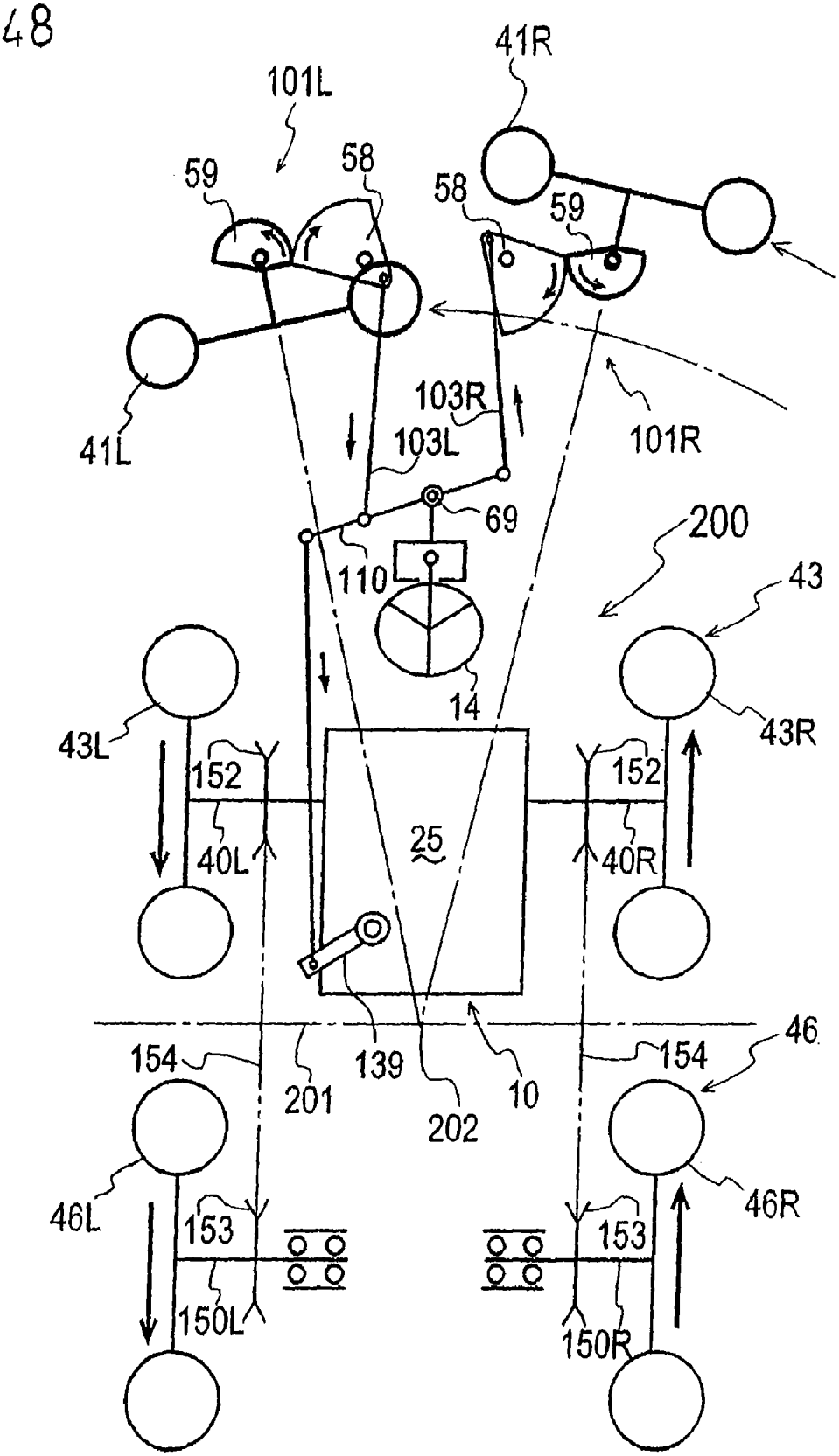
FIG. 48 is a diagrammatic plan view of the same, wherein steering wheel 14 is fully rotated leftward so that left running-driving and driven wheels 43L and 46L rotate backward.

As shown in FIGS. 46 to 48, in this vehicle, left running-driving and driven wheels 43L and 46L are decelerated so as to serve as inside wheels of the vehicle in turning while steering wheel 14 is rotated leftward. The resultant difference of rotation speed thereof from right wheels 43R and 46R serving as outside wheels of the vehicle in turning cause a vehicle body 200 to turn laterally (leftward, in this embodiment). The turning center of vehicle body 200 exists on a resultant axial line 201 of all axles 40L, 40R, 150L and 150R, which is extended at the substantially longitudinal middle between axles 40 and axles 150.

Therefore, in this vehicle, steering linkage 100 is so constructed as to arrange lateral turning center point 202 shared between steerable running wheels 41L and 41R. As shown in FIGS. 46 to 48, turning center 202 moves on line 201 from the outer left side of the vehicle to the lateral middle of the vehicle 33 according to the increase of rotational angle of steering wheel 14 from its neutral position.

Namely, axle driving/steering apparatus 10 interlocking with steering wheel 14 for turning wheels 41L and 41R controls the rotational direction and speed of wheels 43L, 43R, 46L and 46R so as to make the turning center of vehicle body 200 caused by the differential drive of wheels 43L, 43R, 46L and 46R coincide with turning center 202 of wheels 41L and 41R moving on line 201 according to rotation of steering wheel 14.

By using steering gear units 101L and 101R comprising variable gears 58 and 59, the vehicle, even when it is a six-wheel running vehicle, the lateral turning center of steerable running wheels 41L and 41R coincides with the lateral turning center of vehicle body 200 caused by the differential drive of wheels 43 and 46, thereby being able to turn steadily.

As the above, the foregoing performances of the vehicles shown in FIGS. 41 to 48 have been described while the variation of traveling speed of the vehicle is ignored, or on the assumption that the turning center of the vehicle caused by the differential drive of wheels 43R and 43L is fixed so as to coincide with the lateral turning center of wheels 41R and 41L when the rotational angle of steering wheel 14 is constant regardless of the traveling speed. However, actually, the turning center of the vehicle caused by the differential drive of wheels 43R and 43L may move according to variation of the traveling speed even if the rotational angle of steering wheel 14 is constant.

However, if the movement of lateral turning center of the vehicle caused by differential drive of wheels 43 relative to every rotational angle of steering wheel 14 according to the variation of traveling speed of the vehicle cannot be prevented, the positional difference between the lateral turning center of steerable wheels 41 and the lateral turning center of the vehicle caused by differential drive of wheels 43 should be reduced as much as possible.

Then, gears 58 and 59 are so modified as to allow steerable wheels 41 to turn laterally considerably freely from rotation of steering wheel 14. For example, gaps between teeth of gear 58 or 59 are expanded or teeth thereof are narrowed so as to expand backlashes, thereby allowing gear 59 to rotate considerably freely relative to gear 58.

Figure 49:
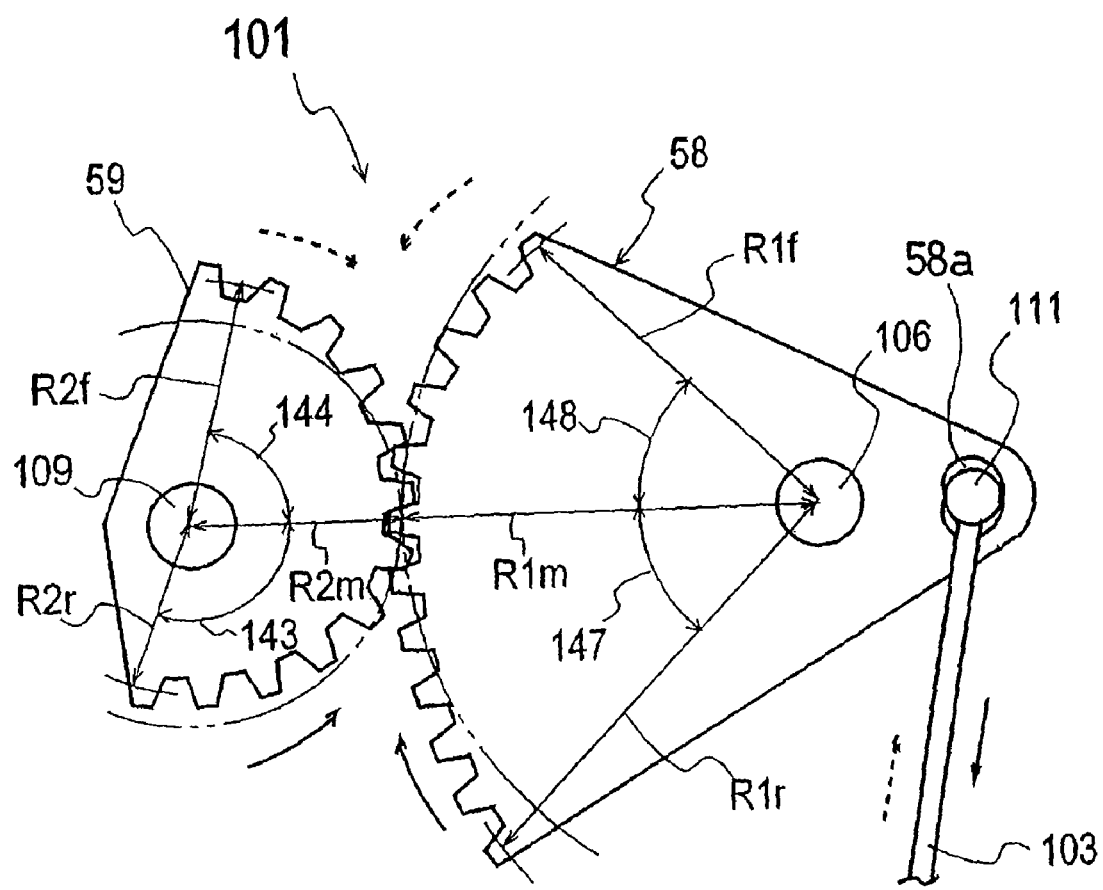
FIG. 49 is a plan view of a modification of variable spur gears 58 and 59 modified so as to compensate for a difference between the lateral turning center of inside and outside steerable wheels 41 and the lateral turning center of the vehicle caused by differential drive of wheels 43, which occurs when the lateral turning center of the vehicle caused by differential drive of wheels 43 in relative to every rotational angle of steering wheel 14 cannot be conserved in correspondence to variation of traveling speed of the vehicle.

Alternatively, as shown in FIG. 49, an elongated hole 58a may be formed in gear 58 for insertion of pivotal pin 111 so as to allow gear 58 to rotate considerably freely in relative to pulled or pushed rod 103.

Figure 50:
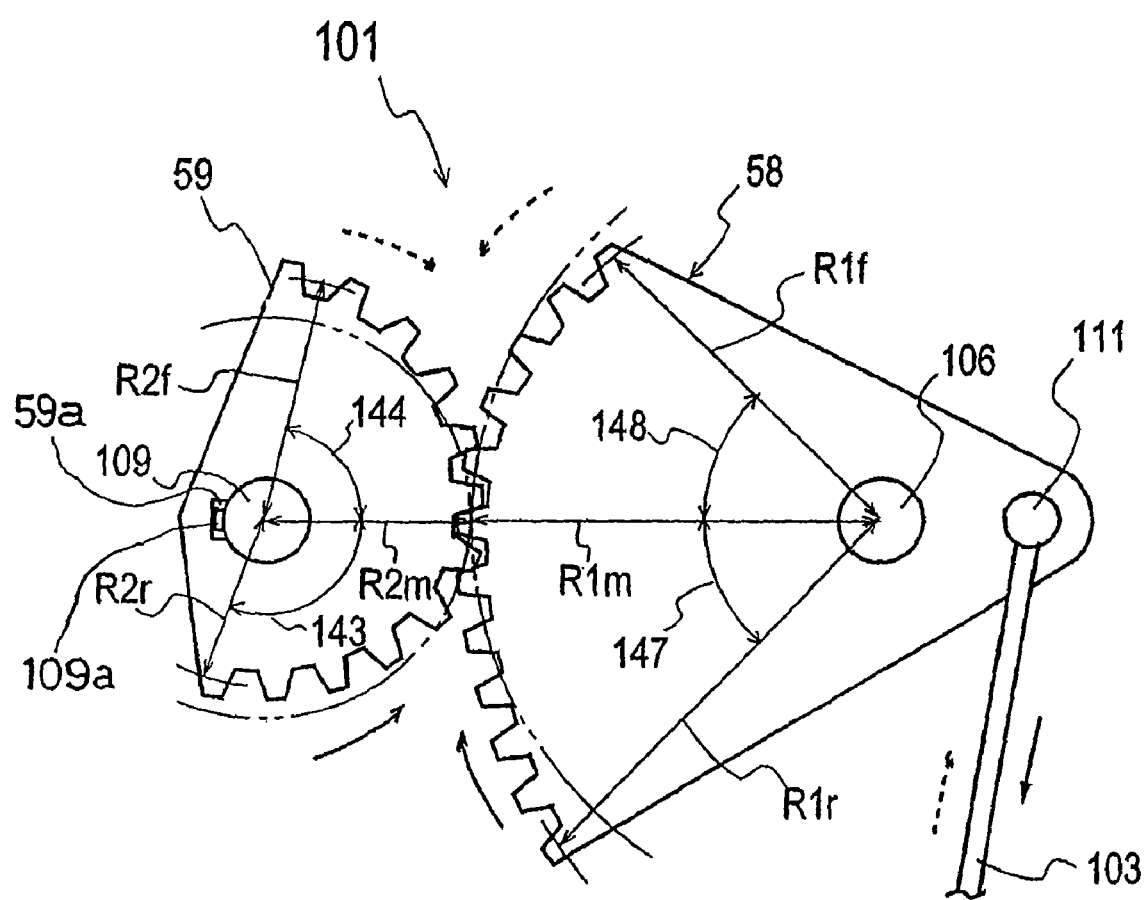
FIG. 50 is a plan view of another modification of variable spur gears 58 and 59 modified for the same purpose.

Alternatively, as shown in FIG. 50, the width of a key groove 59a formed in gear 59 may be larger than the width of a key 109a formed on kingpin 109 to be inserted into key groove 59a, thereby allowing kingpin 109, i.e., wheels 41, to rotate relative to gear 59.

Such modifications on gears 58 and 59 may be performed on bevel gears 175 and 176 for the same purpose.

The above-mentioned construction of the vehicle according to the present invention is applicable to such a vehicle as a tractor, a riding mower, a snow removing vehicle and an amphibious motorcar.

Although several embodiments have been described, they are merely exemplary of the invention and not to be constructed as limiting, the invention being defined solely by the appended claims.

What is claimed is:

1. A four-wheel vehicle comprising:
   a prime mover;
   a pair of left and right steerable wheels;
   a pair of left and right non-steerable driving wheels;
   a transmission system for transmitting power of the prime mover to the pair of left and right non-steerable driving wheels and for independently controlling rotational speeds of the left and right non-steerable driving wheels, wherein the transmission system includes an operative part for controlling the rotational speeds of the left and right non-steerable driving wheels;
   a steering operation device for steering the pair of left and right steerable wheels;
   a fluid supply device whose fluid supply is controlled by operating the steering operation device;
   a hydraulic power steering actuator fluidly connected to the fluid supply device and operatively connected to the steering operation device; and
   a pair of left and right gear assemblies interposed between the actuator and the respective left and right steerable wheels, wherein, in each of the gear assemblies, a first non-circular gear operatively connected to the steering operation device meshes with a second non-circular gear operatively connected to each of the left and right steerable wheels, and wherein the actuator is also operatively connected to the operative part of the transmission system so as to control a differential rotation of the left and right non-steerable driving wheels according to operation of the steering operation device.

2. The four-wheel vehicle according to claim 1, further comprising:
   a link member pivotally connected to the actuator, wherein the link member is operatively connected to the operative part of the transmission system; and
   a pair of left and right link rods fore-and-aft extended from respective left and right ends of the link member and connected to the respective left and right first non-circular gears.

* * * * *